US012167356B2

(12) United States Patent
Cheng et al.

(10) Patent No.: US 12,167,356 B2
(45) Date of Patent: Dec. 10, 2024

(54) METHOD OF CHANNEL SCHEDULING FOR NARROWBAND INTERNET OF THINGS IN NON-TERRESTRIAL NETWORK AND USER EQUIPMENT USING THE SAME

(71) Applicant: SHARP KABUSHIKI KAISHA, Sakai (JP)

(72) Inventors: Chien-Chun Cheng, Taipei (TW); Yung-Lan Tseng, Taipei (TW); Chia-Hao Yu, Taipei (TW); Hai-Han Wang, Taipei (TW); Hsin-Hsi Tsai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 311 days.

(21) Appl. No.: 17/573,645

(22) Filed: Jan. 12, 2022

(65) Prior Publication Data

US 2022/0232503 A1 Jul. 21, 2022

Related U.S. Application Data

(60) Provisional application No. 63/138,180, filed on Jan. 15, 2021.

(51) Int. Cl.

| | |
|---|---|
| ***H04W 56/00*** | (2009.01) |
| ***H04W 24/08*** | (2009.01) |
| ***H04W 74/0833*** | (2024.01) |
| *H04W 84/06* | (2009.01) |

(52) U.S. Cl.

CPC ....... *H04W 56/0045* (2013.01); *H04W 24/08* (2013.01); *H04W 56/009* (2013.01); *H04W 74/0833* (2013.01); *H04W 84/06* (2013.01)

(58) Field of Classification Search

CPC ............. H04W 56/0045; H04W 24/08; H04W 56/009; H04W 74/0833; H04W 84/06

See application file for complete search history.

(56) References Cited

U.S. PATENT DOCUMENTS

| | | | | |
|---|---|---|---|---|
| 2009/0315768 A1* | 12/2009 | Abraham | G01S 19/256 342/357.29 |
| 2016/0165640 A1* | 6/2016 | Yang | H04W 72/12 370/336 |
| 2020/0084736 A1* | 3/2020 | Regunathan | H04B 7/0695 |

(Continued)

FOREIGN PATENT DOCUMENTS

| | | |
|---|---|---|
| CN | 109392106 | 2/2019 |

OTHER PUBLICATIONS

Nomor Research Gmbh et al., "Considerations on MAC Control Loops and Timings in Non-Terrestrial Networks (NTN)", 3GPP TSG-RAN WG2 Meeting # 103-Bis R2-1813615, Oct. 8-12, 2018, pp. 1-6.

(Continued)

*Primary Examiner* — Steven Hieu D Nguyen

(74) *Attorney, Agent, or Firm* — ScienBiziP, P.C.

(57) ABSTRACT

The disclosure provides a method of channel scheduling for narrowband Internet of Things (NB-IoT) in a non-terrestrial network (NTN) and a user equipment using the same. The method includes: transmitting an uplink signal ending in a first subframe; determining a monitoring window starting from a second subframe according to the first subframe and a time offset; and monitoring a downlink signal corresponding to the uplink signal according to the monitoring window.

18 Claims, 40 Drawing Sheets

(56) References Cited

U.S. PATENT DOCUMENTS

| | | | | |
|---|---|---|---|---|
| 2020/0374928 | A1* | 11/2020 | Xiong | H04W 74/0833 |
| 2020/0413451 | A1* | 12/2020 | Taherzadeh Boroujeni | H04B 7/18504 |
| 2021/0006328 | A1 | 1/2021 | Kim | |
| 2022/0078856 | A1* | 3/2022 | Jeon | H04L 1/1671 |
| 2022/0232600 | A1* | 7/2022 | Kim | H04L 1/08 |
| 2023/0156804 | A1* | 5/2023 | Ye | H04W 74/002 370/329 |
| 2023/0397247 | A1* | 12/2023 | Jung | H04B 7/18519 |

OTHER PUBLICATIONS

"International Search Report (Form PCT/ISA/210) of Related International PCT Application, application No. PCT/CN2022/071667," mailed on Apr. 13, 2022, pp. 1-4.

"Evolved Universal Terrestrial Radio Access (E-UTRA); Medium Access Control (MAC) protocol specification (Release 16)," 3GPP TS 36.321 version 16.3.0, Jan. 2021, pp. 1-144.

"Evolved Universal Terrestrial Radio Access (E-UTRA); Physical channels and modulation (Release 16)," 3GPP TS 36.211 version 16.4.0, Feb. 2021, pp. 1-251.

"Evolved Universal Terrestrial Radio Access (E-UTRA); Physical layer procedures (Release 16)," 3GPP TS 36.213 version 16.4.0, Feb. 2021, pp. 1-577.

* cited by examiner

FIG. 37
UL HARQ RTT Timer
deltaPDCCH
n
Last subframe of PUSCH TX
Potential 1st subframe of PDCCH occasion

METHOD OF CHANNEL SCHEDULING FOR NARROWBAND INTERNET OF THINGS IN NON-TERRESTRIAL NETWORK AND USER EQUIPMENT USING THE SAME

CROSS-REFERENCE TO RELATED APPLICATION

The present application claims the benefit of and priority to U.S. Provisional Patent Application Ser. No. 63/138,180, filed on Jan. 15, 2021, entitled "ENHANCEMENT ON NB-IOT IN NTN", the content of which is hereby incorporated fully by reference herein into the present disclosure.

BACKGROUND

Technical Field

The present disclosure generally relates to wireless communications, and more particularly, to a method of channel scheduling for narrowband Internet of Things (NB-IoT) in a non-terrestrial network (NTN) and a user equipment (UE) using the same.

Description of Related Art

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

Non-terrestrial network refers to networks, or segments of networks, using a spaceborne vehicle for transmission, such as low earth orbiting (LEO) satellites or geostationary orbiting (GEO) satellites. A satellite access network based on a satellite with a transparent payload is shown in FIG. 1. FIG. 1 illustrates a schematic diagram of an NTN with a LEO satellite of transparent payload at orbit 600 km. The NTN typically includes a ground (or earth) station (e.g., gNB as shown in FIG. 1), a satellite, and a UE, wherein the satellite may communicatively connect to the gNB via a feeder link and may communicatively connect to the UE via a service link.

The ground station may consist of a satellite gateway (sat-gateway) and a telemetry, tracking, command, and monitoring unit (TTC). TTC link is out of the scope of the 3GPP realm. One or several sat-gateways may be attached to a base band unit (BBU) of a base station or an eNB that connects the NTN to a core network/application server. Node BBUs are close to sat-gateways either co-located or at a few kilometers, antenna diversity may be required depending on geographical location and feeder-link frequency band.

The satellite may be a GEO satellite or a non-GEO satellite (e.g., LEO satellite). The satellite may be part of a satellite constellation to ensure service continuity and is served successively by one or several sat-gateways. A satellite constellation controller provides each base station with satellite system data (e.g., ephemeris, satellite position, or velocity, etc.). This controller could be linked to the TTC unit at least to retrieve the relevant satellite information, but the link to the TTC unit is implementation dependent and out of the scope of 3GPP.

The feeder link is a radio link conveying information for a satellite mobile service between a sat-gateway and the satellite. The service link (or radio link) is a radio link between a cellular IoT (C-IoT) device and the satellite.

The satellite may implement a transparent payload. A transparent payload may perform radio frequency filtering, frequency conversion, or amplification; Hence, the waveform signal repeated by the payload is un-changed except for frequency translation and transmit power, which is set-up according to the reference scenario (e.g., GEO or LEO satellite) and associated link budget.

The satellite may generate several spot-beams over a given service area bounded by its field of view (FoV) or footprint. The footprints of the spot-beams are typical of an elliptic shape. The field of view of a satellite depends on the on-board antenna design/configuration and the minimum elevation angle. The beamforming may be performed onboard the satellite or on the ground.

The C-IoT devices are served by the satellite within the targeted service area and are global navigation satellite system (GNSS) reception capable. GNSS provides autonomous geo-spatial positioning with global coverage. GNSS may include global positioning system (GPS), Galileo, Beidou, or other regional systems. The GNSS is usually operated on an orbit of 20200 km.

NB-IoT provides access to network services using a physical layer optimized for very low power consumption (e.g. full carrier bandwidth is 180 kHz, subcarrier spacing can be 3.75 kHz or 15 kHz). To achieve very low power consumption, the following features are not supported for NB-IoT: inter radio access technology (inter-RAT) mobility, handover, measurement reports, public warning functions, guaranteed bit rate (GBR), closed subscriber group (CGS), support of home eNBs (HeNBs), relaying, carrier aggregation, dual connectivity, network assisted interference cancellation/suppression (NAICS), real-time services, interference avoidance for in-device coexistence, radio access network (RAN) assisted wireless local area network (WLAN) interworking, sidelink communication/discovery, vehicle-to-everything (V2X) sidelink communication, minimization of drive test (MDT), emergency call, circuit switched (CS) fallback, access class barring (ACB), extended access barring (EAB), application specific congestion control for data communication (ACDC), service specific access control (SSAC), aerial UE Communication, NR dual connectivity (EN-DC), and RRC INACTIVE.

The E-UTRAN may comprise location measurement units (LMUs) used for uplink positioning. For NB-IoT, the positioning is supported based on the existing location service (LCS) architecture. For an NB-IoT UE that only supports control plane C-IoT EPS optimization, PDCP is bypassed. For an NB-IoT UE that supports Control Plane CIoT evolved packet system (EPS) optimization and S1-U data transfer or user plane C-IoT EPS optimization, packet data convergence protocol (PDCP) is also bypassed (i.e., not used) until AS security is activated. For NTN NB-IoT, link switch is based on Rel-16 handover (HO) procedures. However, since mobility and measurement reporting are not supported for NB-IoT, the link switch could be only handled by the radio link failure (RLF) procedure. Possible RLF enhancement shall be needed to help UE to enter RRC_IDLE for a link switch.

Regarding NTN NB-IoT, Table 1 shows IoT NTN reference scenario parameters which have been agreed.

TABLE 1

| Scenarios | GEO based non-terrestrial access network - scenario A | LEO based non-terrestrial access network -Scenario B & C |
|---|---|---|
| Orbit type | station keeping a nominally fixed position in terms of elevation/azimuth with respect to a given earth point | circular orbiting at low altitude around the earth |
| Altitude | 35,786 km | 600 km<br>1,200 km |
| Frequency Range (service link) | <6 GHz (e.g., 2 GHz in S band) | |
| Device channel Bandwidth (service link) (NOTE 7) | NB-IoT: 180 kHz (DL), up to 180 kHz with all permissible smaller resource allocations 12*15 kHz, 6*15 kHz, 3*15 kHz, 1*15 kHz, 1*3.75 kHz<br>eMTC: 1080 kHz (DL), up to 1080 kHz with all permissible smaller resource allocations, including 2*180 kHz, 180 kHz, 2*15 kHz or 3*15 kHz or 6*15 kHz (UL) | |
| Payload | Transparent type | Transparent Type |
| Earth-fixed beams | Yes | Scenario B: Yes (steerable beams), see NOTE 1<br>Scenario C: No (the beams move with the satellite) |
| Max beam footprint size (edge to edge) regardless of the elevation angle | 3500 km (NOTE 3) | 1000 km (NOTE 2) |
| Min elevation angle for both sat-gateway and C-IoT device | 10° for service link and 10° for feeder link | 10° for service link and 10° for feeder link |
| Max distance between satellite and C-IoT device at min elevation angle | 40,581 km | 1,932 km (600 km altitude)<br>3,131 km (1,200 km altitude) |
| Max round trip delay (propagation delay only) | 541.46 ms (service and feeder links) | 25.77 ms (600 km) (service and feeder links)<br>41.77 ms (1200 km) (service and feeder links) |
| Max differential delay within a cell | 10.3 ms | 3.12 ms and 3.18 ms for respectively 600 km and 1200 km |
| Max Doppler shift (earth fixed user equipment) (NOTE 6) | 0.93 ppm | 24 ppm (600 km)<br>21 ppm(1200 km) |
| Max Doppler shift variation (earth fixed user equipment) (NOTE 6) | 0.000 045 ppm/s | 0.27 ppm/s (600 km)<br>0.13 ppm/s (1200 km) |
| C-IoT device motion on the earth | Min 0 km/s (stationary device), max 120 km/h | Min 0 km/s (stationary device), max 120 km/h |
| C-IoT device antenna types | Omnidirectional antenna with 0 dBi TX antenna gains and 0 dBi RX antenna gain (NOTE 4) | |
| C-IoT device max Tx power | UE power class 3 with up to 200 mW (23 dBm), UE power class 5 with up to 100 mW (20 dBm) | |
| C-IoT device Noise Figure | Omnidirectional antenna: 7 dB or 9 dB (NOTE 5) | |
| Service link | 3GPP defined Narrow Band IoT and eMTC | |

NOTE 1:

Each satellite has the capability to steer beams towards fixed points on earth using beamforming techniques. This is applicable for a period corresponding to the visibility time of the satellite.

(NOTE 2):

This beam size refers to the Nadir pointing of the satellite.

(NOTE 3):

The maximum beam footprint size for GEO is based on the current state of the art GEO high throughput systems, assuming either spot beams at the edge of coverage (low elevation) or a single wide beam.

(NOTE 4):

The use of a circular polarized antenna is optional.

(NOTE 5):

Same noise figure of 7 dB as in Release 16 TR 38.821 or 9 dB as in Release 12 TR 36.888 for a device can be assumed for link budget. The noise figure is device vendor implementation specific.

(NOTE 6):

Max Doppler shift and max Doppler shift variation in the absence of any device pre-compensation of satellite Doppler shift on the service link.

(NOTE 7):

System bandwidth is FFS.

Support for both EPC and 5GC might be possible. All notation of “eNB” in this disclosure can be replaced by “ng-eNB”.

The architecture of E-UTRA connected to 5GC as part of NG-RAN is supported, wherein the term “ng-eNB” is used for E-UTRA connected to 5GC. However, in this disclosure the term “eNB” is used for both cases unless there is a specific need to disambiguate between eNB and ng-eNB.

Table 2 shows the potential area of NB-IoT impacts to support NTN. In order to modify NB-IoT specification to support the NTN deployment scenarios, a method of channel scheduling for NB-IoT in NTN should be provided.

TABLE 2

| NTN specifics | Effects | Impacted NB-IoT features | Comment |
|---|---|---|---|
| Motion of satellites | Moving cell pattern | Paging | Fixed Tracking Area |
| | | Radio Link Failure | Enhancement for link switch, e.g., NW may trigger RLF with NW assistant information |
| | | Early Data Transmission | Enhancement for link switch, e.g., NW may trigger EDT to obtain UE information |
| | | Preconfigured Uplink Resource | Enhancement on RACH-less transmission |
| | Delay variation | TA maintenance | Delay variation indication |
| | Doppler | Random access | UL autonomous frequency adjustment |
| Altitude | Long latency | MAC/RLC Procedures | Timers and RAR window |
| | | UL scheduling (HARQ-ACK) | Scheduling offset enhancement |
| | | Repetition | SIB1, Msg1, Msg3, and NPDCCH timing relationship enhancement |
| | | Wake-up signal | Relation with paging occasions |
| Cell size | Differential delay | Random access | UE autonomous TA adjustment |
| | | Group wake-up signal | Relation with paging occasions |
| | | Resource reservation | No conflict between NB-IoT and NR |
| Duplex scheme | Regulatory | Half-duplex FDD | Scheduling offset enhancement |

SUMMARY

The present disclosure is directed to a method of channel scheduling for NB-IoT in an NTN and a UE using the same.

The disclosure provides a method of channel scheduling for narrowband Internet of Things (NB-IoT) in a non-terrestrial network (NTN), adapted to a user equipment (UE), wherein the method comprising: transmitting an uplink signal ending in a first subframe; determining a monitoring window starting from a second subframe according to the first subframe and a time offset; and monitoring a downlink signal corresponding to the uplink signal according to the monitoring window.

In one embodiment of the disclosure, a difference between the first subframe and the second subframe is greater than or equal to the time offset.

In one embodiment of the disclosure, the difference is equal to the time offset plus a default offset.

In one embodiment of the disclosure, the uplink signal is a narrowband physical uplink shared channel (NPUSCH) and the downlink signal is a narrowband physical downlink control channel (NPDCCH).

In one embodiment of the disclosure, the uplink signal is a random access (RA) preamble and the downlink signal is a random access response (RAR).

In one embodiment of the disclosure, a step of transmitting the uplink signal ending in the first subframe comprising: transmitting the uplink signal via a pre-configured uplink resource.

In one embodiment of the disclosure, the method further comprising: determining the time offset according to a round trip time (RTT) between the UE and a serving base station.

In one embodiment of the disclosure, the method further comprising: determining the time offset according to a round trip time (RTT) between a serving base station and a reference point in a coverage of the serving base station, wherein the reference point comprises one of a serving satellite in a space and a cell center on a ground.

In one embodiment of the disclosure, the method further comprising: receiving a signal, wherein the signal comprises at least one of system information and a radio resource control (RRC) message; and obtaining the time offset from the signal.

In one embodiment of the disclosure, the method further comprising: receiving a second downlink signal ending in a third subframe; determining a fourth subframe according to the third subframe and a second time offset; and transmitting a second uplink signal corresponding to the second downlink signal at the fourth subframe.

In one embodiment of the disclosure, a difference between the third subframe and the fourth subframe is greater than or equal to the second time offset.

In one embodiment of the disclosure, the difference is equal to the second time offset plus a default offset.

In one embodiment of the disclosure, the second downlink signal is a narrowband physical downlink shared channel (NPDSCH) and the second uplink signal is a narrowband physical uplink shared channel (NPUSCH) carrying an acknowledgment (ACK) response or a negative-acknowledgment (NACK) response.

In one embodiment of the disclosure, the second downlink signal is a narrowband physical downlink control channel (NPDCCH) order and the second uplink signal is a random access (RA) preamble.

In one embodiment of the disclosure, the second downlink signal is a system information block (SIB) and the second uplink signal is a narrowband physical random access channel (NPRACH).

In one embodiment of the disclosure, the method further comprising: receiving a second signal, wherein the second signal comprises at least one of a system information block (SIB), a radio resource control (RRC) message, and a medium access control (MAC) control element (CE) command; and obtaining the second time offset from the second signal.

In one embodiment of the disclosure, the method further comprising: determining the second time offset according to a round trip time (RTT) between the UE and a communication device, wherein the communication device comprises one of a serving base station and a serving satellite.

In one embodiment of the disclosure, the method further comprising: determining an uplink transmission timing according to the second time offset and a timing advance (TA) value.

The disclosure provides a user equipment (UE) comprising: one or more non-transitory computer-readable media having computer-executable instructions embodied thereon; and at least one processor coupled to the one or more non-transitory computer-readable media, and configured to execute the computer-executable instructions to: transmit an uplink signal ending in a first subframe; determine a monitoring window starting from a second subframe according to the first subframe and a time offset; and monitor a downlink signal corresponding to the uplink signal according to the monitoring window.

To make the aforementioned more comprehensible, several embodiments accompanied with drawings are described in detail as follows.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DESCRIPTION OF THE EMBODIMENTS

Figure 1:
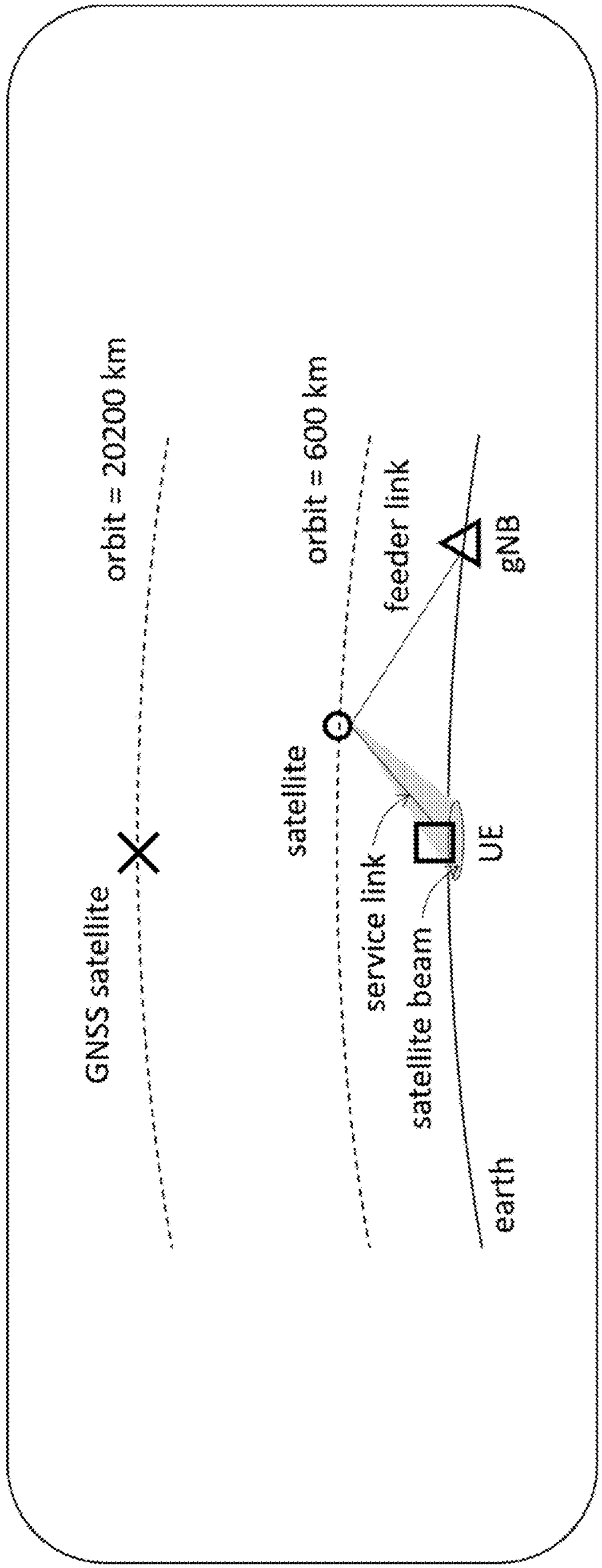
FIG. 1 illustrates a schematic diagram of an NTN with a LEO satellite of transparent payload at orbit 600 km.

The acronyms in the present disclosure are defined as follows and unless otherwise specified, the acronyms have the following meanings:

Acronym Full Name
3GPP 3rd Generation Partnership Project
5GC 5G Core
ACK Acknowledgement
ARQ Automatic Repeat Request
BCH Broadcast Channel
BL Bandwidth Reduced Low Complexity
BS Base Station
BWP Bandwidth Part
C-IoT Cellular Internet of Things
CA Carrier Aggregation
CE Control Element
CN Core Network
CORESET Control Resource Set
CRC Cyclic Redundancy Check
C-RNTI Cell-Radio Network Temporary Identifier
CS Fallback Circuit Switched Fallback
CSG Closed Subscriber Group
DC Dual Connectivity
DCI Downlink Control Information
DL Downlink
DwPTS Downlink Pilot Time Slot
EAB Extended Access Barring
ECM EPS Connection Management
EMM EPS Mobility Management
eNB E-UTRAN Node B
EPS Evolved Packet System
FDD Frequency Division Duplex
FoV Field of View
GBR Guaranteed Bit Rate
GNSS Global Navigation Satellite System
GP Guard Period
GW Gateway
HARQ Hybrid Automatic Repeat Request
HeNB Home eNB
IE Information Element
LAA Licensed-Assisted Access
LCS Location Service
LMU Location Measurement Unit
MAC Medium Access Control
MCG Master Cell Group
MDT Minimization of Drive Tests
MIB Master Information Block
MIMO Multiple Input Multiple Output
MO-EDT Mobile Originated Early Data Transmission
MT-EDT Mobile Terminated Early Data Transmission
NAICS Network Assisted Interference Cancellation/Suppression
NAS Non-Access Stratum
NB-IoT Narrow Band Internet of Things
NG-RAN Next-Generation Radio Access Network
NPBCH Narrowband Physical Broadcast Channel
NPDSCH Narrowband Physical Downlink Shared Channel
NPRACH Narrowband Physical Random-Access Channel
NPSS Narrowband Primary Synchronization Signal
NR New Radio
NSSS Narrowband Secondary Synchronization Signal
NW Network
PCell Primary Cell
PDCCH Physical Downlink Control Channel
PDCP Packet Data Convergence Protocol
PDSCH Physical Downlink Shared Channel
PDU Protocol Data Unit
PHY Physical Layer
PLMN Public Land Mobile Network
PRACH Physical Random-Access Channel
PSS Primary Synchronization Signal
PUCCH Physical Uplink Control Channel
PUR Preconfigured Uplink Resource
PUSCH Physical Uplink Shared Channel
RA Random Access
RACH Random Access Channel
RAN Radio Access Network
RAPID Random Access Preamble Identifier
RAR Random Access Response
Rel Release
RLC Radio Link Control
RNTI Radio Network Temporary Identifier
RRC Radio Resource Control
RTT Round Trip Time
SCell Secondary Cell
SCG Secondary Cell Group
SCS Sub Carrier Spacing
SDAP Service Data Adaptation Protocol
SDU Service Data Unit
SFN System Frame Number
SI System Information
SIB System Information Block
SSS Secondary Synchronization Signal
TA Timing Advanced
TBS Transport Block Size
TDD Time Division Duplex
TS Technical Specification UCI Uplink Control Information
UE User Equipment
UL Uplink
UpPTS Uplink Pilot Time Slot
V2X Vehicle-to-Everything The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used e.g., in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wide-band-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the SGC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

For supporting NTN deployment scenarios, NB-IoT parameters such as motion of space/aerial vehicles, delay variation, Doppler shift, long latency associated with altitude, guard time of duplex scheme, or differential delay associated with cell size should be considered.

Regarding motion of space/aerial vehicles: LEO satellites move rapidly with respect to any given UE location. As an example, on a 2-hour orbit, a LEO satellite is in view of a stationary UE from horizon to horizon for about 20 minutes. For LEO based NTN generating steerable beams (as known as an earth-moving beam), the time such a UE stays within a beam is typically for only a few minutes. The fast pace of change creates problems for paging as well as handoffs for a stationary UE or a moving UE.

Regarding delay variation: LEO systems feature a strong varying delay because satellites or UEs are fast-moving and are not relatively static. In this case, the individual timing advances of the UEs may need to be dynamically updated and appropriate TA index values may be needed to solve the long strong delay in the overall distance of the propagation on the NTN link. The delay variation measures how fast the round-trip delay (the function of UE-satellite-NTN gateway distance) varies overtime when the satellite moves towards/away from the UE. It is expressed in μs/s and is negligible for the GEO scenario. The worst-case for a LEO satellite at an altitude of 600 km is up to +/−40 μs/sec.

Regarding Doppler shift: The Doppler shift depends on the relative satellite velocity with respect to the UE and depends on the frequency band. The worst-case for NTN systems corresponds to LEO systems. At the lowest altitude (i.e., 600 km), wherein the speed of the satellite at the altitude is 7.5 km/s and the NTN terminal velocity is 1000 km/h (e.g., for LEO in S-band (2 GHz)), the Doppler shift may be up to +/−48 kHz in downlink for the whole satellite coverage. If the frequency error robustness requirement is 5 ppm (i.e., 10 kHz for S-band) for the PSS and SSS synchronization, the worst-case described above cannot be covered by current 5G specifications.

Regarding long latency associated with altitude: Satellite systems feature much larger propagation delays than terrestrial systems. The one-way delay between the UE and the RAN may reach up to 272.4 ms for geostationary (GSO) systems and is greater than 14.2 ms for non-geostationary (NGSO) systems. The worst propagation delay is determined based on a minimum gateway elevation angle (i.e., elevation angle of the satellite from the gateway) of 5°, wherein the minimum terminal elevation angle is typically 10°.

Regarding guard time of duplex scheme: Most of the existing satellite systems operate in the frequency bands designated for FDD with defined transmit direction. For duplex-FDD, a guard time is necessary to prevent UE to simultaneously transmit and receive. The guard time directly depends on the propagation delay between UE and eNB. Guard time may range between 14 ms (for LEO at 600 km) and 540 ms (for GEO satellite access networks) since NTN terminals can experience: a one-way propagation time of 240 ms at minimum and 270 ms at maximum between UE and satellite base station for GEO; or a one-way propagation time of 2 ms at minimum and 7 ms at maximum between UE and satellite base station for LEO at 600 km altitude. Such excessive guard time would lead to a very inefficient radio interface especially in GEO based access.

Regarding differential delay associated with cell size: NTN typically feature larger cells compared to cellular networks. These large cells (especially at low operational elevation angles) will create a significant differential propagation delay between a UE at the cell center and a UE at the cell edge, and the ratio of the differential may increase as the altitude of the satellite decreases. The max differential delay within a cell is 10.3 ms for GEO with 3500 km of the footprint size (edge to edge) and 3.12 ms and 3.18 ms for respectively 600 km and 1200 km altitudes with 1000 km of the footprint size. This will impact contention-based access channels if the position of UEs is not known by the network.

1 Physical Layer Aspects 1.1 Timing Relationships

The propagation delays in terrestrial mobile systems are usually less than 1 ms. In contrast, the propagation delays in NTN are much longer, ranging from several milliseconds to hundreds of milliseconds depending on the altitudes of the spaceborne or airborne platforms and payload type in NTN. Dealing with such long propagation delays requires modifications of many timing aspects in NR from the physical layer to higher layers, including the timing advance (TA) mechanism.

Figure 2:
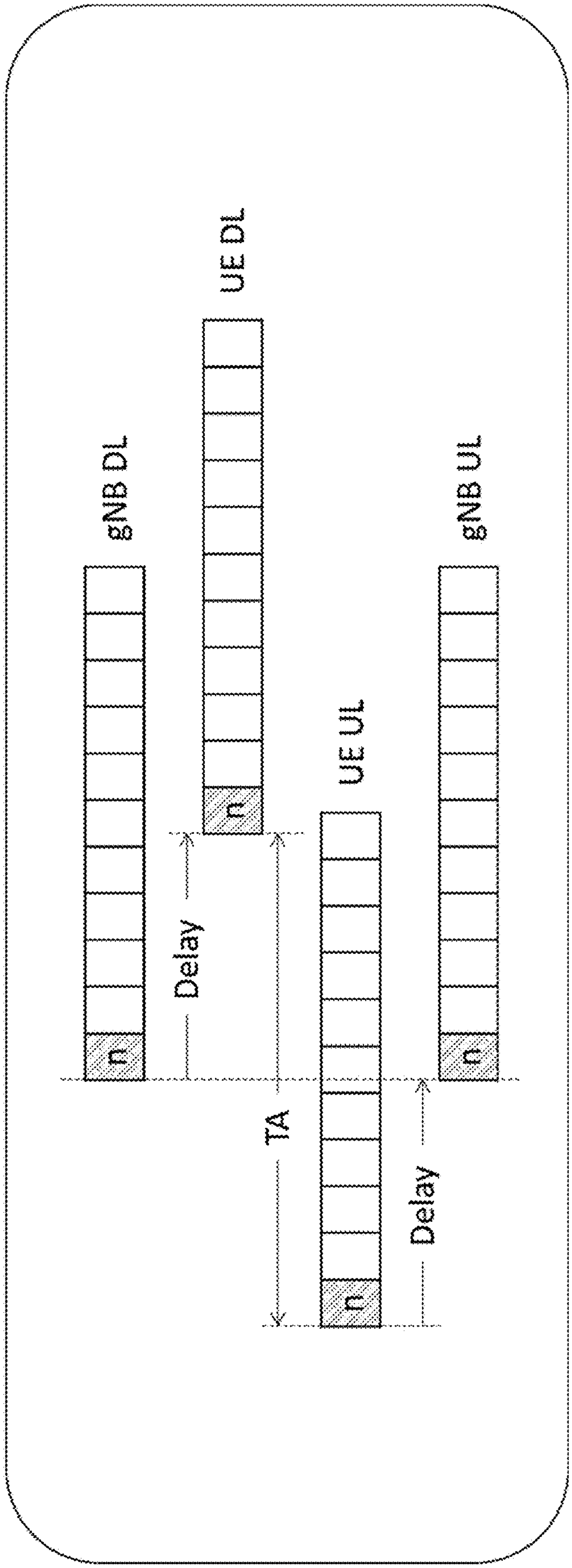
FIG. 2 illustrates a schematic diagram of a scenario wherein the UE applies a large TA and the DL/UL frame timing are aligned at gNB according to one embodiment of the present disclosure.

In NTN, a UE may need to apply a large TA value that leads to a large offset in its DL/UL frame timing. FIG. 2 illustrates a schematic diagram of a scenario wherein the UE applies a large TA and the DL/UL frame timing are aligned at gNB according to one embodiment of the present disclosure.

In one embodiment, since NB-IoT UEs in RRC CONNECTED state have no duty to monitor system information, all the cell specific information, such as satellite ephemeris, dwelling time (i.e., how long a serving cell will continue), cell center/size information, GW location, NTN cell-specific scheduling offset (e.g., K_offset), or NTN cell-specific DL/UL Doppler shift pre-compensation, must be updated by UE-specific RRS message, a MAC CE, or a DCI format signaled from eNB to UE.

1.1.1 Msg1: NPRACH Starting Time

In NTN NB-IoT, a UE may need to apply a large TA value (e.g., 25 ms for LEO with 600 km) to transmit a narrowband random-access preamble. As a result, after the UE determines a valid NPRACH occasion, the NPRACH occasion may become invalid after the TA is applied. For example, the required transmission timing of the random-access preamble may be prior to the reception of SIB1-NB which provides the NPRACH configuration. Accordingly, the NPRACH occasion may become invalid. Otherwise, the NPRACH transmission would be not causal to the NPRACH configuration since the NPRACH transmission is earlier than the NRAPCH configuration reception.

Figure 3:
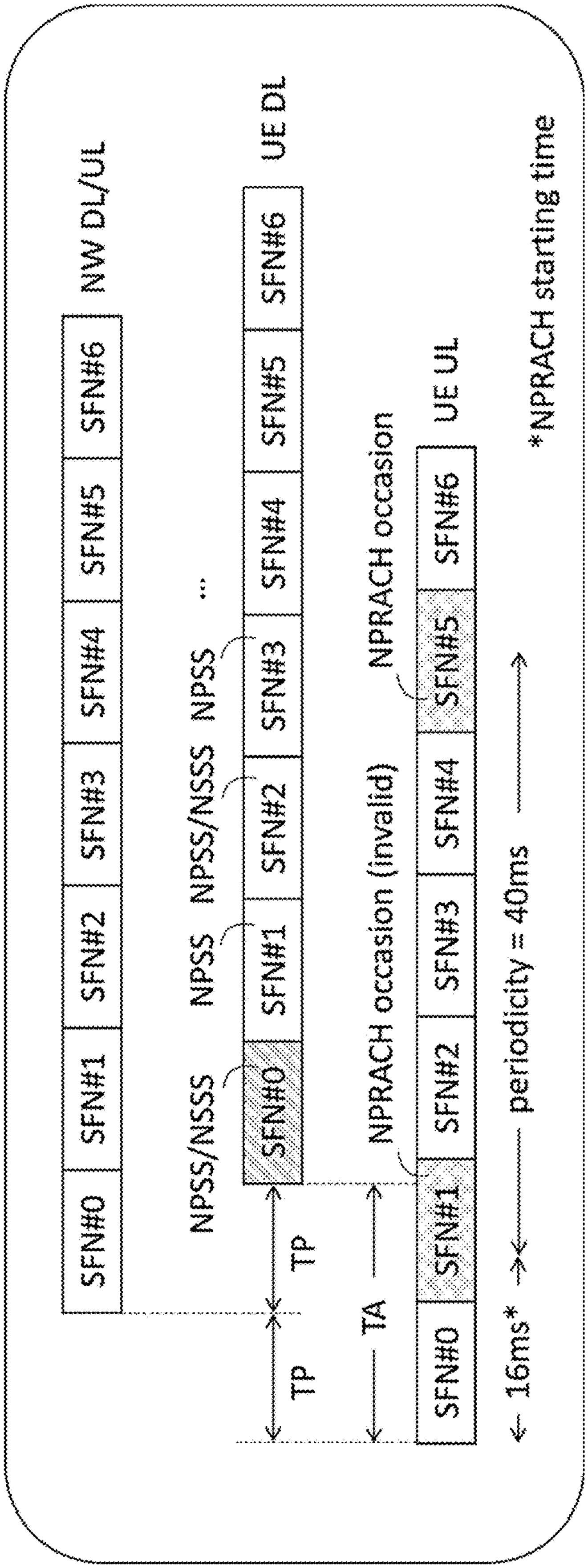
FIG. 3 illustrates a schematic diagram of NPRACH starting time in NTN NB-IoT system according to one embodiment of the present disclosure.

FIG. 3 illustrates a schematic diagram of NPRACH starting time in NTN NB-IoT system according to one embodiment of the present disclosure, wherein “TP” represents propagation delay. The selected NPRACH occasion in system frame number (SFN) #1 of UE UL is before the NPSS reception in SFN #0 of UE DL after the TA is applied, thus the selected NPRACH occasion becomes an unworkable occasion (e.g., non-causal). To make sure a valid NPRACH occasion can be easily selected by the UE, the enhancement can be introducing an offset $K_{offset}$ to modify the relevant timing relationships. It should be noted that SFN can be replaced by time units such as subframe, hyper frame number (HFN), or slot.

For an NTN NB-IoT UE, the initial NPRACH transmission can start $K_{offset}$ time units (e.g., milliseconds or subframes) after the end of a subframe n that has NPDSCH carrying SIB1-NB or SIB, wherein the SIB1-NB or SIB may be required for initialing an access (e.g., NPRACH transmission).

If the UE receives a DL signal ending in a first subframe, the UE may determine a second subframe for transmitting a UL signal corresponding to the DL signal according to $K_{offset}$ and the first subframe, wherein the first subframe is previous to the second subframe, wherein the difference between the first subframe and the second subframe is greater than or equal to $K_{offset}$. For example, assuming that $K_{offset}$=5 SFN. If the UE receives a SIB required for a NPRACH transmission ending in SFN #0 of UE DL, the UE may perform NPRACH transmission corresponding to the SIB in SFN #5 of UE UL, wherein the difference between the SFN #5 and the SFN #0 is equal to $K_{offset}$.

The scheduling offset $K_{offset}$ may be configured to UE by NW via system information (e.g., SIB or SIB1-NB), RRC message, or MAC CE command. Offset $K_{offset}$ may be associated with the worst-case or the longest RTT between the UE and the eNB.

In one embodiment, NTN NB-IoT UE may determine whether an NPRACH occasion is valid by the value of $K_{offset}$ or based on the initial TA determined by the UE that applies for an NPRACH transmission.

In one embodiment, the value of $K_{offset}$ may associate with the initial TA determined by the UE for an NPRACH transmission. For example, $K_{offset}$=the initial TA determined by UE.

In one embodiment, NTN NB-IoT UE refers to an NB-IoT UE that can identify an NTN NB-IoT cell and can camp on the NTN NB-IoT cell, wherein the NTN NB-IoT cell may differentiate from an NB-IoT cell by using different PLMN, PSS, SSS, MIB, SIB, or some other system information as an implicit indication, or by using an explicit indication as a one-bit indicator in system information.

In one embodiment, the scheduling offset $K_{offset}$ may be determined by UE with UE GNSS and satellite ephemeris, wherein the satellite ephemeris may be provided to UE via system information (e.g., SIB1-NB or other SIBs) or may be pre-stored in u-sim of the UE. The satellite ephemeris may be updated via a NAS signaling. The UE may update the satellite ephemeris in response to receiving the NAS signaling.

In one embodiment, the scheduling offset $K_{offset}$ may be determined (by the UE or eNB) according to the RTT between the UE and the eNB, the RTT between the UE and the satellite, or the RTT between the eNB and the satellite.

In one embodiment, an NPRACH occasion is invalid if the transmission timing of the NPRACH preamble overlaps with the previous NPRACH preamble transmission or overlaps with the transmission gap added for the previous NPRACH preamble transmission.

The transmission of a random-access preamble, if triggered by the MAC layer, is restricted to a certain time and frequency resources.

A NPRACH configuration provided by higher layers may contain the following: NPRACH resource periodicity $N_{period}^{NPRACH}$ (prach-Periodicity); frequency location of the first subcarrier allocated to NPRACH $N_{scoffset}^{NPRACH}$ (nprach-SubcarrierOffset); number of subcarriers allocated to NPRACH $N_{sc}^{NPRACH}$ (nprach-NumSubcarriers); number of starting sub-carriers allocated to UE initiated random access $N_{sc\_cont}^{NPRACH}$ (nprach-NumCBRAStartSubcarriers number); of NPRACH repetitions per attempt $N_{rep}^{NPRACH}$ (numRepetitionsPerPreambleAttempt); NPRACH starting time $N_{start}^{NPRACH}$ (nprach-StartTime); or fraction for calculating starting subcarrier index for the range of NPRACH subcarriers reserved for the indication of UE support for multi-tone msg3 transmission $N_{MSG3}^{NPRACH}$ (nprach-SubcarrierMSG3-RangeStart).

An NPRACH transmission can start only $N_{start}^{NPRACH}$ time units after the start of a radio frame fulfilling $o_f$ mod($N_{period}^{NPRACH}$/10)=0. For frame structure type 1, after transmissions of $4\cdot 64(T_{CP}+T_{SEQ})$ time units for preamble formats 0 and 1, or $16\cdot 6(T_{CP}+T_{SEQ})$ time units for preamble format 2, a gap of $40.30720T_s$ time units shall be inserted.

For NTN NB-IoT UE, for the initial transmission of the NPRACH transmission, it may start only $K_{offset}\cdot 30720T_s$ time units after a SIB1-NB detected in subframe n. The UE shall, according to the information in the SIB1-NB, transmit the PRACH preamble after subframe n+$K_{offset}$.

1.1.2 Msg2: RAR Window Starting Time

Table 3 shows subframes between preamble transmission and RA Response (RAR) window in NB-IoT. For an NB-IoT UE, RAR window starts at the subframe that contains the end of the last preamble repetition plus X time units (e.g., subframes) and has length ra-ResponseWindowSize for the corresponding enhanced coverage level, wherein value X may be determined according to Table 3 based on the used preamble format and the number of NPRACH repetitions, and the ra-ResponseWindowSize refers to the duration of the RAR window, for example: ra-ResponseWindowSize-r13 ENUMERATED {pp2, pp3, pp4, pp5, pp6, pp7, pp8, pp10}. Value "pp" may refer to PDCCH period. For example, value pp2 may correspond to 2 PDDCH periods, and value pp3 may correspond to 3 PDCCH periods. For FDD mode, the duration of the RAR window considered by the UE is: ra-ResponseWindowSize=Min (signaled value x PDCCH period, 10.24 s).

TABLE 3

| TDD/FDD mode | Preamble format | Number of NPRACH repetitions | X |
|---|---|---|---|
| FDD | 0 or 1 | >=64 | 41 |
| FDD | 0 or 1 | <64 | 4 |
| FDD | 2 | >=16 | 41 |
| FDD | 2 | <16 | 4 |
| TDD | Any | Any | 4 |

However, the current offset X and the length of the RAR window may not cover the RTT requirements in NTN. As a result, after a UE sends an RA preamble, the UE may lose the corresponding NPDCCH due to the large RTT.

Figure 4:
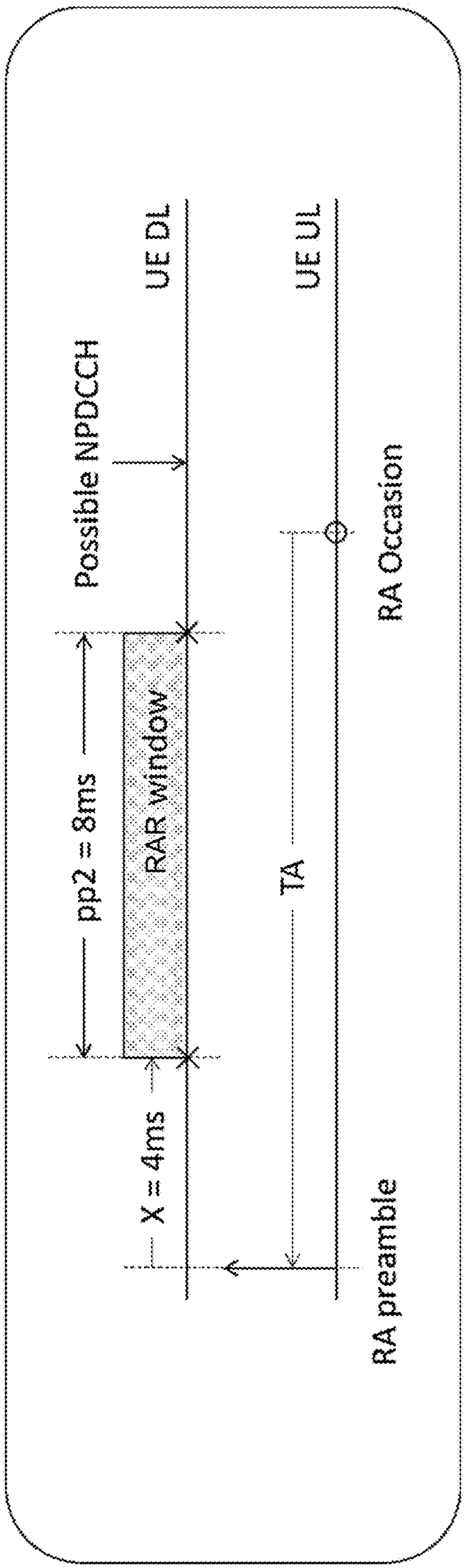
FIG. 4 illustrates a schematic diagram of RAR window starting time according to one embodiment of the present disclosure.

FIG. 4 illustrates a schematic diagram of RAR window starting time according to one embodiment of the present disclosure. Assuming that X=4 ms and RAR window length=pp2. Due to the large TA (e.g., 15 ms) aiming for compensating for the RTT, the NPDCCH response would be lost and be received after the RA occasion outside the RAR window.

Figure 5:
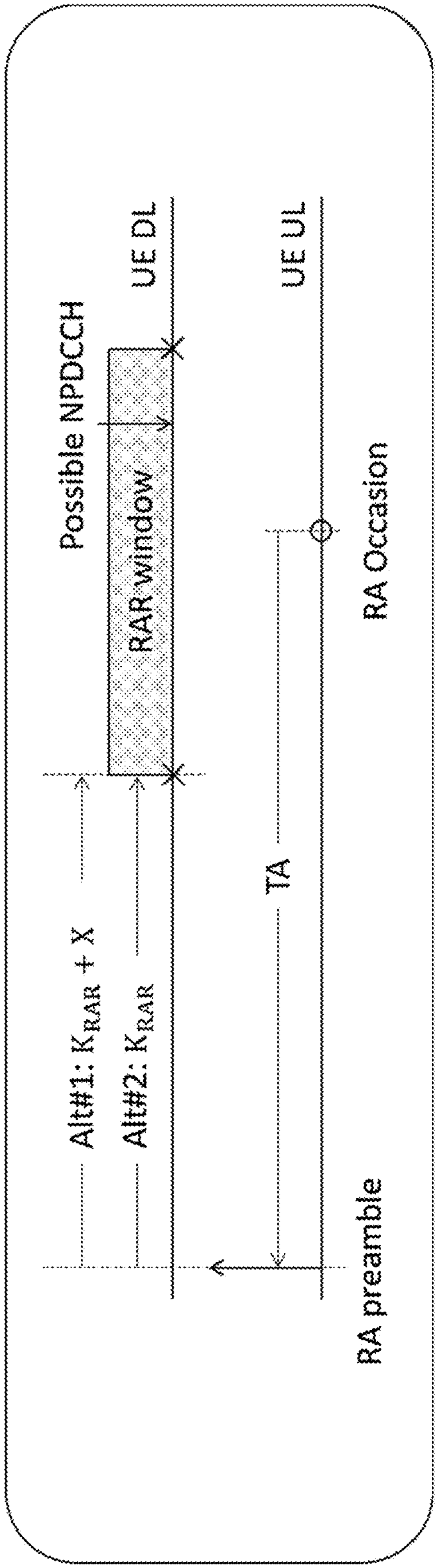
FIG. 5 illustrates a schematic diagram of RAR window starting time according to another embodiment of the present disclosure.

For an NB-IoT UE, if the UE transmits an RA preamble ending in a first subframe (the first subframe contains the end of the last preamble repetition), the UE may determine a RAR window starting from a second subframe according to the first subframe and the time offset KRAR, wherein the first subframe is previous to the second subframe, and the RA preamble may be transmitted via a pre-configured uplink resource. The difference between the first subframe and the second subframe may be greater than or equal to time offset $K_{RAR}$ plus X subframes provided in Table 3 as alternative Alt #1 shown in FIG. 5, or the difference may be greater than or equal to time offset $K_{RAR}$ as Alt #2 shown in FIG. 5. The UE may monitor possible NPDCCH (or RAR) corresponding to the RA preamble according to the RAR window.

The new time offset $K_{RAR}$ may be determined by the UE or eNB based on the RTT between the UE and the serving eNB. The RTT could be decoupled into the service link delay and the feeder link delay. For the service link delay, it could be calculated based on GNSS position acquired by the UE and the serving satellite ephemeris provided via system information by the eNB. For the feeder link delay, it could be obtained by receiving a delay value via system information from the eNB or by receiving the GNSS location of the eNB via system information from the eNB.

In one embodiment, the new time offset $K_{RAR}$ may be provided by NW via system information or an RRC message. In this case, the new time offset $K_{RAR}$ may be determined based on the RTT between the eNB and a reference point in a coverage of the eNB, wherein the reference point may comprise a serving satellite in the space or a center of the serving cell on the ground.

In one embodiment, the new time offset $K_{RAR}$ may comprise different values associated with the configured operation mode (e.g., TDD or FDD mode), preamble format, or the number of NPRACH repetitions.

In one embodiment, the time unit of $K_{RAR}$ may be absolute time such as milliseconds, subframes, slots, or PDDCH periods.

In one embodiment, the new time offset $K_{RAR}$ may be determined based on the TA value applied for transmitting the preamble. For example, the $K_{RAR}$ value may be equal to half of the TA value applied for transmitting the preamble. For another example, the $K_{RAR}$ value may be equal to the sum of half of the TA value applied for transmitting the preamble and a default value. The default value may be pre-configured or pre-specified to the UE. The default value may be associated with PRACH format and/or the number of preamble repetitions. The unit of the default value may be absolute time such as subframe, slot, symbol, etc.

In one embodiment, the new time offset $K_{RAR}$ may be determined based on the TA value applied for transmitting the preamble and latency related to feeder link delay (which may be provided by system information or RRC message). That is the UE may obtain the new time offset $K_{RAR}$ from the system information or the RRC message. In one example, the $K_{RAR}$ value is the sum of half of the TA value applied for transmitting the preamble and the latency.

If the UE is an NB-IoT UE that temps to camp an NTN cell, RAR window may start from the subframe that contains the end of the last preamble repetition plus $X+K_{RAR}$ subframes, and the RAR window may have length ra-ResponseWindowSize for the corresponding enhanced coverage level, wherein the value X may be determined according to Table 3 based on the used preamble format or the number of NPRACH repetitions. $K_{RAR}$ may be determined by UE based on GNSS position acquired by UE and satellite ephemeris provided in system information by eNB.

1.1.3 Msg3: UL-SCH Transmission Timing

For an NB-IoT UE, if an NPDCCH with associated RA-RNTI is detected and the corresponding DL-SCH transport block ending in subframe n contains a MAC Random Access Responses (RAR) to the transmitted preamble sequence, the UE shall, according to the received 15-bit uplink grant in the RAR, transmit a UL-SCH transport block at the end of $(n+k_0)$ DL subframe, wherein $k_0$ may be determined by Table 4 and $k_0$ may represent the number of time unit (e.g., subframe) for the RAR grant for FDD. However, the existing $k_0$ might be insufficient to accommodate the NTN requirement.

TABLE 4

| $I_{Delay}$ | $k_0$ |
|---|---|
| 0 | 12 |
| 1 | 16 |
| 2 | 32 |
| 3 | 64 |

Figure 6:
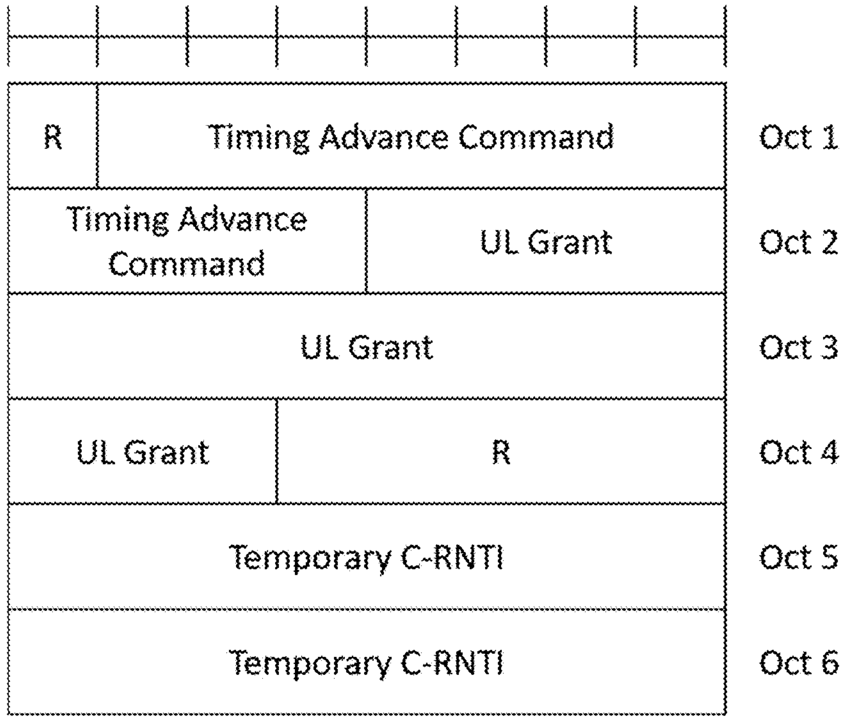
FIG. 6 and FIG. 7 illustrate schematic diagrams of MAC RAR for NB-IoT UE according to one embodiment of the present disclosure.
Figure 7:
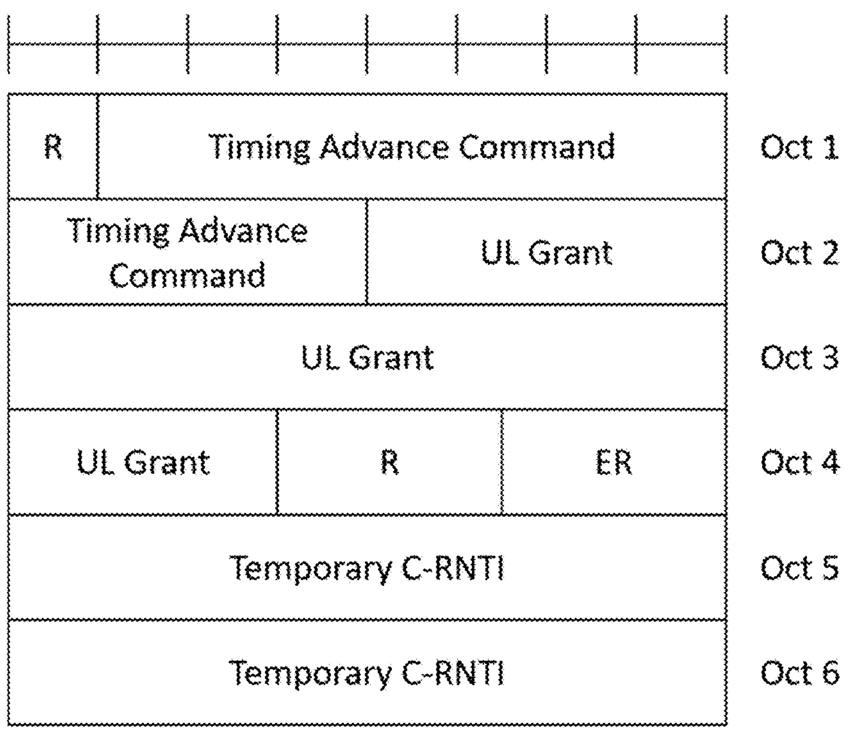

FIG. 6 and FIG. 7 illustrates schematic diagram of MAC RAR for NB-IoT UE according to one embodiment of the present disclosure, wherein "R" represents reserved bits and "ER" represents extended RAPID bits. The MAC RAR consists of TA Command and UL Grant (as shown in FIG. 6 or FIG. 7) according to a transmitted PRACH preamble format. In one embodiment, the UL Grant may have 15 bits and consists of a scheduling delay field ($I_{Delay}$).

When UE receives a TA commend from a RAR message, UE may apply the TA command by adjusting UL transmission timing for NPUSCH or scheduling request (SR). A 11-bit TA command may indicate NTA values by index values of TA=0, 1, 2, . . . , 1536, wherein an amount of the time alignment is given by $N_{TA}=T_{A\times16}$. The max value can be as shown in equation (1), wherein $T_S$=1/30720 is a time unit for NR.

$$1536\times16\times T_S=\frac{1536\times16}{30720}\times1=0.8\text{ ms} \tag{1}$$

Figure 8:
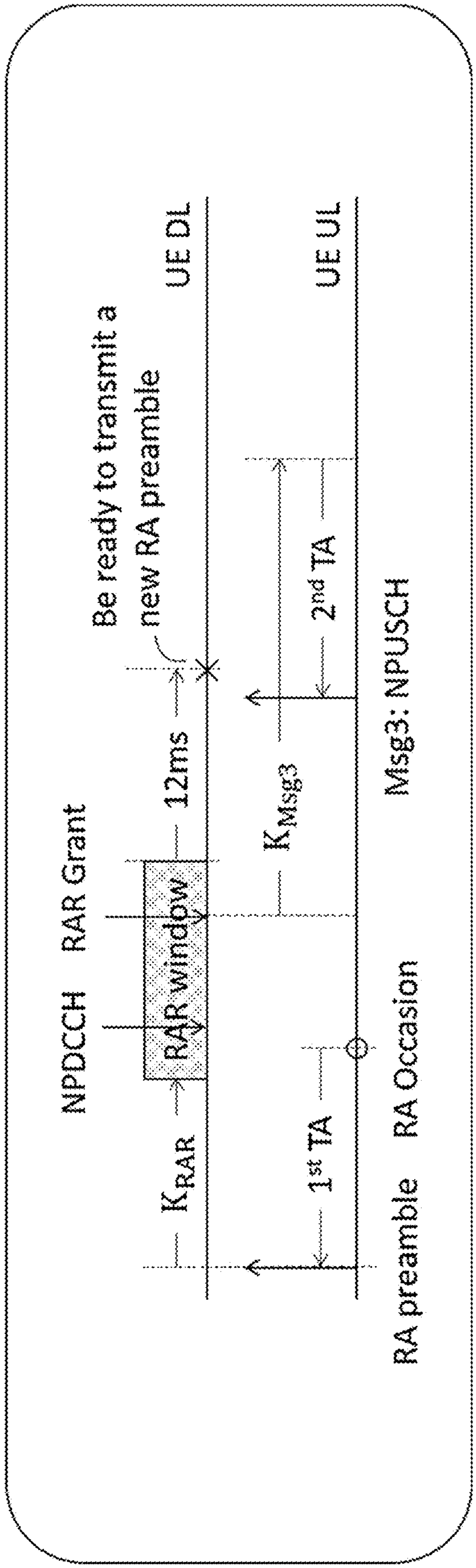
FIG. 8 illustrates a schematic diagram of Msg3 transmission time in NTN NB-IoT according to one embodiment of the present disclosure.

As shown in FIG. 8, the RAR grant shall indicate the Msg3 transmission timing by scheduling offset denoted as $KM_{sg}3$ and meanwhile, UE shall apply the received TA command to adjust its UL transmission timing denoted by $2^{nd}$ TA. The eNB shall ensure sufficient time at the UE side for the Msg3 transmission, e.g., $K_{Msg3}\geq2^{nd}$ TA. However, the eNB may not have prior information about the value of the $2^{nd}$ TA, hence, ensuring sufficient time for the UE would not be straightforward.

Figure 9:
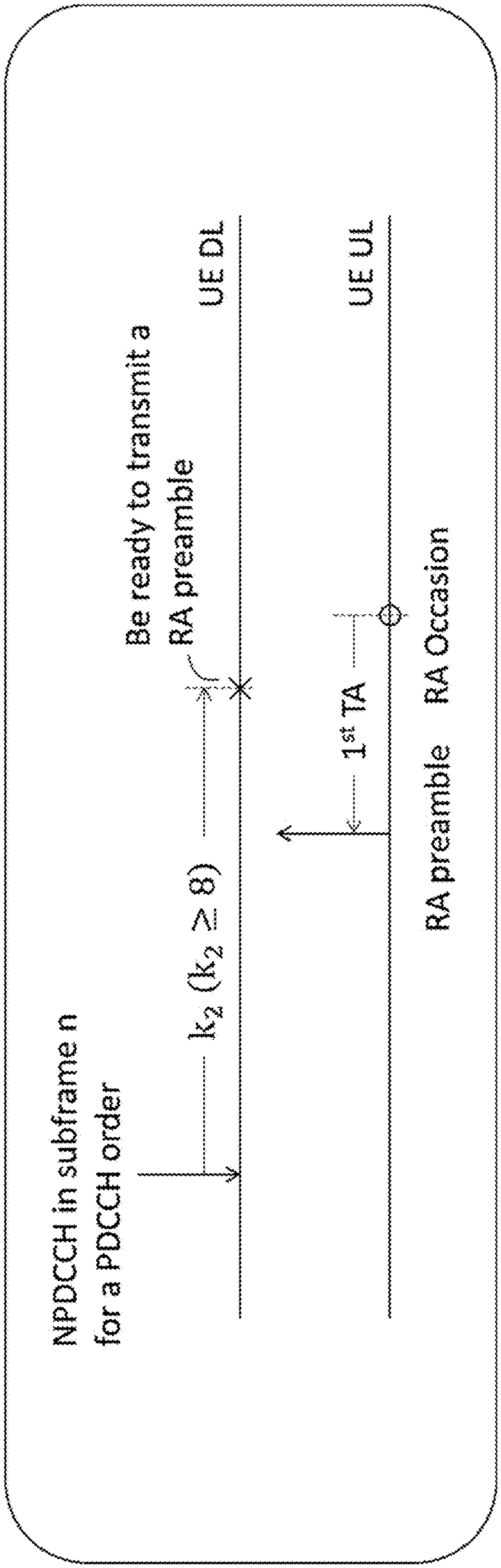
FIG. 9 illustrates a schematic diagram of RA preamble transmission timing for a PDCCH order according to one embodiment of the present disclosure.

Another issue shown in FIG. 9 is that when a PDCCH order is requested by an eNB, the UE shall be ready to transmit a RA preamble at the time of 8 subframes after receiving the PDCCH order. However, regarding a TA value that shall be applied for the NPRACH transmission, the additional offset shall be provided for the UE to postpone an NPRACH occasion selection. The RA occasion shall occur before the UE being ready to transmit the RA preamble.

For an NTN NB-IoT UE, the UE may determine the subframe for transmitting Msg3 based on the UL grant received via Msg2 and the cell-specific time offset $K_{offset}$. Specifically, after the UE receives a MAC RAR or a NPDSCH order (e.g., via the Msg2) corresponding to the transmitted a preamble sequence or a RA preamble (e.g., via the Msg1) ending in subframe n, the UE may transmit a UL-SCH transport block at the end of $n+k_0+K_{offset}$ DL or UL subframe or after the end of $n+k_0+K_{offset}$ DL or UL subframe, wherein $k_0$ may be a default offset. In one embodiment, $k_0$ may equal to 0. In one embodiment, $k_0$ may equal to zero. That is, the difference between the subframe for transmitting Msg3 and the subframe for receiving Msg2 may be greater than or equal to $K_{offset}$.

The new offset $KM_{sg}3$ may be broadcasted in system information such as a SIB (e.g., SIB1-NB or SIB-NB) specific for NTN NB-IoT, an RRC message, or a MAC CE. The eNB shall ensure sufficient time on the UE side for the Msg3 transmission by broadcasting the cell-specific $KM_{sg}3$ broadcasted via system information.

The new time offset $K_{Msg3}$ may be derived from the TA command in MAC RAR message. For example, the value of $K_{Msg3}$ may be the same as the TA value provided in the TA command. For another example, the value of $KM_{Msg3}$ may be the sum of the TA value provided in the TA command and a default value, wherein the default value may be provided by eNB (e.g., via broadcast signaling).

In one embodiment, the scheduling offset $K_{Msg3}$ may be determined (by the UE or eNB) according to the RTT between the UE and the eNB, the RTT between the UE and the satellite, or the RTT between the eNB and the satellite.

In one embodiment, $K_{Msg3}$ may replace $k_0$. That is, the UE shall transmit Msg3 at the end of $n+K_{Mgs3}$ DL subframe or after the end of $n+K_{Mgs3}$ DL subframe. The time unit for $K_{Msg3}$ may be absolute time (e.g., millisecond), subframe, or slots. $K_{Msg3}$ may be pre-determined based on a target NTN scenario. For example, if an NTN NB-IoT UE temps to camp on an LEO-based cell based on PLMN selection, the value of $K_{Msg3}$ may be determined as the worst-case RTT for the LEO-based cell (e.g., 25.77 ms).

In one embodiment, the $2^{nd}$ TA shown in FIG. 8 is determined based on the $1^{st}$ TA value plus the TA command value received from the MAC RAR and further plus the common TA value provided in system information (if provided), wherein the detailed definitions are given below: (1) The $1^{st}$ TA value is a timing advance value determined by UE for the NPRACH transmission based on GNSS location at the UE side and satellite ephemeris provided by the eNB. (2) The TA command value is an adjustment TA value provided to the UE by the eNB based on the NRPACH reception at the eNB side. The TA command value may be negative if an additional indication is provided by the eNB. (3) The common TA value is a compensation value provided to the UE by the eNB, wherein the common TA may be broadcasted in system information. The value of common TA is determined based on whether the DL and the UL frames are timing aligned at the eNB side, whether the TA uncertainty is pre-compensated at the eNB side, or whether the feeder link RTT is included.

In one embodiment, the eNB may provide multiple $K_{Msg3}$ values to the UE via system information. The UE may select one of the $K_{Msg3}$ values based on the selected preamble (e.g., based on different preamble formats or different preamble groups). In this case, the selected preamble may imply UE-eNB RTT information or UE autonomous TA value used for NPRACH transmission. The determination may depend on TDD or FDD mode or the number of NPRACH repetitions as well.

In one embodiment, if a random-access procedure is initiated by a "PDCCH order" ending in subframe n, the UE shall, if requested by higher layers, start a transmission of the random-access preamble at the end of (or after) the first DL or UL subframe $n+k_2+K_{PDCCHorder}$ if an NPRACH resource for the RA preamble is available, wherein $k_2 \geq 8$. The $K_{PDCCHorder}$ may be provided to the UE by the eNB via system information or an RRC message.

In one embodiment, NW may provide a time variation value for a given TA command e.g., [TA command, TA rate]=[$(1\times16)T_S$, −40 μs/sec]. If the time variation value is provided, the UE may adjust its UL timing based on the TA command and the TA rate.

If an NPDCCH with associated RA-RNTI is detected by the UE and the corresponding DL-SCH transport block ending in subframe n contains a response corresponding to the transmitted preamble sequence, the UE shall, according to the information in the response, transmit a UL-SCH transport block at the end of (of after) $n+k_0+K_{Msg3}$ UL or DL subframe for FDD. $K_{Msg3}$ may be provided by system information with a range of positive or negative values e.g., [−CP/2, max RTT], where the CP refers to a cyclic prefix of an OFDM symbol e.g., the normal CP length is 4.7 μs for SCS equal 15 kHz.

For an NTN NB-IoT UE, an 11-bit timing advance command TA in the RA response may be used by the UE to adjust the current NTA values used for the NPRACH transmission $N_{TA,OLD}$ to the new value $N_{TA,NEW}$, as shown in equation (2), wherein $T_A$=1, 2, 3, . . . , 1536. A range offset is given by $N_{offset}$=0, 1, 2, . . . , 1536. If $N_{offset} \neq 0$, the adjustment of $N_{TA}$ value by a positive or a negative amount TA indicates advancing or delaying of the uplink transmission timing by the given amount TA, respectively.

$$N_{TA,NEW}=N_{TA,OLD}+(T_A-N_{offset})\times16 \quad (2)$$

1.1.4 Msg4: Contention Resolution

A UE shall monitor NPDCCH during a contention resolution (CR) window configured by an eNB. The CR window is controlled by a CR timer provided by an RRC parameter mac-ContentionResolutionTimer. The values of mac-ContentionResolutionTimer may be configured as pp1, pp2, pp3, pp4, pp8, pp16, pp32, or pp64.

Figure 10:
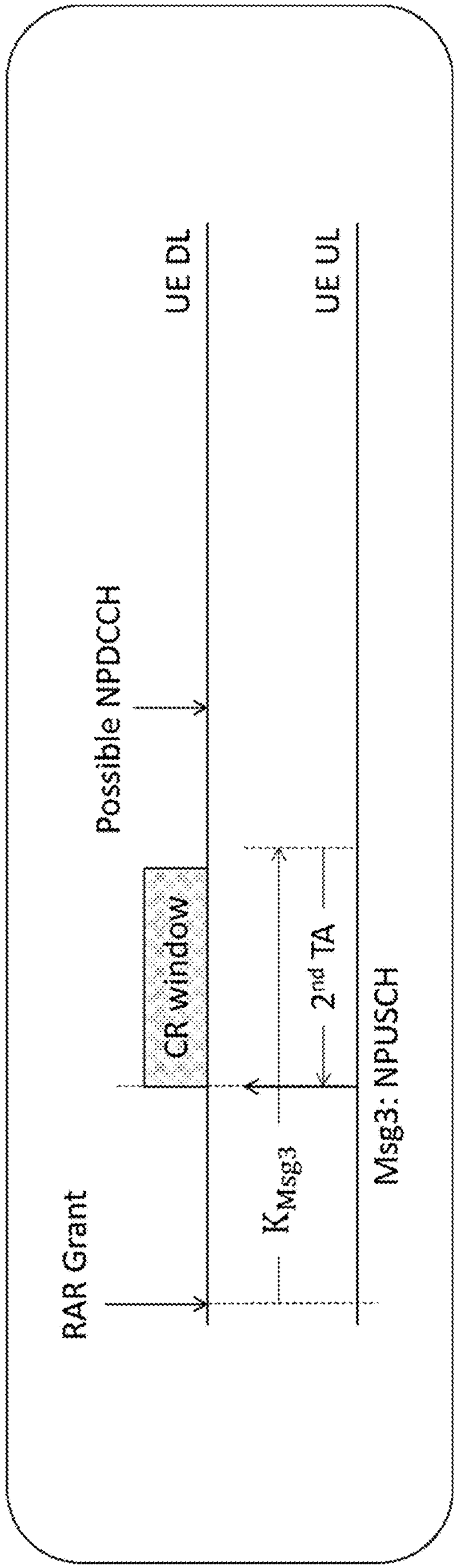
FIG. 10 illustrates a schematic diagram of CR window starting time in NTN NB-IoT according to one embodiment of the present disclosure.

Once the Msg3 is transmitted, the UE shall start or restart a CR timer at each HARQ retransmission of the bundle in the subframe containing the last repetition of the NPUSCH transmission corresponding to the Msg3. If the CR timer expires before the UE receiving NPDCCH (or Msg4), the UE may consider this CR is not successful. However, as shown in FIG. 10, the CR window may start too early to receive the possible NPDCCH reception. Regarding propagation delay, the CR window shall start a minimum RTT between the UE and the eNB after the Msg3 being transmitted.

After the NPUSCH (i.e., Msg3) being transmitted (e.g., via a pre-configured UL resource), the UE may determine the CR window (i.e., start or restart the CR timer) according to the subframe n and an time offset $K_{Msg4}$, wherein the subframe n contains the last repetition of the corresponding PUSCH transmission (i.e., Msg3), and the time offset $K_{Msg4}$ may be provided to the UE by the eNB. The time offset $K_{Msg4}$ may be transmitted to the UE via system information or an RRC message. The CR window may start from the end of the UL subframe $n+K_{Msg4}$. The difference between the start of the CR window and the subframe n may be greater than or equal to time offset $K_{Msg4}$. The UE may monitor the possible NPDCCH (i.e., Msg4) during the CR window. The time unit of $K_{Msg4}$ may be absolute time such as milliseconds, subframes, or slots.

Another presentation may be based on the corresponding DL subframe index regardless of timing advance, for example, the UE may start or restart the CR timer after the end of the DL subframe n, where the DL subframe n is selected based on the corresponding UL subframe n containing the last repetition of the corresponding PUSCH transmission.

Figure 11:
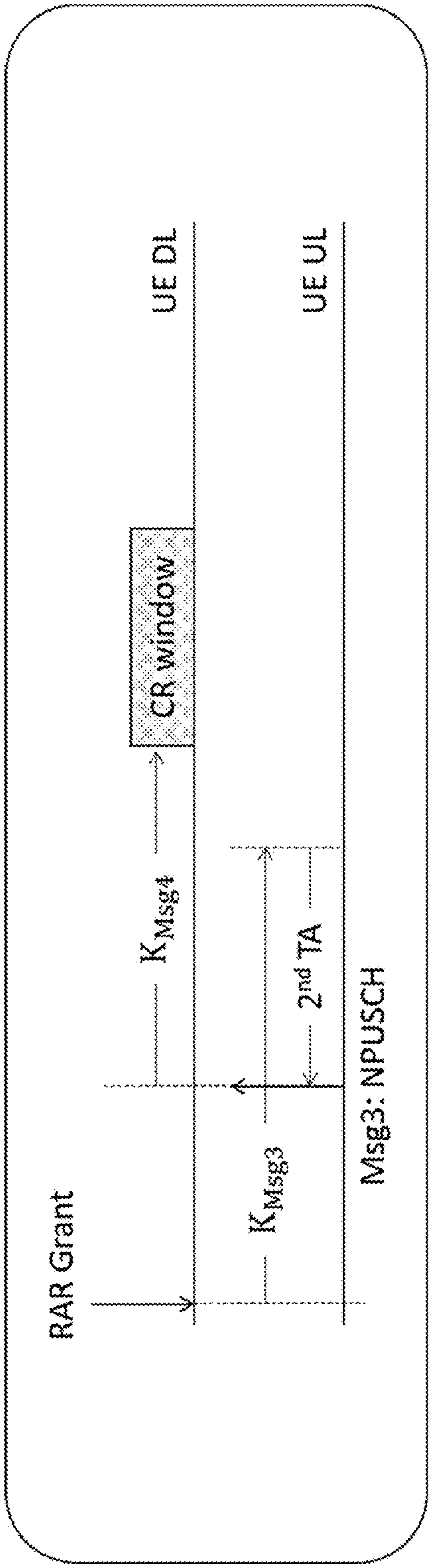
FIG. 11 illustrates a schematic diagram of an offset-based enhancement on the CR window according to one embodiment of the present disclosure.

As shown in FIG. 11, once Msg3 is transmitted, the UE may wait $K_{Msg4}$ to start the CR window. The value of $K_{Msg4}$ may be determined based on UE-eNB RTT. For example, the value of $K_{Msg4}$ may be determined according to $2^{nd}$ TA value used for the Msg3 transmission, as shown in FIG. 11. For another example, the value of $K_{Msg4}$ may be determined according to $2^{nd}$ TA value plus a common TA, wherein the common TA may be used for the compensation of the feeder link RTT or uncertainty.

The time offset $K_{Msg4}$ may be determined by the UE or eNB based on the RTT between the UE and the serving eNB. The RTT could be decoupled into the service link delay and the feeder link delay. For the service link delay, it could be calculated based on GNSS position acquired by the UE and the serving satellite ephemeris provided via system information by the eNB. For the feeder link delay, it could be obtained by receiving a delay value via system information from the eNB or by receiving the GNSS location of the eNB via system information from the eNB.

In one embodiment, the time offset $K_{Msg4}$ may be provided by NW via system information or an RRC message. In this case, the time offset $K_{Msg4}$ may be determined based on the RTT between the eNB and a reference point in a coverage of the eNB, wherein the reference point may comprise a serving satellite in the space or a center of the serving cell on the ground.

Contention resolution is based on either C-RNTI on PDCCH of the SpCell or UE contention resolution identity on DL-SCH. Once Msg3 is transmitted, the UE may perform the steps as shown in Table 5.

TABLE 5

| |
|---|
| 1> if the UE is an NB-IoT UE, a BL UE, a UE in enhanced coverage, or an NTN NB-IoT UE: |
| 2> if, for EDT, edt-SmallTBS-Enabled is set to TRUE for the corresponding PRACH resource: |
| 3> start or restart mac-ContentionResolutionTimer at each HARQ retransmission of the bundle in the subframe corresponding to the last subframe of a PUSCH transmission corresponding to the largest TBS indicated by the UL grant. |
| 2> else If the UE is an NTN NB-IoT UE: |
| 3> start or restart mac-ContentionResolutionTimer at each HARQ retransmission of the bundle in the subframe that contains the last repetition of the corresponding NPUSCH transmission plus $K_{Msg4}$ subframes. |
| 2> else: |
| 3> start or restart mac-ContentionResolutionTimer at each HARQ retransmission of the bundle in the subframe containing the last repetition of the corresponding PUSCH transmission. |
| 1> else: |
| 2> start or restart mac-ContentionResolutionTimer at each HARQ retransmission |

1.1.5 Maintenance of Uplink Time Alignment

Figure 12:
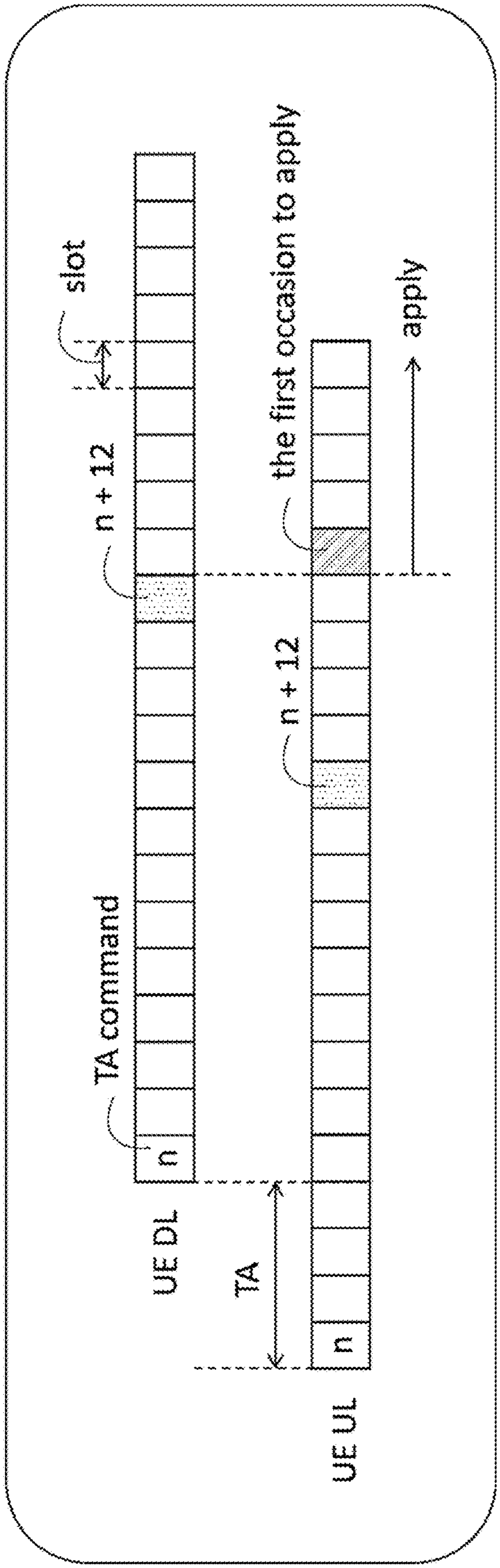
FIG. 12 illustrates a schematic diagram of timing to apply a TA command in NB-IoT according to one embodiment of the present disclosure.

For a TA command reception ending in DL subframe n, the corresponding adjustment of the UL transmission timing shall apply from the first available NB-IoT uplink slot following the end of n+12 DL subframe, wherein the first available NB-IoT uplink slot is the first slot for an NPUSCH transmission. FIG. 12 illustrates a schematic diagram of timing to apply a TA command in NB-IoT according to one embodiment of the present disclosure.

When the UE's UL NPUSCH transmissions in UL slot n and UL slot n+1 are overlapped due to the timing adjustment, the UE may complete the transmission of UL slot n and not transmit the overlapped part of UL slot n+1.

Figure 13:
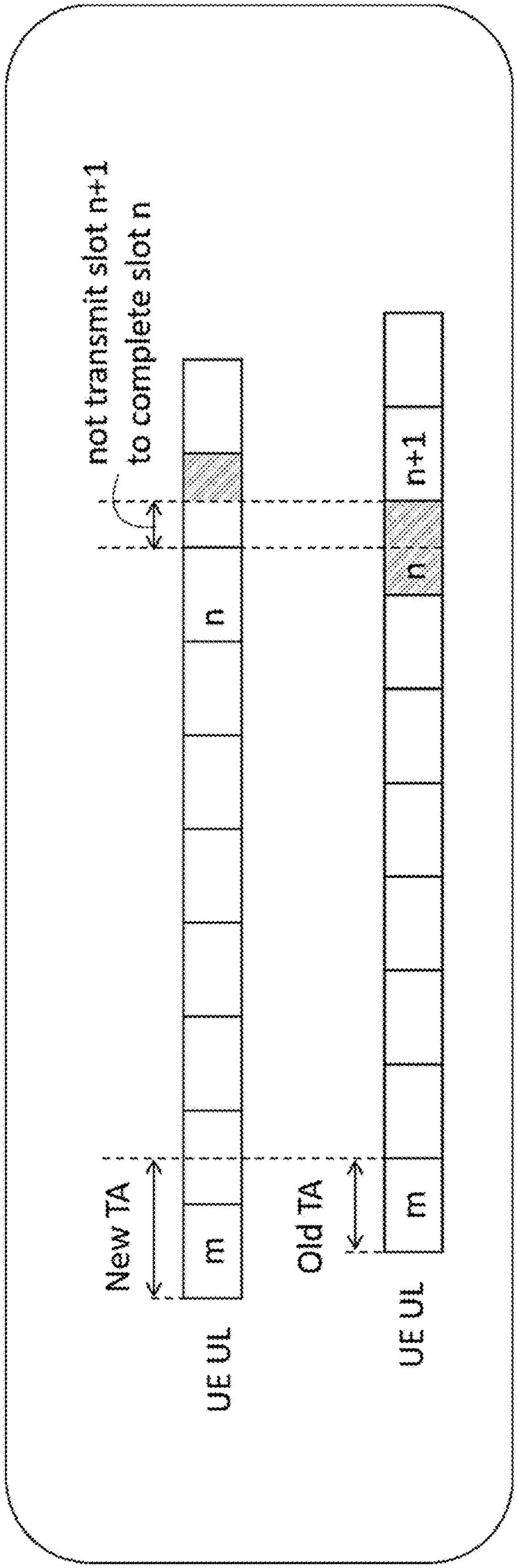
FIG. 13 illustrates a schematic diagram of stopping overlapped UL transmission due to the timing adjustment in NB-IoT according to one embodiment of the present disclosure.

Referring to FIG. 13, an NPUSCH transmission in UL slot n+1 has been stopped partially due to the timing adjustment. If the maximum adjustment received by the UE from a TA command is shorter than one slot, then the current 3GPP specifications is not broken. However, if the maximum adjustment of a TA command is longer than one slot, e.g., due to introducing a scaling factor as shown in equation (3), there may be an overlap among multiple UL slots greater than two continuous UL slots. In this case, the current specification would be broken.

$$N_{TA,NEW}=N_{TA,OLD}+(X_{scale\text{-}factor}\times T_A-N_{offset})\times 16 \quad (3)$$

Figure 14:
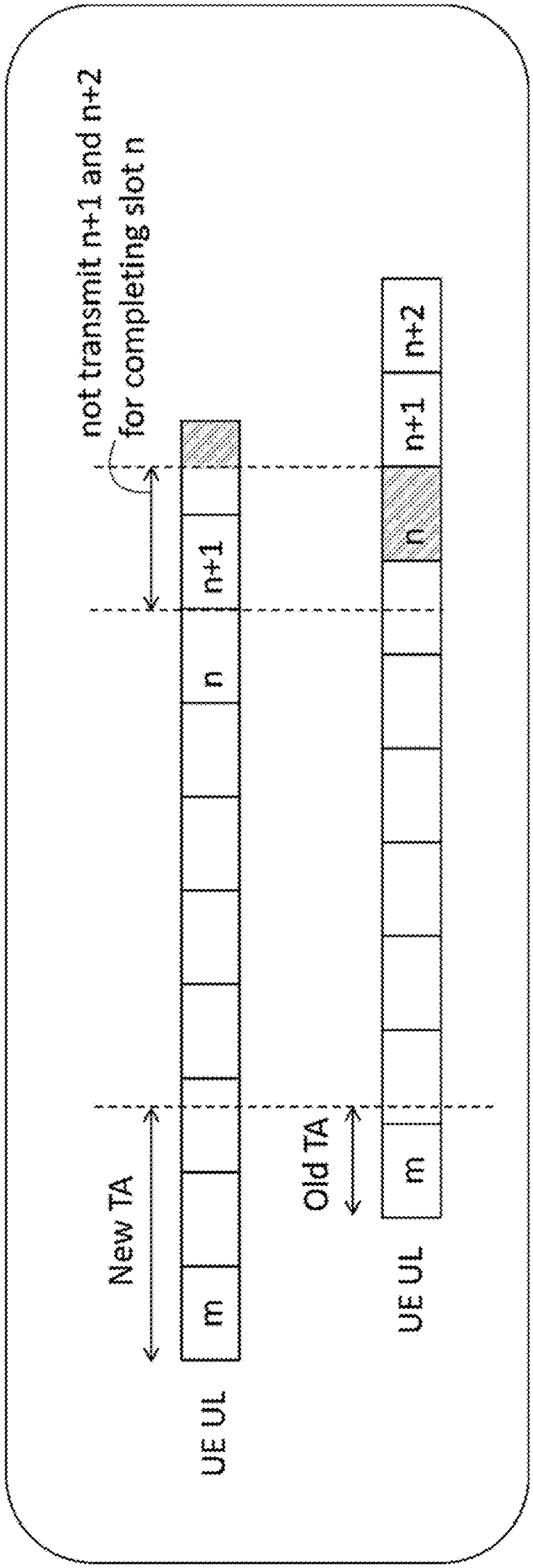
FIG. 14 illustrates a schematic diagram of UL transmission overlap among multiple slots due to the TA adjustment larger being larger than one slot according to one embodiment of the present disclosure.

FIG. 14 illustrates a schematic diagram of UL transmission overlap among multiple slots due to the TA adjustment larger being larger than one slot according to one embodiment of the present disclosure. In this case, the UL transmission in both UL slot n+1 and part of UL slot n+2 may not be transmitted since they overlap with the UL transmission in slot n. Unfortunately, the current specifications cannot solve this problem.

If UL slot n and UL slot n+k are overlapped due to the timing adjustment, the UE may complete transmission of UL slot n and not transmit UL slots from n+1 to n+k−1 and the overlapped part of UL slot n+k.

In one embodiment, a scheduling gap may be configured between a PUSCH using the old TA and a PUSCH transmission using the new TA. The scheduling gap may be greater than or equal to the maximum TA change which may be given by a single TA command from NW.

In one embodiment, if the UE is an NTN NB-IoT UE, when the UE's UL NPUSCH transmissions in UL slot n and UL slot n+k are overlapped due to the timing adjustment, the UE may complete transmission of UL slot n, not transmit the overlapped part of UL slot n+k, and not transmit data from UL slots n+1 to UL slot n+k−1.

1.1.6 Maintenance of Uplink Time Alignment

For an NB-IoT UE, in response to detecting, on a given serving cell, an NPDCCH with DCI format N0 at the end of NB-IoT DL subframe n for scheduling NPUSCH intended for the UE, the UE may perform, at (or after) the end of DL subframe n+$k_0$ for FDD, a corresponding NPUSCH transmission by using NPUSCH format 1 in N consecutive NB-IoT UL slots according to the NPDCCH information, wherein the value of $k_0$=8, 16, 32, 64 may be indicated in the DCI format.

Figure 15:
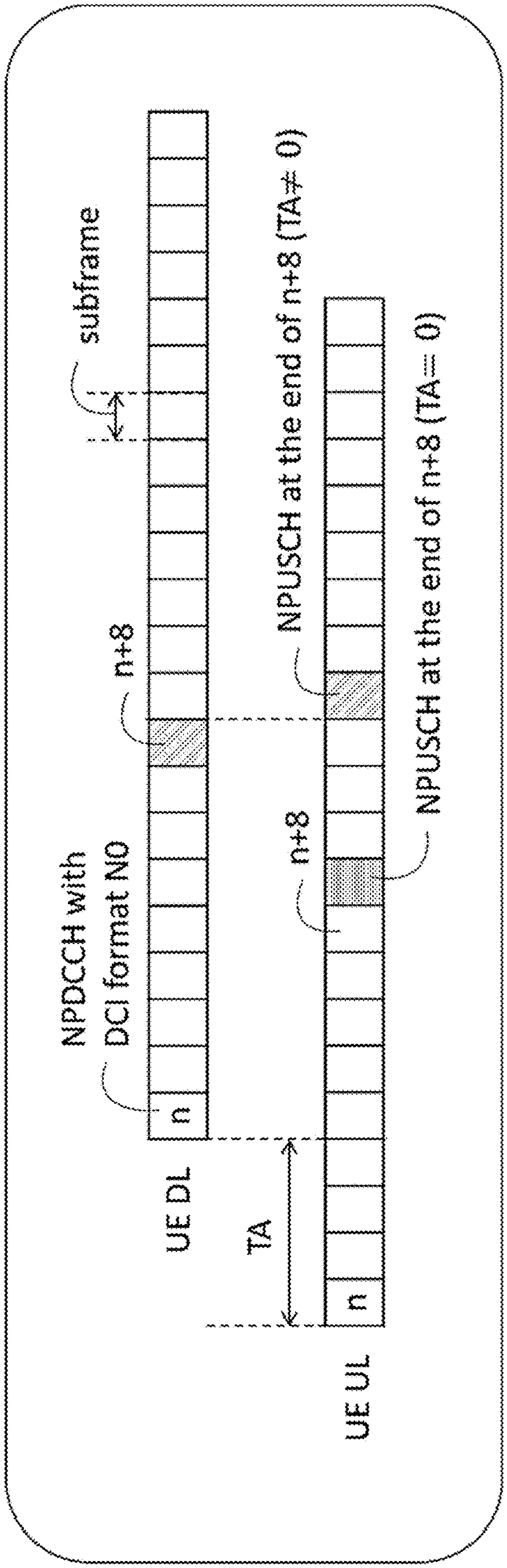
FIG. 15 illustrates a schematic diagram of NPUSCH scheduling in NB-IoT according to one embodiment of the present disclosure.

As shown in FIG. 15, if the specification context describes transmission timing with TA≠0 denoted by Actual Timing, since the scheduling offset $k_0$ is used to indicate a DL subframe, there would be no scheduling error. That is, an NPUSCH transmission may be scheduled prior to the NPDCCH reception even if a large TA is required. However, if the specification context aims for Logical Timing assuming TA=0, the scheduling error cannot be avoided.

Figure 16:
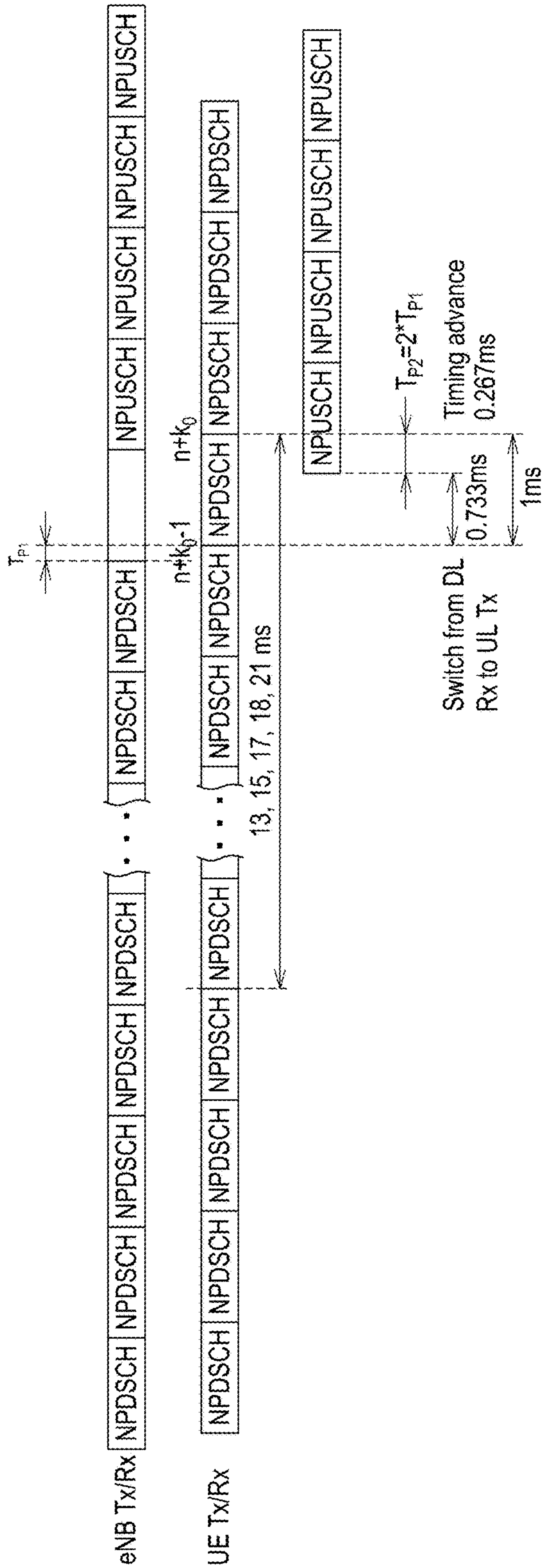
FIG. 16 illustrates a schematic diagram of two HARQ process in DL with TA of 0.267 ms according to one embodiment of the present disclosure.

Another reason to support a new scheduling offset is that in NB-IoT, the minimum switch time from DL RX to UL TX of UE is given by 1 ms. The switch time (or so called the Type B half-duplex guard periods) may be reduced by a TA value. As shown in FIG. 16, the switch time form DL RX to UL TX is reduced to 0.733 ms when TA (i.e., $T_{P2}$) is 0.267 ms.

Another issue is due to a limited number of HARQ processes supported by NB-IoT and the long RTT requirement for NTN, additional flexibility on DL and UL scheduling may be needed to prevent HARQ stalling.

Figure 17:
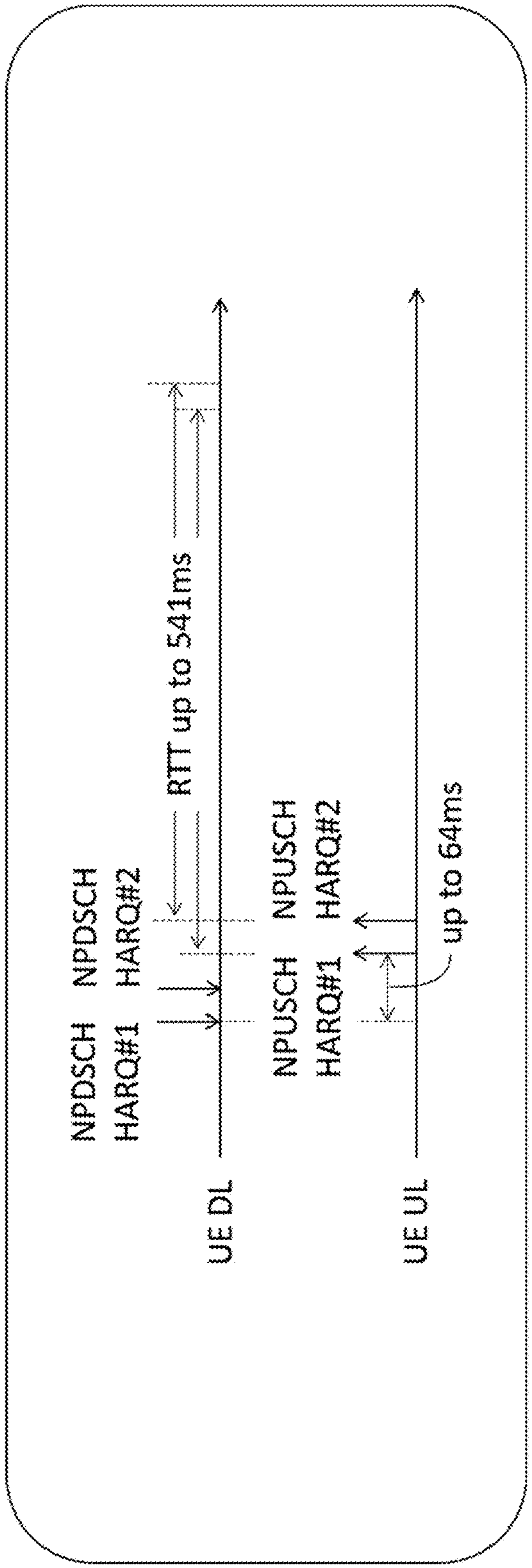
FIG. 17 illustrates a schematic diagram of HARQ stalling for the max number of two HARQ processes according to one embodiment of the present disclosure.

FIG. 17 shows an issue of HARQ stalling for the GEO-based NW, wherein an NB-IoT UE may experience up to 541 ms of RTT. If the NB-IoT UE only supports one HARQ process, the UE may suffer 541 ms HARQ stalling. That is, the only HARQ ID has been occupied such that no schedule can be processed. If the NB-IoT UE supports two HARQ processes, the HARQ stalling may still happen with a range of around 270 ms to 540 ms. Although data throughput may not be the main target of NTN NB-IoT, supporting of more HARQ processes or HARQ-ACK disabling may provide better flexibility.

Another issue is that the maximum scheduling offset $k_0$ is given by 64 ms, which is only one-ninth of the worst-case RTT of 541 ms for GEO-based NW. For better scheduling flexibility to support more than one HARQ process, a scaling factor or increasing more bits to scale the scheduling offset $k_0$ may be needed.

If the UE is an NTN NB-IoT UE, the UE could be configured with scheduling offset additional to $k_0$, for example, the UE shall upon detection on an NPDCCH with DCI format N0 ending in DL subframe n scheduling NPUSCH, perform, at the end of $n+k_0+K_{NTN}$ DL subframe, wherein $K_{NTN}$ is a scheduling offset provided by the eNB (e.g., via an RRC message).

If the UE is an NTN NB-IoT UE, the UE could be configured with more than two HARQ processes. The configurable HARQ number depends on a UE capability report carried via an RRC message by the IE UECapabilityInformation.

When more than two HARQ processed are configured, the UE may receive DCI format N1 or N0 with CRC scrambled by NTN-RNTI, where the HARQ process number field may contain more than 1 bit to indicate a HARQ process ID.

In one embodiment, when more than two HARQ processed are configured, the UE may receive DCI format Ni or N0 in a subframe n of a system radio frame m. The UE may determine a HARQ process ID based on the HARQ process number field in the DCI format N1 or N0 and the index of subframe n or system radio frame m.

If the UE is an NTN NB-IoT UE, the UE may be configured with one or more HARQ process that requires no HARQ-ACK feedback and may be reused by NW without waiting for any HARQ-ACK feedback. The configuration might be via an RRC message that contains a list of HARQ process numbers, where any HARQ process number on the list would not require to generate HARQ-ACK feedback for an associated TB. In one example, for the same TB transmitted without HARQ-ACK feedback, a (pre-)determined/(pre-)configured number of blind retransmissions may be performed.

In one embodiment, in RRC CONNECTED, the UE may be indicated by NW to disable or enable HARQ-ACK feedback on a per UE basis. The indication may be transmitted via an RRC message, a MAC-CE commend, or a DCI format.

If the UE is an NTN NB-IoT UE, the UE may be configured with a scaling factor X to extend the length of the offset $k_0$, for example, if the scaling factor X is provided, the UE shall upon detection on an NPDCCH with DCI format N0 ending in DL subframe n scheduling NPUSCH, perform, at the end of $n+Xk_0$ DL subframe, wherein X=1, 2, 3, 4.

In one embodiment, the scheduling offset $k_0$ may contain more than 2 bits when the UE receives a DCI format N0 with CRC scrambled by NTN-RNTI.

For an NTN NB-IoT UE, NW shall ensure the UE having sufficient switch time from DL RX to UL TX after the TA is applied by, for example, introducing a gap without transmission and reception for the UE to switch from DL RX to UL TX, wherein the gap is between the last NPDSCH reception and the first NPUSCH transmission after the required TA is applied.

An NTN NB-IoT UE shall upon detection on a given serving cell of an NPDCCH with DCI format N0 ending in NB-IoT DL subframe n scheduling NPUSCH intended for the UE, perform, at the end of $n+X \cdot k_0+K_{NTN}$ DL subframe for FDD, wherein scaling factor X and scheduling offset $K_{NTN}$ are provided by the eNB via an RRC message.

1.1.7 Reporting ACK/NACK

Figure 18:
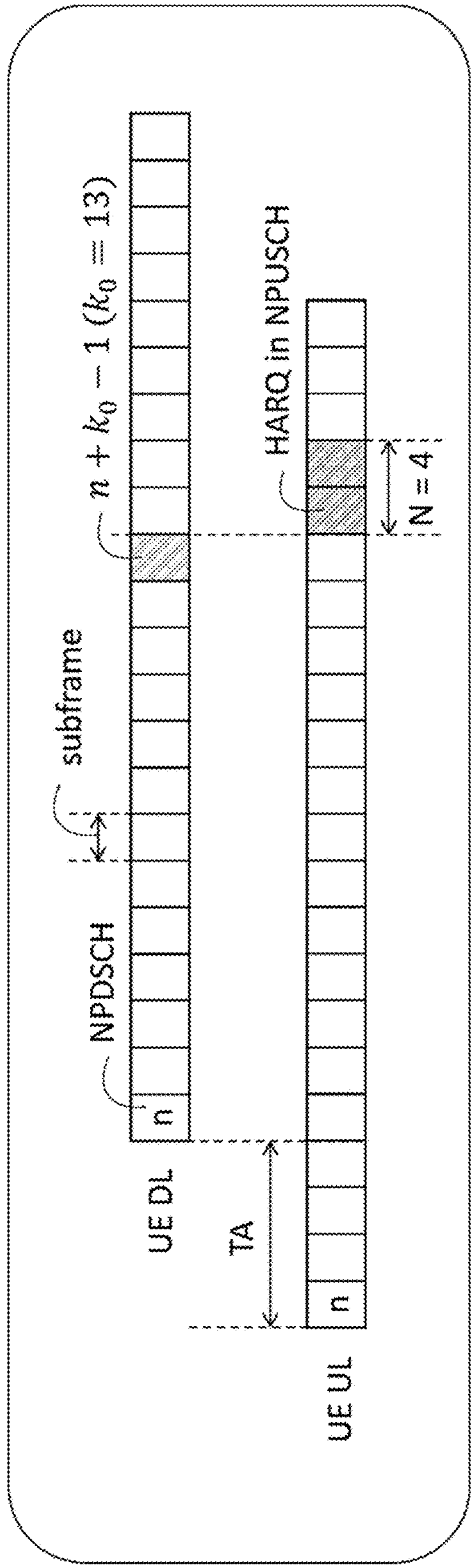
FIG. 18 illustrates a schematic diagram of reporting ACK/NACK in NB-IoT according to one embodiment of the present disclosure.

The UE shall upon detection of an NPDSCH transmission ending in NB-IoT subframe n intended for the UE and for which an ACK/NACK shall be provided, start, after the end of $n+k_0-1$ DL subframe for FDD (as shown in FIG. 18), the transmission of the NPUSCH carrying ACK/NACK response, and the UE shall start the transmission of the SR (if any) if the serving cell is FDD and the UE is configured with higher layer parameter sr-with-HARQ-ACK-Config, wherein parameter sr-with-HARQ-ACK-Config maybe indicated by NPUSCH format 2 in N consecutive NB-IoT UL slots.

Although an ACK/NACK is carried by an NPUSCH transmission, the scheduling offset is different from the NPUSCH that is one subframe before subframe $n+k_0$ (e.g., $k_0$=13, 15, 17, 18) according to subcarrier spacing, ACK/NACK resource field, or ACK/NACK subcarrier in the DCI format.

However, if the current 3GPP specification aims for the Logical Timing assuming TA=0, some enhancement is needed. Also, due to a limited number of HARQ processes (e.g., the max number of 2) supported by NB-IoT and the long RTT requirement for NTN, additional flexibility on DL and UL scheduling might be needed to prevent HARQ stalling.

Add a new scaling factor or scheduling offset on top of $k_0$. The scaling factor and the new offset may contain multiple values according to subcarrier spacing, ACK/NACK resource field, or ACK/NACK subcarrier in the DCI format.

If a UE is an NTN NB-IoT UE, the UE shall upon detection of an NPDSCH transmission ending in NB-IoT subframe n intended for the UE and for which an ACK/NACK shall be provided, start, after the end of $n+X \cdot k_0-1+K_{NTN}$ DL subframe for FDD, the transmission of the NPUSCH carrying ACK/NACK response, and the UE shall start the transmission of SR (if any) if the serving cell is FDD and the UE is configured with higher layer parameter sr-with-HARQ-ACK-Config, wherein parameter sr-with-HARQ-ACK-Config may be indicated by NPUSCH format 2 in N consecutive NB-IoT UL slots, wherein X may be a scaling factor provided by the eNB via an RRC message and $K_{NTN}$ may be scheduling offset provided by the eNB via an RRC message, a MAC CE commend, or a DCI format.

In other words, after the UE receiving an NPDSCH transmission ending in subframe n, the UE may determine a subframe for transmitting NPUSCH corresponding to the NPDSH according to the subframe n, scaling factor X, and time offset $K_{NTN}$. NPUSCH may carry ACK or NACK response. The time offset $K_{NTN}$ may be transmitted to the UE via a SIB (e.g., SIB-NB or SIB1-NB), an RRC message, or a MAC CE.

In one embodiment, the time offset $K_{NTN}$ may be determined according to a TA value corresponding to the UE. In one embodiment, the time offset $K_{NTN}$ may be determined (by the UE or eNB) according to the RTT between the UE and the eNB, the RTT between the UE and the satellite, or the RTT between the eNB and the satellite.

1.1.8 NPDSCH Scheduling

A UE shall upon detection on a given serving cell of an NPDCCH with DCI format N1 or N2 ending in subframe n intended for the UE, decode, starting in n+5 DL subframe for FDD, the corresponding NPDSCH transmission in N consecutive NB-IoT DL subframe(s) (i=0, 1, . . . , N−1) according to the NPDCCH information.

A scheduling offset value of $k_0$ is the number of NB-IoT DL subframe(s) starting in DL subframe n+5 for FDD until DL subframe no, where $k_0$ is determined by the scheduling delay field ($I_{delay}$) for DCI format N1.

Figure 19:
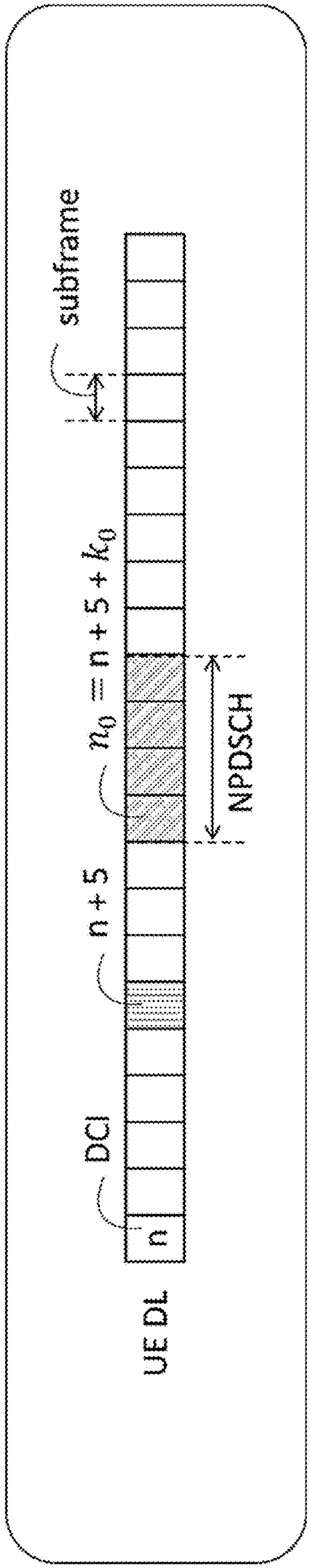
FIG. 19 illustrates a schematic diagram of NPDSCH scheduling according to one embodiment of the present disclosure.

FIG. 19 illustrates a schematic diagram of NPDSCH scheduling according to one embodiment of the present disclosure, wherein N=4 and $k_0$=4.

A scaling factor or adding scheduling offset may be provided to support better flexibility. The subframe for the NPDSCH transmission corresponding to the received DCI may be started in subframe $n_0+5+k_0 \cdot X+K_{NPDSCH}$, wherein X refers to a positive scaling factor and KNPDSCH denotes a scheduling offset provided to the UE by the eNB via an RRC message or a DCI format. KNPDSCH may equal to 0.

A UE shall upon detection on a given serving cell of an NPDCCH with DCI format N1 or N2 ending in subframe n intended for the UE, decode the corresponding NPDSCH transmission in N consecutive NB-IoT DL subframes starting in $n_0+5+k_0 \cdot X+K_{NTN}$ DL subframe for FDD, wherein X refers to a scaling factor and $K_{NTN}$ is a new scheduling offset provided to the UE by the eNB via an RRC message.

1.1.9 NPDCCH Monitoring: Msg3

If the NB-IoT UE detects NPDCCH with DCI Format N0 ending in subframe n or receives an NPDSCH carrying a random-access response grant ending in subframe n, and if the NPUSCH format 1 transmission corresponding to the NPDCCH starts from subframe n+k, the UE is not required to monitor NPDCCH in any subframe starting from subframe n+1 to subframe n+k−1. However, the above description is not aligned with the timing relationship of an NPUSCH transmission. For DCH format N0, the timing relationship of an NPUSCH transmission is as described in Table 6. For a RAR grant, the timing relationship of an NPUSCH transmission is as described in Table 7.

TABLE 6

| |
|---|
| 3GPP TS 36.213 V16.3.0 Subclause 16.5.1<br>A UE shall upon detection on a given serving cell of a NPDCCH with DCI format N0 ending in NB-IoT DL subframe n scheduling NPUSCH intended for the UE, perform, at the end of n + $k_0$ DL subframe for FDD, a corresponding NPUSCH transmission using NPUSCH format 1 in N consecutive NB-IoT UL slots. |

TABLE 7

| |
|---|
| 3GPP TS 36.213 V16.3.0<br>If a NPDCCH with associated RA-RNTI is detected and the corresponding DL-SCH transport block ending in subframe n contains a response to the transmitted preamble sequence, the UE shall, according to the information in the response, transmit an UL-SCH transport block according to Subclause 16.3.3. |
| 3GPP TS 36.213 V16.3.0 Subclause 16.3.3<br>Scheduling delay field ($I_{Delay}$) as determined in Subclause 16.5.1 with $k_0$ = 12 for $I_{Delay}$ = 0, where NB-IoT DL subframe n is the last subframe in which the NPDSCH associated with the Narrowband Random Access Response Grant is transmitted - 2 bits. |
| 3GPP TS 36.213 V16.3.0 Subclause 16.5.1<br>A UE shall upon detection on a given serving cell of a NPDCCH with DCI format N0 ending in NB-IoT DL subframe n scheduling NPUSCH intended for the UE, perform, at the end of n + $k_0$ DL subframe for FDD, a corresponding NPUSCH transmission using NPUSCH format 1 in N consecutive NB-IoT UL slots. |

Figure 20:
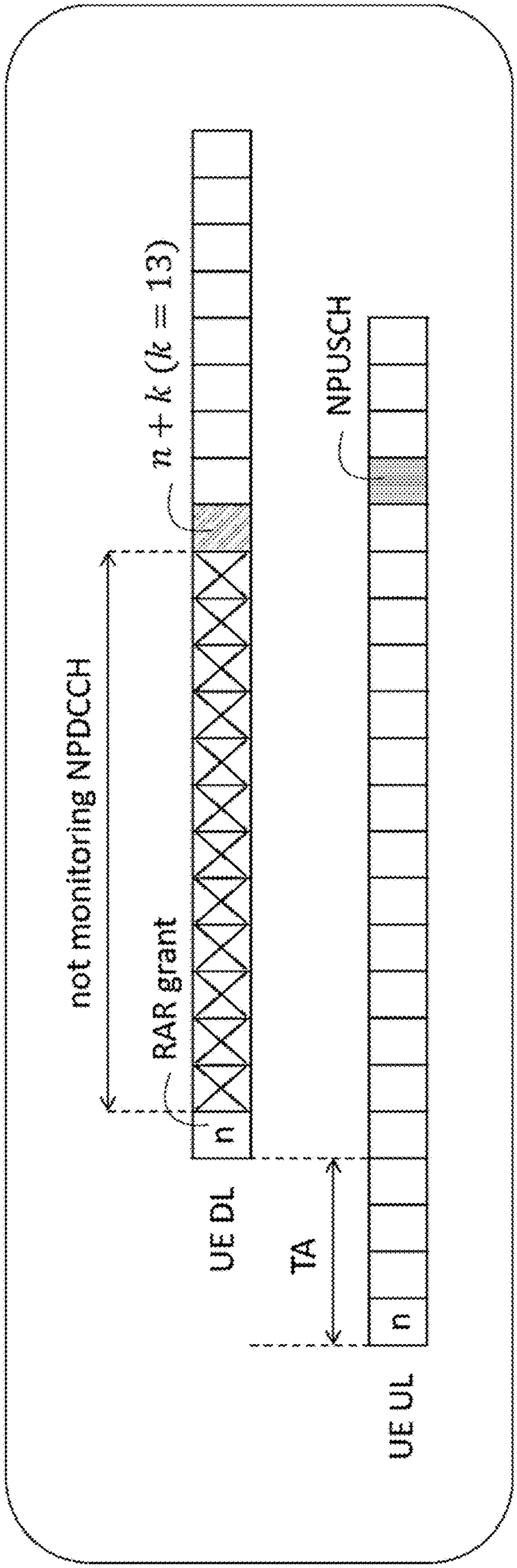
FIG. 20 illustrates a schematic diagram of NPDCCH monitoring skipping according to one embodiment of the present disclosure.

Based on the above spec context, "start from n+k (i.e., n+$k_0$ in Tables 6-7)" would be strange if it refers to "start from n+k UL subframe". To make sense, one interpretation is to read "the corresponding NPUSCH format 1 transmission starts from n+k" as "the corresponding NPUSCH format 1 transmission starts at the end of n+k DL subframe". FIG. 20 gives an illustration of NPDCCH monitoring skipping based on the above interpretation.

In one embodiment, a new scheduling offset may be introduced between the subframe for reception of RAR grant (or DCI) and the subframe for NPUSCH transmission if 3GPP TS 36.213 defines timing by Logical Timing.

If the NB-IoT UE detects NPDCCH with DCI Format N0 ending in DL subframe n or receives an NPDSCH carrying a random-access response grant ending in DL subframe n, and if the corresponding NPUSCH format 1 transmission starts from (the end of) n+k+$K_{NTN}$ DL subframe, the UE is not required to monitor NPDCCH in any subframe starting from DL subframe n+1 to DL subframe n+k−1+$K_{NTN}$, wherein $K_{NTN}$ is a new scheduling offset for Msg3 scheduled by the RAR grant or NPUSCH scheduled by the DCI format N0.

1.1.10 NPDCCH Monitoring: HARQ

Figure 21:
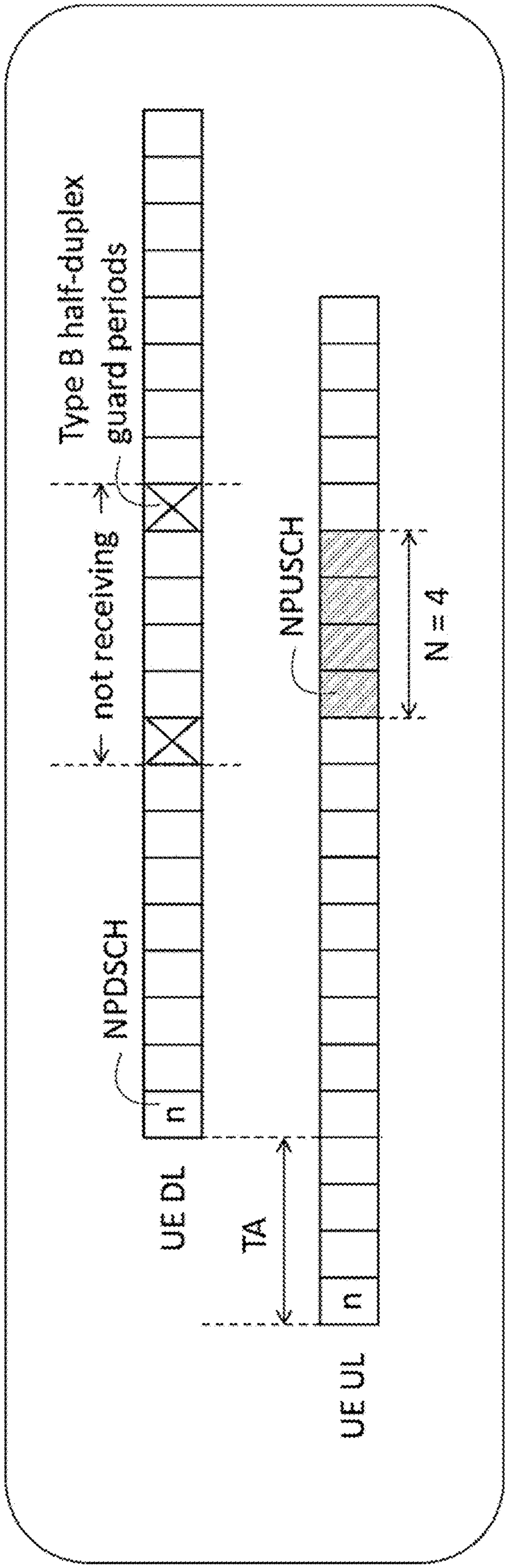
FIG. 21 illustrates a schematic diagram of Type B half-duplex guard periods for FDD in NB-IoT according to one embodiment of the present disclosure.

If an NB-IoT UE is configured with two HARQ processes and if the UE has an NPUSCH transmission ending in subframe n, the UE is not required to receive transmissions in the Type B half-duplex guard periods for FDD, as shown in FIG. 21, wherein N is the number of subframes for NPUSCH transmission.

Figure 22:
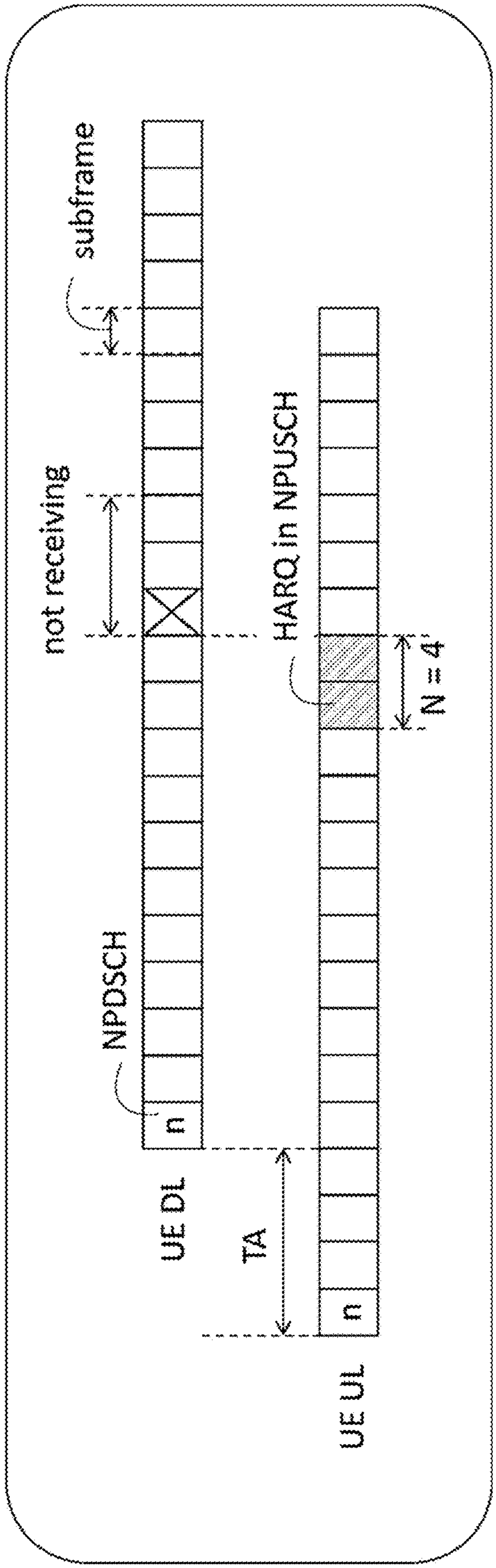
FIG. 22 illustrates a schematic diagram showing no NPDCCH after NPUSCH for the same HARQ process ID according to one embodiment of the present disclosure.

If a NB-IoT UE is configured with two HARQ processes and if the UE has an NPUSCH transmission ending in subframe n, the UE is not expected to receive an NPDCCH with DCI format N0/N1 for the same HARQ process ID as the NPUSCH transmission in any subframe starting from subframe n+1 to subframe n+3. FIG. 22 shows that, after the HARQ in NPUSCH is transmitted, the UE may not receive NPDCCH with the same HARQ process ID as the NPUSCH, wherein N is the number of subframes for NPUSCH transmission.

However, an NTN NB-IoT UE may experience longer RTT than 3 ms (e.g., 541 ms of RTT for GEO and 25 ms of RTT for LEO). Regarding power saving purpose, further enhancement shall be considered.

In one embodiment, after HARQ in NPUSCH transmission is completed, the UE may skip, for a time interval $N_{RTT}$, NPDCCH monitoring which belongs to the same HARQ process as the NPUSCH transmission. Furthermore, a processing time $N_{process}$ for eNB may be considered.

If an NB-IoT UE is configured with two HARQ processes and if the UE has an NPUSCH transmission ending in subframe n, the UE is not expected to receive an NPDCCH with DCI format N0/N1 for the same HARQ process ID as the NPUSCH transmission in any subframe starting from subframe n+1 to subframe $n+N_{process}$ (if any)$+N_{RTT}$, wherein NRTT refers to RTT between the UE and the eNB and $N_{process}$ refers to the processing time required for the eNB. In other words, after an NPUSCH is transmitted (e.g., via a pre-configured UL resource) by the UE in subframe n, the UE may determine a monitoring window starting at (or after) the end of subframe $n+N_{RTT}$. The UE may skip NPDCCH monitoring after the NPUSCH transmission until to the start of the monitoring window. In one embodiment, the different between the NPUSCH transmission and the start of the monitoring window may equal to the time offset $N_{RTT}$ plus a default offset (e.g., $N_{process}$).

In one embodiment, the time offset NRTT may be determined by UE based on the current TA value. In one embodiment, the time offset NRTT may be determined by the UE or eNB based on the RTT between the UE and the serving eNB.

In one embodiment, NRTT may be provided to the UE by the eNB via system information or an RRC message. In this case, the time offset NRTT may be determined based on the RTT between the eNB and a reference point in a coverage of the eNB, wherein the reference point may comprise a serving satellite in the space or a center of the serving cell on the ground.

Figure 23:
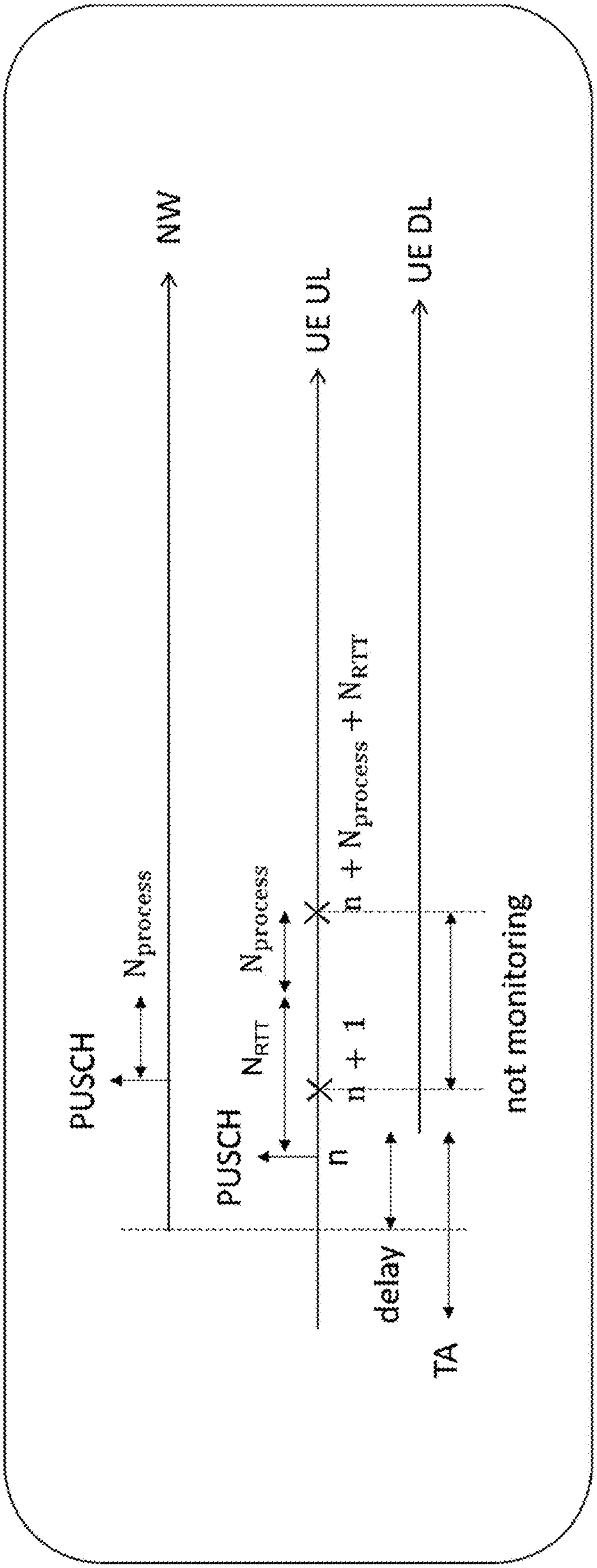
FIG. 23 illustrates a schematic diagram of skipping NPDCCH monitoring according to one embodiment of the present disclosure.

FIG. 23 illustrates a schematic diagram of skipping NPDCCH monitoring according to one embodiment of the present disclosure. It should be noted that, although the time period which the UE is not expected to receive the NPDCCH is described based on UL subframe in FIG. 23, the same time period may also be described based on DL subframe.

1.1.11 Multiple HARQ Process

For an NPDCCH UE-specific search space, the UE is not required to monitor an NPDCCH candidate in any subframe starting from subframe n+k−2 to subframe n+k−1 if the following conditions are met: (1) if an NB-IoT UE is configured with higher layer parameter such as twoHARQProcessesConfig or npusch-MultiTB-Config; (2) if the NB-IoT UE detects NPDCCH with DCI Format N0 ending in subframe n; (3) if the corresponding NPUSCH formatl transmission starts from subframe n+k; and (4) if the corresponding NPDCCH with DCI format N0 with CRC scrambled by C-RNTI NOT schedules two transport blocks as determined by the number of scheduled TB for unicast field if present.

Figure 24:
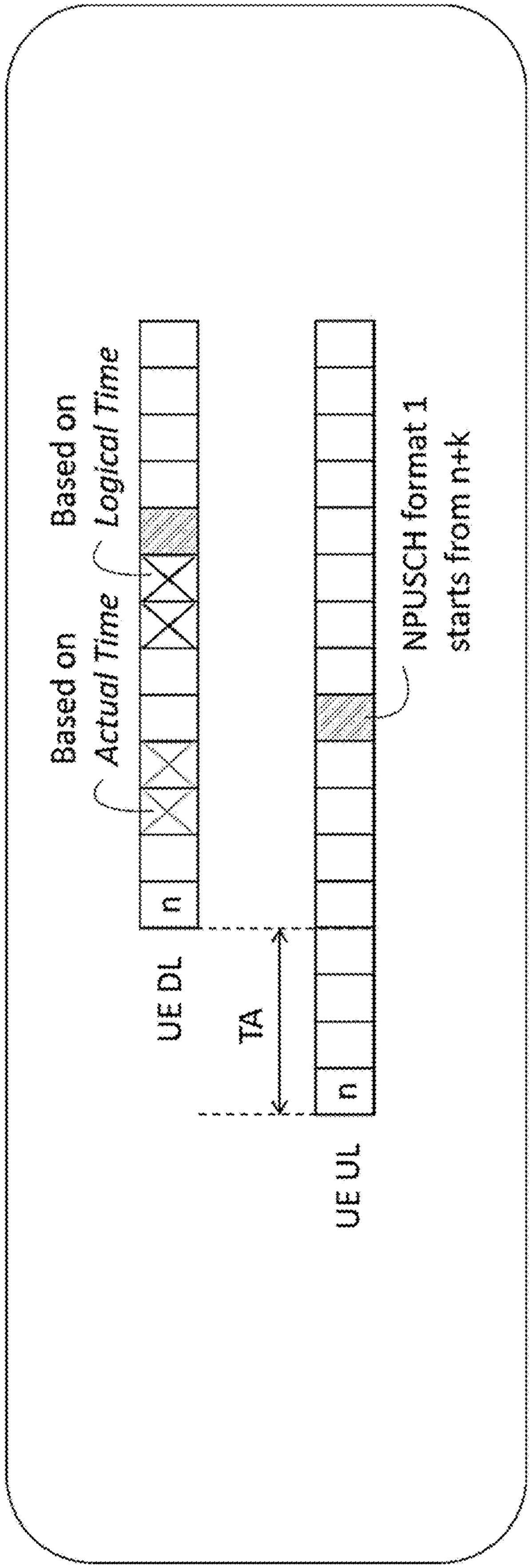
FIG. 24 illustrates a schematic diagram of NPDCCH monitoring for more than one HARQ process according to one embodiment of the present disclosure.

However, as shown in FIG. 24, some clarification on whether subframe n+k−2 is based on Actual Timing or Logical Timing shall be needed. Also, if a new scheduling offset is introduced for NPUSCH, a modification for the conditions mentioned above (i.e., conditions 1-4) is needed.

Figure 25:
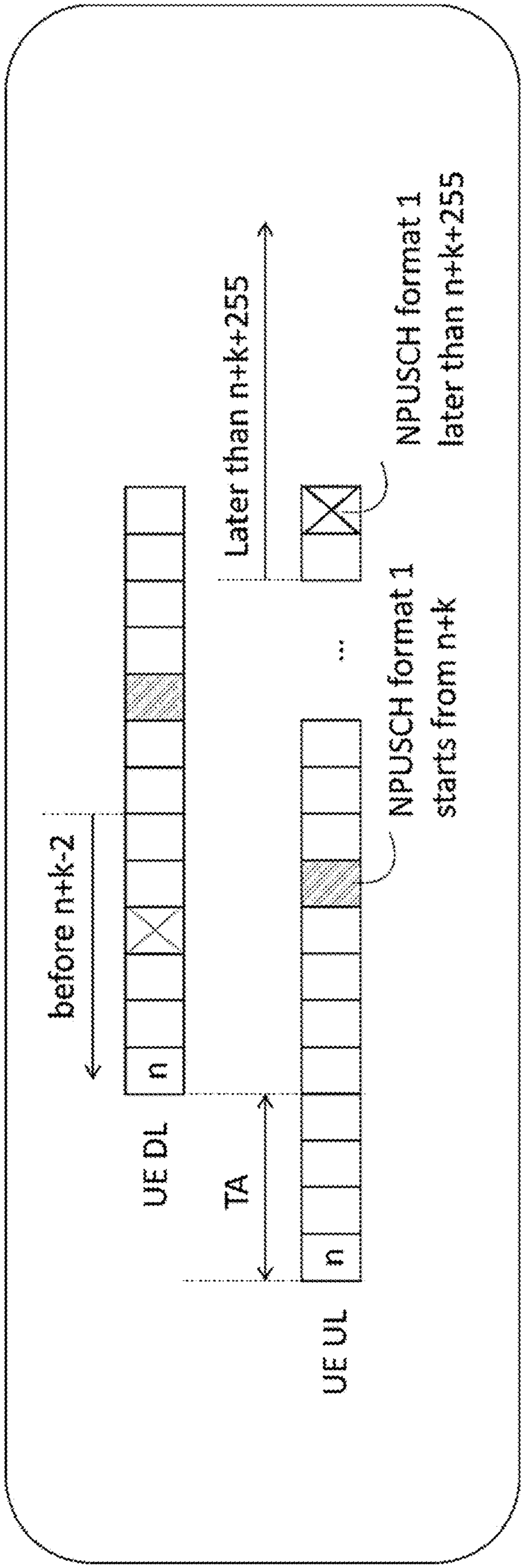
FIG. 25 illustrates a schematic diagram of scheduling limitation for the network when two HARQ process are configured for NB-IoT according to one embodiment of the present disclosure.

Another issue is that if the above conditions (i.e., conditions 1-4) are met, as shown in FIG. 25, the UE does not expect to receive a DCI format N0 before subframe n+k−2 for which the corresponding NPUSCH format 1 transmission ends later than subframe n+k+255 if the corresponding NPDCCH with DCI format N0 schedules one transport block.

However, NTN NB-IoT may require a longer scheduling offset (e.g., scheduling offset >541 ms) to accommodate RTT. The existing limitations may put a strong constraint on NW scheduling capability. The reason behind is to have uplink compensation gaps (UCGs) in place, as described in Table 8.

TABLE 8

| |
|---|
| 3GPP TS 36.211 V16.3.0<br>After transmissions and/or postponements due to NPRACH of 256 × 30720 × Ts time units, for frame structure type 1, a gap of 40 × 30720 × Ts time units shall be inserted where the NPUSCH transmission is postponed. The portion of a postponement due to NPRACH which coincides with a gap is counted as part of the gap. |

The UCG is to allow the UE to re-synchronize to DL signals during a long UL transmission which results in time and frequency drift primarily due to UE self-heating and low-cost crystal oscillators (XOs).

Figure 26:
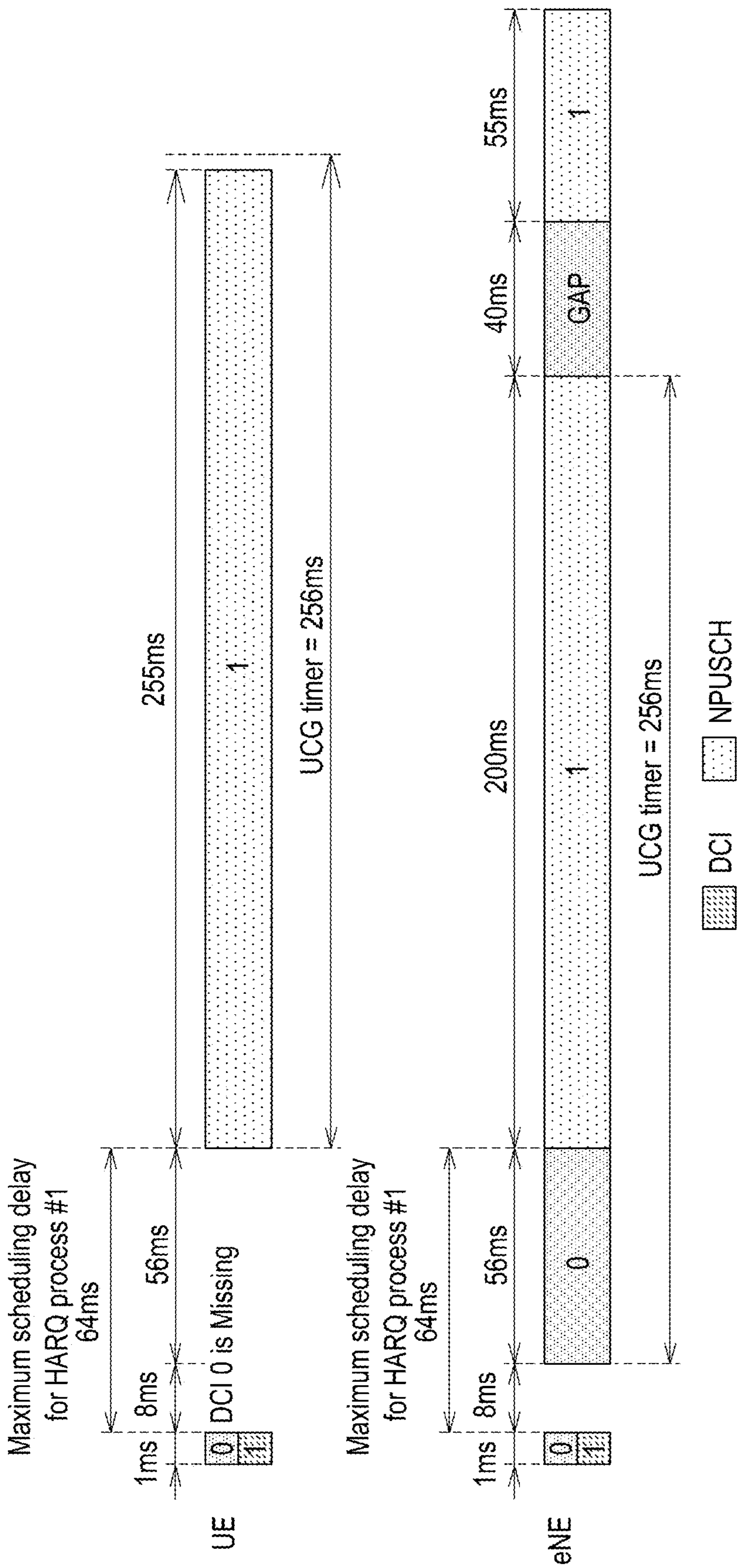
FIG. 26 illustrates a schematic diagram of inconsistency between UE and eNB according to one embodiment of the present disclosure.

FIG. 26 shows an inconsistency between UE and eNB if there is no such scheduling limitation (i.e., gaps are 40 ms occurring every 256 ms from the start of NPUSCH #0 until the end of NPUSCH #1). As shown in FIG. 26, the UL gaps are defined absolutely from the start of the NPUSCH transmission. The UL gaps may be a 40 ms time period occurring every 256 ms from the start of NPUSCH #0 until the end of NPUSCH #1. The issue is that if DCI #0 is missing (i.e., DCI #0 from eNB is not received by UE), UE will transmit NPUSCH #1 without pending a gap. However, eNB will expect to receive NPUSCH #0 and NPUSCH #1 according to the UCG timer with a UL gap in the middle of NPUSCH #1.

This inconsistency issue may exist when 2 HARQ processes are configured, the maximum total transmission duration exceeds 256 ms, and there is no scheduling gap configured between two NPUSCHs toward to 256 ms.

A possible solution to the inconsistency issue is to introduce a minimum scheduling gap between two consecutive NPUSCH transmissions.

A scheduling gap may be inserted between two consecutive NPUSCH transmissions. UE is not expected to be scheduled two consecutive NPUSCH transmissions without the scheduling gap. The length of the scheduling gap may be configured by NW based on a UE capability report.

1.1.12 NPUSCH Using PUR

Figure 27:
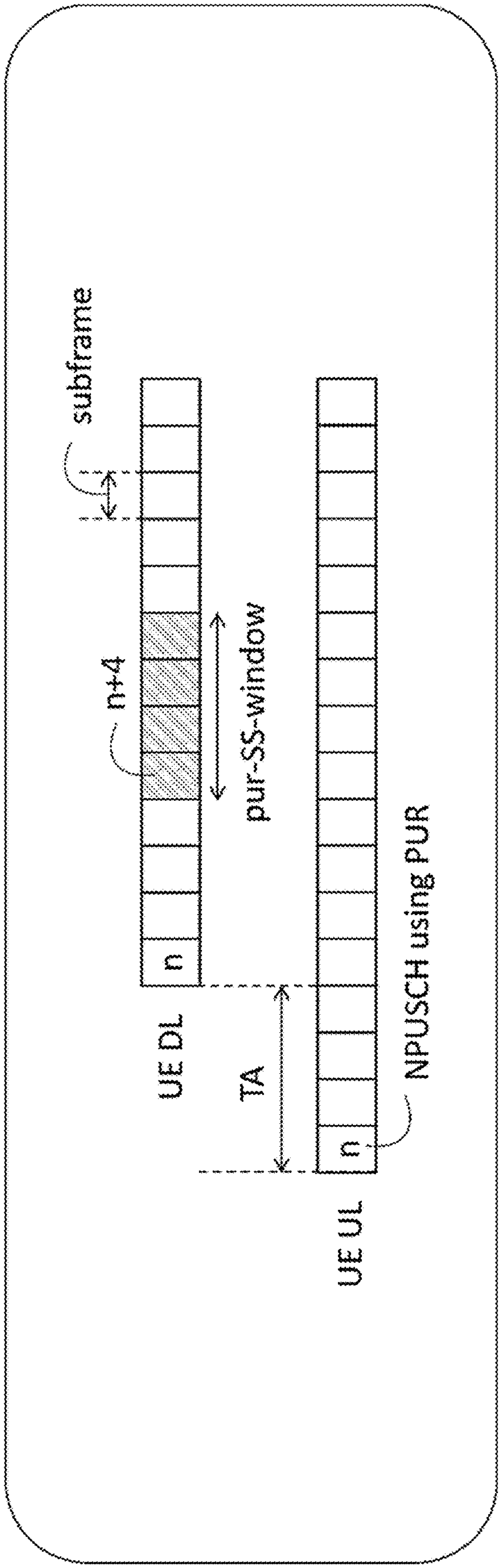
FIG. 27 illustrates a schematic diagram of NPUSCH using PUR in NB-IoT according to one embodiment of the present disclosure.

If the UE has initiated an NPUSCH transmission using preconfigured uplink resource ending in subframe n, the UE shall monitor the NPDCCH UE-specific search space in a search space window starting in subframe n+4 with duration (i.e., pur-ss-window as shown in FIG. 27) given by higher layer parameter pur-SS-window-duration.

However, if the current 3GPP specification assumes Logical Timing with TA=0, the search space window configured by pur-SS-window-duration may start too early such that the UE may not receive the corresponding NPDCCH.

A possible solution is to introduce an additional scheduling offset provided by NW or determined by UE, wherein the scheduling offset is associated with RTT.

If the UE has initiated an NPUSCH transmission using pre-configured uplink resource ending in subframe n, the UE may monitor the NPDCCH UE-specific search space in a search space window starting in subframe $n+4+K_{NTN}$ with duration given by higher layer parameter pur-SS-window-duration, wherein the time offset $K_{NTN}$ may be provided to the UE by the eNB via system information or an RRC message.

In one embodiment, the time offset $K_{NTN}$ may be determined by the UE or eNB based on the RTT between the UE and the serving eNB. In one embodiment, $K_{NTN}$ may be provided to the UE by the eNB via system information or an RRC message. In this case, the time offset $K_{NTN}$ may be determined based on the RTT between the eNB and a reference point in a coverage of the eNB, wherein the reference point may comprise a serving satellite in the space or a center of the serving cell on the ground.

1.2 UL Synchronization

UL synchronization includes UL timing and UL frequency enhancement to accommodate NTN needs (e.g., large cell size and high Doppler shift). Also, legacy solutions in existing satellite systems (e.g., partial frequency pre-compensation for DL and timing post-compensation at the satellite network side) are also considered.

1.2.1 DL Synchronization

Different from NR design, NB-IoT is designed mainly for the stationary scenario. It may be questionable if the existing synchronization signals (e.g., NPSS or NSSS) and narrowband reference signal (NRS) can still be reused, regarding the max Doppler shift is 0.93 ppm for GEO NW and 24 ppm for LEO NW.

Pre/post Doppler frequency compensation is a legacy solution where NW temps to neutralize Doppler impact on a center of a given serving cell, such that any UE on the center point of the given serving cell would experience zero DL Doppler shift. If pre/post compensation mechanism is applied at the NW side, the max Doppler shift may be as shown in Table 9.

TABLE 9

| |
|---|
| 0 ppm, ignored for GEO |
| 1.05 ppm, for LEO-600KM with beam diameter = 50 km (S-band) |
| 1.88 ppm, for LEO-600KM with beam diameter = 90 km (S-band) |
| 15.82 ppm, for LEO-600KM with max beam diameter = 1000 km (S-band) |

The frequency error corresponding to Doppler shift±0.1 ppm is ±200 Hz with the carrier frequency of 2 GHz. For an NB-IoT UE searching for NB-IoT carriers on a 100 kHz channel raster, the maximum tolerant error for cell search could be up to 25 ppm. In other words, no channel raster enhancement would be needed if the pre/post Doppler frequency compensation is in place. An NTN NB-IoT UE may always find NPSS or NSSS within a given channel raster of 100 kHz.

However, to guarantee the robustness of cell ID detection, the initial frequency offset can only be up to 5 ppm, based on getting one-shot detection probability at −6 dB received baseband SNR condition with less than 1% false alarm rate. Hence, to support the maximum beam diameter with the 15 ppm frequency shift, some enhancement is needed.

For NB-IoT DL, only frequency shift Af=15 kHz is supported. To reduce the Doppler impact, introducing a larger subcarrier spacing may be beneficial. Accordingly, for an NTN NB-IoT UE, the UE may assume that the SCS of NPSS or NSSS may be either SCS=15 kHz or SCS=30 kHz when the UE determines a candidate of NPSS or NSSS during a cell search.

In one embodiment, idle mode UE may use the existing NRS and additional reference signal introduced to support NTN on top of NPSS or NSSS for functionalities such as cell search, initial access, automatic gain control (AGC), time/frequency tracking, RRM measurement for the serving cell, RRM measurement for neighbor cell, or paging reception indication. For example, NRS pattern/information may be provided by broadcast signaling or may be (pre-)configured/(pre-)specified based on different requirements (e.g., NTN scenarios, operation frequency, or FDD/TDD mode).

In one embodiment, NW may provide Narrowband Positioning Reference Signals (NPRS) for idle mode UEs on top of the NRS. The NPRS could be used for functionalities such as cell search, AGC, time/frequency tracking, RRM measurement for the serving cell, RRM measurement for neighbor cell, or paging reception indication. If an eNB supports NPRS, the NPRS would be always on (i.e., always transmitted by NW) in a serving cell.

In one embodiment, NW may provide Narrowband Tracking Reference Signals (NTRS) for idle mode UEs on top of the NRS. The NTRS may be present with NRS in the same slot, but the NTRS may have a higher frequency density than the NRS. If an eNB supports NTRS, the NTRS would be always on (i.e., always transmitted by NW) in a serving cell.

Figure 28:
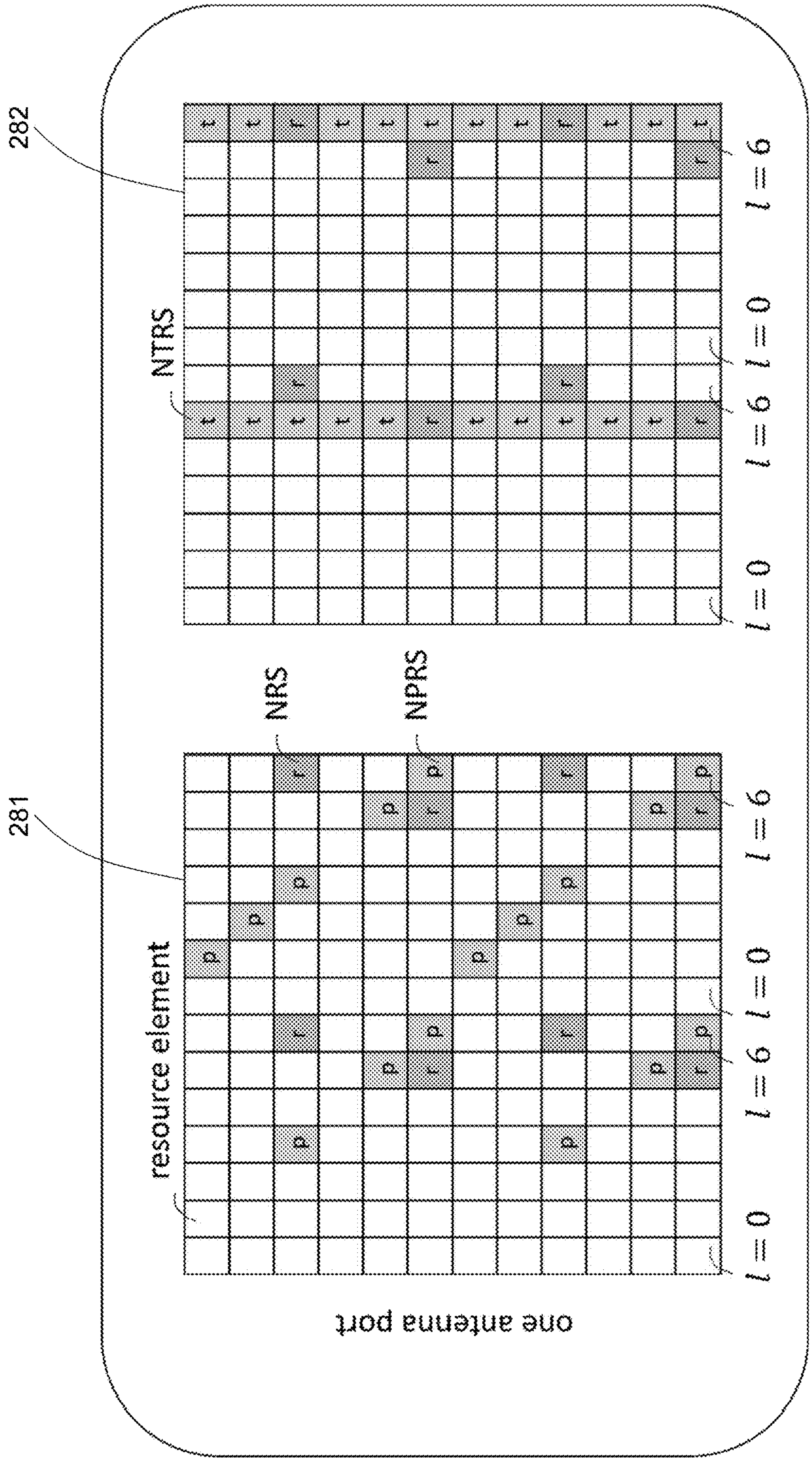
FIG. 28 illustrates a schematic diagram of NPRS and NTRS for idle mode UEs according to one embodiment of the present disclosure.

FIG. 28 illustrates a schematic diagram of NPRS and NTRS for idle mode UEs according to one embodiment of the present disclosure, wherein "p" is NPRS, "r" is NRS, and "t" is NTRS. Block 281 represents the resource allocation when NRS and NPRS are broadcasted for idle mode UEs. Block 282 represents the resource allocation when NRS and NTRS are broadcasted in a cell.

Cell search is the procedure by which a UE acquires time and frequency synchronization with a cell and detects the narrowband physical layer Cell ID. Narrowband primary synchronization signal or narrowband secondary synchronization signal may be transmitted in the downlink to facilitate cell search for narrowband IoT.

A UE may assume either 15 kHz SCS or 30 kHz SCS for detecting NPSS or NSSS candidates. It should be noted that, in NB-IoT, NPSS or NSSS may be mapped to all resource elements (REs) in a subframe (except for REs in LTE control region or LTE CRS).

In one embodiment, the SCS may be band dependent. If a UE temps to camp on an NTN cell or if a UE temps to camp on an NTN band or certain band, the UE may use SCS=30 kHz for cell search; otherwise, the UE may use SCS=15 kHz for cell search.

1.2.2 Random Access

The NPRACH formats and preamble sequences provide the max CP length of $24576T_s$=0.8 ms when preamble format 2 is configured for frame structure type 1. However, this CP length cannot cover the required RTT in NTN.

If pre-compensation of UL timing and UL frequency offset is handled at the UE side, it has been proved that the existing NPRACH formats and preamble sequences can be reused to accommodate the NTN requirements.

In one embodiment, NW may broadcast geo-location of a serving cell center or a serving cell radius (e.g., beam size or beam footprint diameter) via system information (e.g., NTN SIBs). UE may use this broadcasted information with satellite ephemeris and UE acquired GNSS location to calculate the differential Doppler shift, wherein the differential Doppler shift is the remaining DL Doppler shift causing by the distance between UE and the cell center when Doppler pre-compensation is present.

In one embodiment, some NPRACH formats may not be supported in NTN. If a UE receives an unsupported NPRACH format configuration, the UE may handle the received format configuration as a misconfiguration.

In one embodiment, the unsupported NPRACH format indexes may be reused for NW to convey other information (e.g., recycle these bits to extend other bit fields).

For an NPRACH transmission, the transmission of the UL radio frame from the UE shall start $(N_{TA}+N_{TA,offset})\times T_s$ seconds before the start of the corresponding DL radio frame at the UE, wherein $N_{TA,offset}$=0 for frame structure type 1 and $N_{TA}$ may be determined by UE based on UE acquired GNSS position and satellite ephemeris.

The NPRACH starting subcarriers allocated to UE initiated random access are determined by $N_{sc,offset}^{NPRACH}+$ $N_{Doppler}^{NPRACH}$, wherein $N_{sc,offset}^{NPRACH}$ denotes the frequency location of the first subcarrier allocated to NPRACH provided by system information (e.g., SIB1), and $N_{Doppler}^{NPRACH}$ is the Doppler shift determined by UE according to UE's GNSS position and satellite ephemeris.

1.2.3 Maintenance for UL Timing Advance

Figure 29:
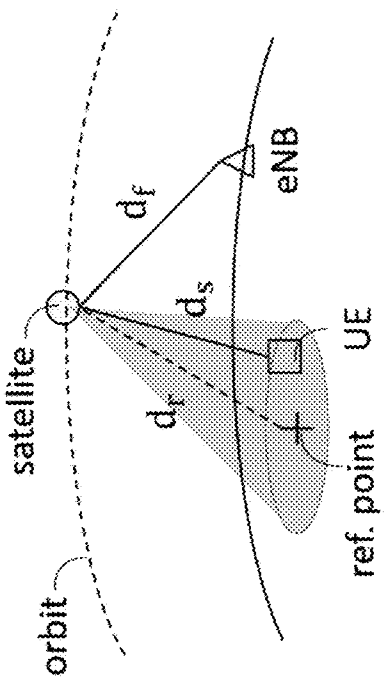
FIG. 29 illustrates a schematic diagram of TA components in NTN NB-IoT according to one embodiment of the present disclosure.

For the timing advance (TA) in the initial access and the subsequent TA maintenance, FIG. 29 illustrates a schematic diagram of TA components in NTN NB-IoT according to one embodiment of the present disclosure.

In FIG. 29, the full TA refers to RTT between eNB and UE as $2\times(d_f+d_s)/c$ consisting of common TA and UE specific TA. Specifically, full TA=common TA+UE specific TA, wherein the full TA refers to the RTT between eNB and UE; common TA=$2\times(d_f+d_r)/c$, wherein the common TA refers to the RTT between eNB to a reference point (RP); and UE specific TA=$2\times(d_f-d_r)/c$, wherein the UE specific TA refers to the difference between common TA and full TA, wherein $d_f$ is the distance between eNB to a satellite (SAT), $d_r$ is the distance between satellite to RP (i.e., ref. point in FIG. 29), $d_s$ is the distance between satellite and UE, and c denotes the speed of light in space. Note that the RP can be on the ground for handhelds, in the air for flights, at the SAT, at the eNB, at a point on the service link, or at a point on the feeder link for hiding the location of the serving eNB.

For idle mode UEs, TA is acquired autonomously at UE with UE known location and satellite ephemeris. The required TA value for UL transmission including PRACH which can be calculated by the UE based on either UE-specific TA or full TA.

For the full TA compensation at the UE side, both the alignment on the UL timing among UEs and DL/UL frame timing at the network side can be achieved. However, in the case of a satellite with a transparent payload, RTT of feeder link may be provided explicitly by an RTT value (e.g., via SIB1) or may be provided impolitely by an eNB location (e.g., via system information).

For the UE specific differential TA, additional indication on a single reference point should be signaled to UEs per beam/cell for achieving the UL timing alignment among UEs within the coverage of the same beam/cell.

For connected mode UEs, timing advanced adjustment may be performed based on network indication. For satisfying the larger coverage of NTN, an extension of the value range for TA indication in RAR, in 6-bit timing advance command MAC CE or the Timing advance adjustment field in DCI format N0, may be needed. Also, an indication of the timing drift rate, from the network to UE, may be supported to enable the TA adjustment at the UE side.

However, implementation detail on the required features is unclear in the current specification, especially regarding coexistence with NB-IoT.

In order to accommodate the required TA features, existing NB-IoT may be modified by: adding a NW indication to tell whether TA is required for NPRACH transmission; adding a NW indication to tell whether an 11-bit timing advance command in RAR is used for TA adjustment; adding a TA offset value to support negative values for an 11-bit timing advance command in RAR; building an enhanced TA adjustment command to extend the value range; or building an enhanced TA adjustment field in DCI format N0 to extend the value range.

In one embodiment, for an NTN NB-IoT UE, NW may broadcast an indication to request UL timing pre-compensation for NPRACH transmission by adding a timing advance value.

In one embodiment, for an NTN NB-IoT UE, UE may determine whether UL timing pre-compensation for NPRACH transmission is needed based on PLMN selection and NTN related system information such as NTN SIBs.

For an NTN NB-IoT UE, the start of the random-access preamble shall be aligned with the start of the corresponding uplink subframe at the UE assuming $N_{TA}=N_{TA\text{-}UE}+N_{TA\text{-}Com}$, wherein $N_{TA}$ may refer to TA value, $N_{TA\text{-}UE}$ determined by the UE may refer to the RTT between the UE and a reference point (RP) and $N_{TA\text{-}Com}$ provided by the eNB may refer to the RTT between the RP and the eNB.

For an NTN NB-IoT UE, in case of random-access response, an 11-bit timing advance command $T_A$ indicates an adjustment of the current $N_{TA}$ value $N_{TA,old}$ to the new $N_{TA}$ value $N_{TA,new}$ by index values of $T_A=0, 1, 2, \ldots, 1536$, wherein $N_{TA,new}=N_{TA,old}+(T_A-T_{offset})\times 16$, wherein $T_{offset}$ is a positive value to provide adjustment of $N_{TA}$ by a positive or a negative amount to indicate advancing or delaying the uplink transmission timing by a given amount respectively.

Figure 30:
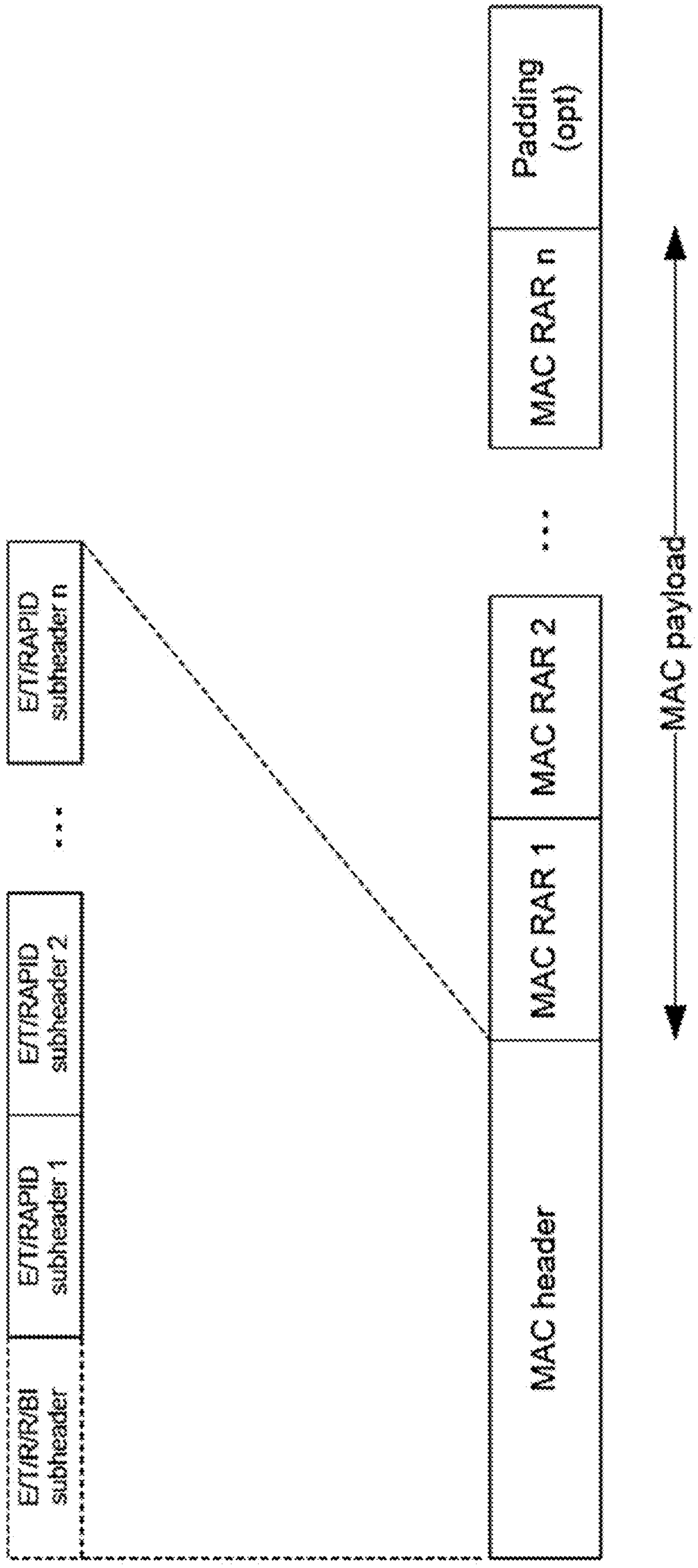
FIG. 30 illustrates a schematic diagram of MAC PDU consisting of a MAC header and MAC RARs according to one embodiment of the present disclosure.

A MAC PDU may comprise a MAC PDU header and zero (i.e., one or more padding bits), one or more MAC random access responses (MAC RARs), or optionally padding is illustrates in FIG. 30. The MAC PDU header may comprise one or more MAC PDU sub-headers corresponding to the one or more MAC RARs respectively.

Specifically, the MAC PDU sub-header may comprise three header fields, including the extension field E, the type field T, and the random-access preamble identifier field RAPID. The extension field E is a flag indicating if more fields are present in the MAC PDU header or not. The E field may be set to "1" to indicate at least another set of E/T/RAPID fields follows the E field. The E field may be set to "0" to indicate that a MAC RAR or padding starts at the next byte. The type field T is a flag indicating whether the MAC sub-header comprising a random-access ID or a backoff indicator (BI). The T field is set to "0" to indicate the presence of a backoff indicator field in the sub-header. The T field is set to "1" to indicate the presence of a random-access preamble ID (RAPID) field in the sub-header. The backoff indicator (BI) field may identify the overload condition in the cell. The size of the BI field may be 4 bits. The RAPID field may identify the transmitted random-access preamble. The size of the RAPID field may be 6 bits. The reserved bit field R may be set to "0".

Figure 31:
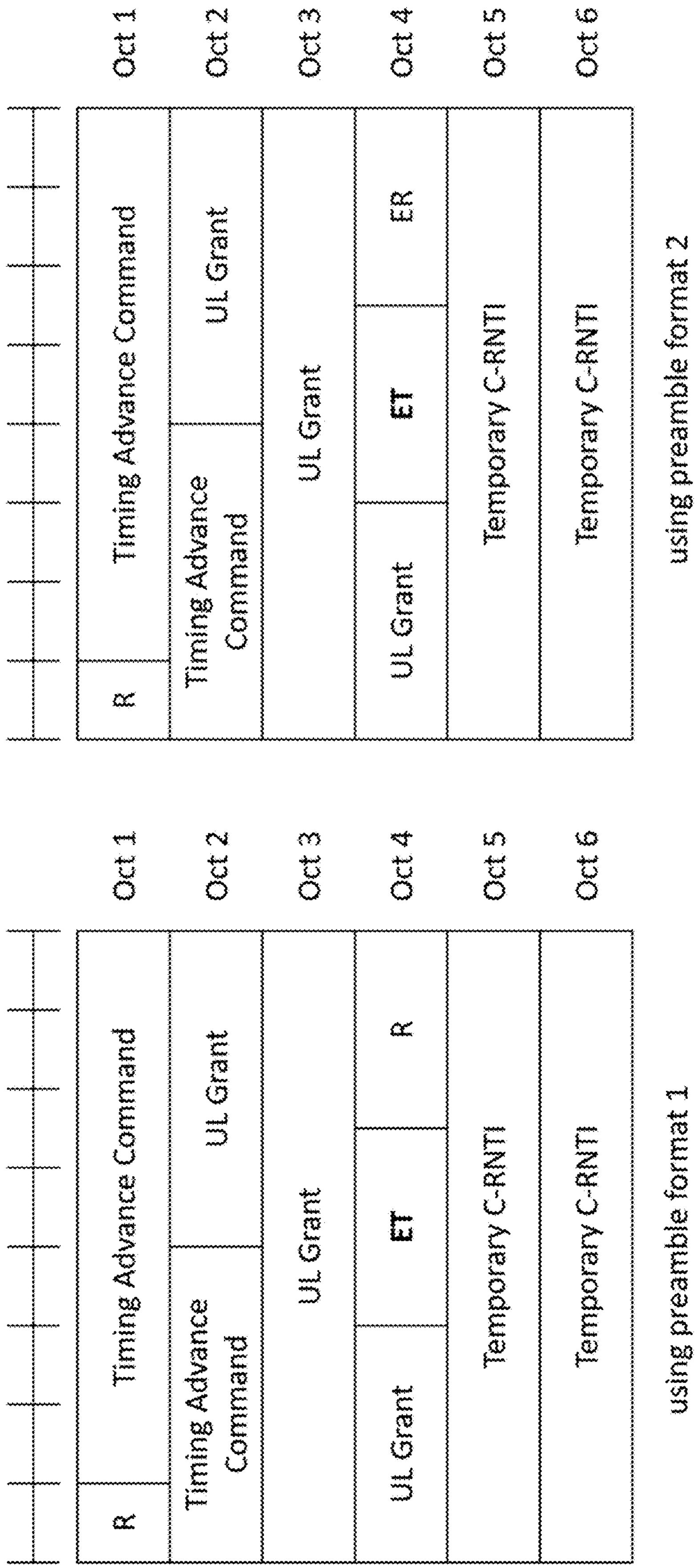
FIG. 31 illustrates a schematic diagram of MAC RAR with different preamble formats for NTN NB-IoT according to one embodiment of the present disclosure.

For NB-IoT, the RAPID field corresponds to the start subcarrier index. This is because no preamble index multiplexing is configured, the RAPID in each MAC PDU sub-header corresponding to a MAC RAR can be used to reflect the frequency resource location used by each single tone preamble. FIG. 31 illustrates a schematic diagram of MAC RAR with different preamble formats for NTN NB-IoT according to one embodiment of the present disclosure.

A MAC RAR may comprise a R field, a timing advance command, a UL Grant, an ER field, or a temporary C-RNTI. The R field may include a reserved bit set to "0". The timing advance command field may indicate the index value TA=$\{0, 1, 2, \ldots, 1282\}$ used to control the amount of timing adjustment that the MAC entity must apply, except for NB-IoT UEs using preamble format 2. The timing advance command field may indicate the index value TA=$\{0, 1, 2, \ldots, 1536\}$ for NB-IoT UEs using preamble format 2. For NTN NB-IoT UEs, the timing advance command filed may indicate the index value TA=$\{0, 1, 2, \ldots, 2045\}$ if no ET bit is provided. The size of the timing advance command field is 11 bits. The UL Grant field may indicate the resources to be used on the uplink. The size of the UL Grant field is 15 bits for NB-IoT UEs. The ER field may include extended RAPID (ER) bits indicating the two least significant bits of extended RAPID used when PRACH preamble format 2 is transmitted. The ET field may include extended timing advance command (ET) bits indicating the two least significant bits of extended TA command. "00" denotes no ET bits provided. The Temporary C-RNTI field may indicate the temporary identity that is used by the MAC entity during the random-access. The size of the temporary C-RNTI field may be 16 bits.

The timing advance command (TAC) MAC control element (CE) is identified by MAC PDU sub-header with logical channel ID (LCID) of 11101. The LCID field may have a fixed size and may include single octet representing a TAG identity or a timing advance command. The TAG identity (TAG Id) field may indicate the TAG identity of the addressed TAG. The TAG containing the SpCell has the TAG identity "0". The length of the TAG identity field is 2 bits. The timing advance command field may indicate the index value TA={0, 1, 2, . . . , 63} used to control the amount of timing adjustment that MAC entity must apply. The length of the timing advance command field is 6 bits.

The enhanced timing advance command MAC control element is identified by MAC PDU sub-header with LCID of 01111 for example. The enhanced timing advance command MAC control element may have a fixed size and may include a single octet representing a Tag identity of a timing advance command. The TAG identity (TAG Id) field may indicate the TAG identity of the addressed TAG. The TAG containing the SpCell may have the TAG Identity "0". The length of the TAG identity field is 2 bits. The timing advance command field may indicate the index value TA={0, 1, 2, . . . , 2^14-1} used to control the amount of timing adjustment that MAC entity must apply. The length of the timing advance command field is 14 bits.

Figure 32:
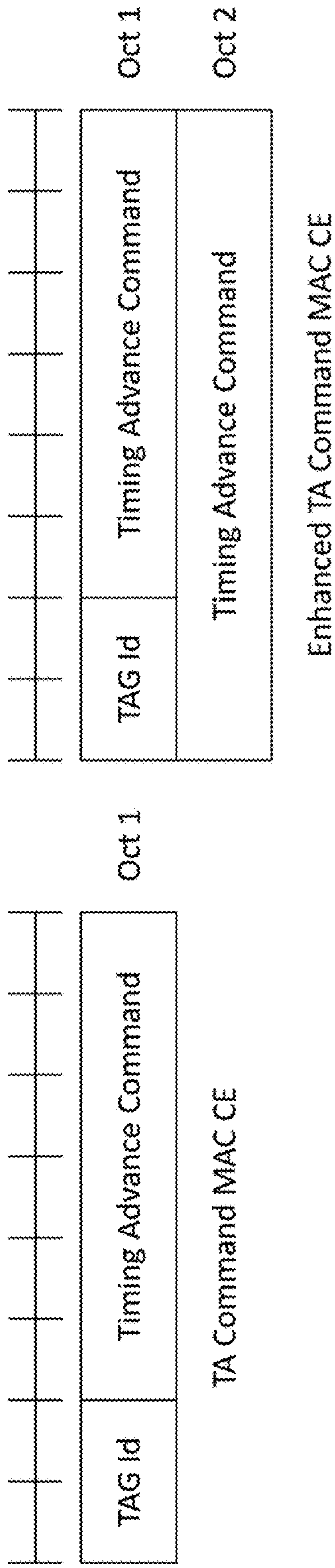
FIG. 32 illustrates a schematic diagram of TA command MAC CE and enhanced TA command MAC CE for NTN NB-IoT according to one embodiment of the present disclosure.

For NTN NB-IoT UEs, supporting of enhanced timing advance command MAC CE may be up to UE capability reporting. The MAC CEs used for TA adjustment for NTN NB-IoT are illustrates in FIG. 32.

In one embodiment, since carrier aggregation and dual connectivity are not supported by NB-IoT, the field of TAG Id with 2 bits may be replaced by reserved bits or replaced by additional bits for timing advance command.

DCI format N0 is used for the scheduling of NPUSCH and operation on pre-configured UL resources in one UL cell. If DCI format N0 CRC is scrambled by PUR-RNTI and modulation and coding scheme is set to "1110", the remaining fields of DCI format N0 may be set as follows: ACK or fallback indicator may be set by 1 bit, wherein value "0" indicates ACK and value "1" indicates fallback indicator; NPUSCH repetition adjustment may be set by 3 bits; timing advance adjustment may be set by 6 bits, wherein the field for the NPUSCH repetition adjustment is only present if the field for ACK or fallback indicator is set to "0"; all the remaining bits in format N0 are set to one or zero; and enhanced timing advance adjustment may be set by 12 bits, wherein the field for the enhanced timing advance adjustment is only present if the field for ACK or fallback indicator is set to "0" and all the remaining bits in format N0 are set to "0".

In one embodiment, the field of enhanced timing advance adjustment is only present for NTN NB-IoT UEs.

1.2.4 Maintenance for UL Frequency Synchronization

For the UL frequency compensation, at least for the LEO system, the following solutions are identified with consideration of the beam specific post-compensation of common frequency offset at the network side: Solution 1: both the estimation and pre-compensation of UE-specific frequency offset are conducted at the UE side. The acquisition of this value can be done by utilizing DL reference signals, UE location, or satellite ephemeris; Solution 2: the required frequency offset for UL frequency compensation at least in LEO systems is indicated by the network to UE. Indication of compensated frequency offset values by the network is also supported in case that compensation of the frequency offset is conducted by the network in the uplink and/or the downlink, respectively.

However, the detailed signaling design for the above enhancements is unclear in the current specification. Based on the above description, more details are described below. For DL reference signals, if left hand (LH) and right hand (RH) circular polarization (CP) are introduced, the corresponding configuration for the DL reference signals may carry additional information to tell whether LHCP, RHCP, or linear polarization is used. For satellite ephemeris, since NB-IoT UEs may not monitor system information, any update of satellite ephemeris needs to be signaled via cell/UE-specific RRC messages, MAC CE commends, or DCI formats. For UE location, NTN NB-IoT UEs may need additional gap time for resynchronizing UE location via a GNSS receiver, named GNSS measurement gap. This gap could be configured by NW. UE may report whether the gap is needed. For the indication of the required frequency offset for UL frequency compensation conducted by the UE or DL frequency offset conducted by the NW, an eNB may leverage the existing TA command to carry the UL frequency offset.

In one embodiment, assistance information from NW would be provided to the UE, wherein the assistance information may include geo-location of cell center or a reference point, cell size, coverage hole (i.e., area without any service), or GW geo-location.

In one embodiment, UE may renew UL frequency pre-compensation once receiving an ephemeris update or a cell center location update. The update may be carried by a MAC CE or a DCI format.

The MIB-NB includes the system information transmitted on BCH in FDD from an eNB to a UE. The MIB-NB filed may include polarization information used by NPSS/NSSS/CRS in the serving cell. New NTN parameters are given below.

Operation-Mode-Info-NTN: deployment scenario (in-band/guard-band/standalone) and related information. Inband-SamePCI indicates an in-band deployment and that the NB-IoT and NTN NB-IoT cell share the same physical cell id and have the same number of NRS and CRS ports. Inband-DifferentPCI indicates an in-band deployment and that the NB-IoT and NTN NB-IoT cell have different physical cell id.

sib-Polarization-Info-NTN: polarization information used for SIB1 and SI transmission. Linear polarization, circular polarization, RHCP, or LHCP can be indicated. UE may assume NPSS/NSSS/CRS use the same polarization mode.

The SIB1-NB may include information relevant when evaluating if a UE can access a cell and defines the scheduling of other system information. New NTN parameters are given below.

CRS-polarization-NTN: polarization information used for CRS. Linear polarization, circular polarization, RHCP, or LHCP can be indicated.

The IE DL-GapConfig-NB is used to specify the downlink gap configuration for NPDCCH and NPDSCH. Downlink gaps apply to all NPDCCH/NPDSCH transmissions except for BCCH. New NTN parameters are given below.

dl-Gap-Duration-Coeff-NTN: Coefficient to calculate the gap duration of a DL transmission for GNSS measurement. Duration in a number of subframes.

dl-Gap-Periodicity-NTN: Periodicity of a DL transmission gap in a number of subframes for GNSS measurement.

dl-Gap-Threshold-NTN: Threshold on the maximum number of repetitions configured for NPDCCH before application of DL transmission gap configuration.

The IE NPRACH-ConfigSIB-NB is used to specify the NPRACH configuration for the anchor and non-anchor carriers. New NTN parameters are given below.

Satellite-ephemeris-NTN: ephemeris parameters including geographical information, x, y, z coordinate and acceleration information, dx/dt, dy/dt, and dz/dt.

UL-frequency-offset-NTN: the indication of the UL frequency pre-compensation for sending NPRACH.

DL-frequency-offset-NTN: the indication of the DL frequency pre-compensation conducted by the NW.

The IE ResourceReservationConfig-NB is used to specify the reserved downlink or uplink resources on an NB-IoT carrier (e.g., for deployment within a NR carrier). New NTN parameters are given below.

Resource-Reservation-NTN: to specify the reserved DL or UL resources on an NTN NB-IoT carrier for deployment within an NB-IoT carrier, including periodicity, slot-Pattern, start-Position, symbol-Bitmap, etc.

The IE UE-Capability-NB is used to convey the NB-IoT UE Radio Access Capability Parameters. The IE UE-Capability-NB is transferred in NB-IoT only. New NTN parameters are given below.

Access-NGEO-NTN: Indicates whether the UE supports non-GEO-based NTN.

Access-GEO-NTN: Indicates whether the UE supports GEO-based NTN.

Power-more-than-23dBm-NTN: Indicates whether the UE supports more than power class 23 dBm in NTN NB-IoT for the band.

Circular-Polarization-NTN: Indicates whether the UE supports circular polarization.

GNSS-Gap-NTN: Indicates whether the UE requires GNSS measurement gaps.

For UL frequency adjustment, a 6-bit UL frequency adjustment command or the UL frequency offset adjustment field in DCI format N0 $F_A$ (if present) may indicate an adjustment of the current $N_{FA}$ value $N_{FA,old}$ to the new $N_{FA}$ value $N_{FA,new}$ by index values of $F_A=\{0, 1, 2, \ldots, 63\}$, wherein $N_{FA,new}=N_{FA,old}+(F_A-31)\times 16$.

Figure 33:
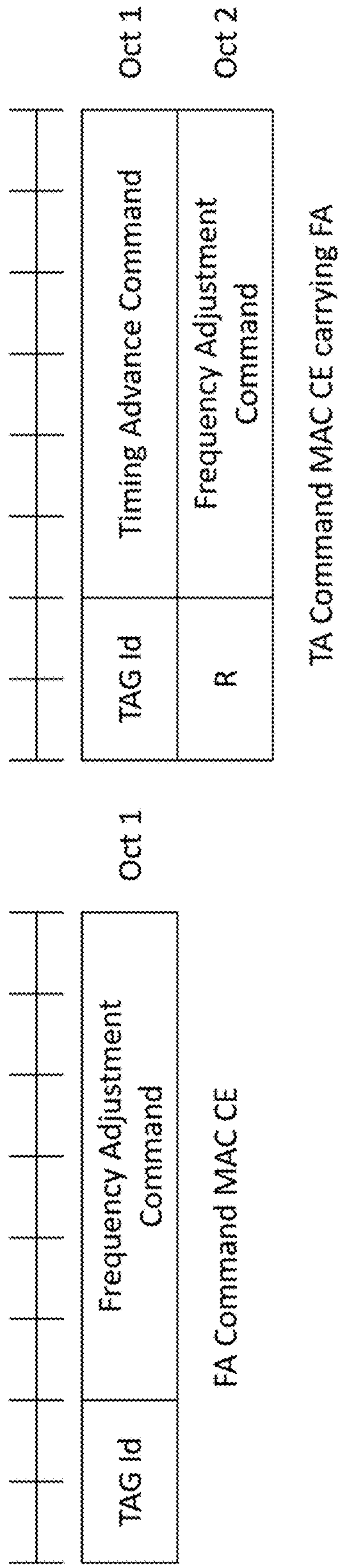
FIG. 33 illustrates a schematic diagram of UL frequency adjustment command in NTN NB-IoT according to one embodiment of the present disclosure.

The adjustment of $N_{FA}$ value by a positive or a negative amount indicates increasing or decreasing the uplink transmission frequency by a given amount respectively. FIG. 33 shows that the frequency adjustment command may carried by a standalone MAC CE or carried by the existing timing advance command MAC CE.

For a frequency adjustment command reception ending in DL subframe n, the corresponding adjustment of the uplink transmission frequency shall apply from the first available NB-IoT uplink slot following the end of n+12 DL subframe, wherein the first available NB-IoT uplink slot is the first slot of an NPUSCH transmission. When the UE's uplink NPUSCH transmissions in NB-IoT uplink slot n and NB-IoT uplink slot n+1 are overlapped due to the frequency adjustment, the UE may complete transmission ofNB-IoT uplink slot n and not transmit the overlapped part of NB-IoT uplink slot n+1.

2 User Plane Aspects 2.1 MAC 2.1.1 Random Access Procedure 2.1.1.1 Preamble Detection In NTN, a differential delay could be experienced by two UEs within the same cell. As a result, the preambles sent by different UEs in the same RACH occasion (RO) may reach the network at different times. To handle this, NTN NB-IoT UEs shall apply specific timing advance values determined by UE GNSS location and satellite ephemeris.

Regarding TA compensation errors, to make sure the network can receive preambles from all the UEs, the preamble receiving window should start from [RO timing–maximum TA uncertainty] and end with [RO timing+maximum TA uncertainty].

The TA command may support negative values if the preamble receiving windows has advanced in time. Otherwise, UE may be provided a TA margin value to reuse the legacy TA command in the MAC CE RAR.

2.1.1.2 Random Access Response Window

In terrestrial communications, the RAR is expected to be received by the UE within a few milliseconds after the transmission of the corresponding preamble. In NTN, the propagation delay is much larger such that the RAR cannot be received by the UE within the specified time interval specified for terrestrial communications. Therefore, the behavior of random-access response window (ra-Response Window) should be modified to support NTN.

In one embodiment, an offset may be induced to star the ra-ResponseWindow for NTN. The offset is configurable by NW or determined by UE to accommodate different scenarios.

2.1.1.3 Contention Resolution Timer

When the UE sends an Msg3, the UE will monitor for Msg4 to resolve a possible random-access contention. The ra-ContentionResolutionTimer starts after the Msg3 transmission. The maximum configurable value of ra-ContentionResolutionTimer is large enough to cover the round trip time (or round trip delay) in NTN. However, to save UE's power, the behavior of ra-ContentionResolutionTimer should be modified to support NTN.

Note that not all Msg3 carries an RRC connection request. Only the following RA triggering events that Msg3 should include RRC connection request: (1) Initial access and (2) RRC connection re-establishment.

In one embodiment, an offset may be introduced for the start of the ra-ContentionResolutionTimer for NTN.

2.1.1.4 Timing Advance

Timing advance (TA) is used to adjust the uplink frame timing relative to the downlink frame timing. The DL and UL timing is aligned at eNB with timing advance. The timing advance may be twice the value of the propagation delay.

eNB may provide timing advance to UE by initialing timing advance during random access procedure or by timing advance refinement in RRC_CONNECTED.

For initialing timing advance during random access procedure, eNB derives the timing advance by measuring the received RA preamble and sends the value to UE via the timing advance command field in MAC RAR.

For timing advance refinement in RRC_CONNECTED, eNB derives the timing advance by measuring the UL transmission or UL reference signals and refines the timing advance via the timing advance command MAC CE.

Figure 34:
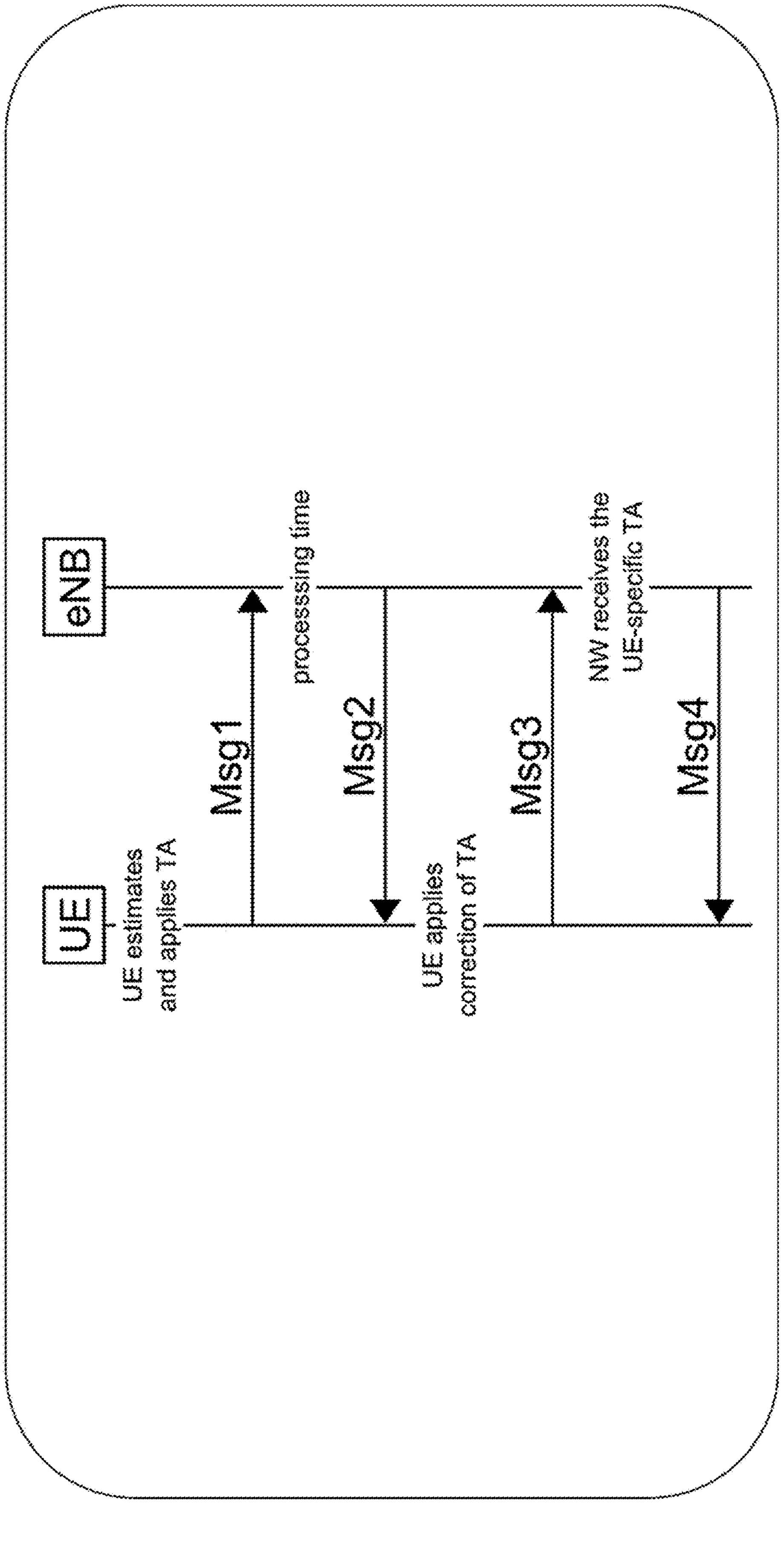
FIG. 34 illustrates a schematic diagram of framework on 4-step random-access procedure for UE with location information according to one embodiment of the present disclosure.

FIG. 34 illustrates a schematic diagram of framework on 4-step random-access procedure for UE with location information according to one embodiment of the present disclosure.

UE may perform estimation and application of the timing advance with respect to the satellite before UE sending Msg1 (i.e., random access preamble) to the network or eNB. For transparent architecture, the result of the estimation may include the delay between the UE and the eNB interface on the ground that needs to be estimated. In one embodiment, eNB may broadcast the position of the satellite along with the delay from satellite to gateway, wherein the eNB interface is situated. In one embodiment, ephemeris may be signaled to the UE along with gateway position. In one embodiment, eNB may signal the feeder link delay to the UE or may compensate the feeder link delay so that the UE only needs to estimate the service link delay.

eNB may transmit Msg2 to the UE as a RAR. The RAR may apply a timing advance correction for the UE-based estimation. The TA correction may be made by an eNB according to the Msgl reception at the eNB side. Since the UE is now estimating the timing advance, the UE may now both underestimate and overestimate the timing advance. There may need to be some adjustments of the timing advance to deal with this problem.

To schedule Msg3 without knowing the absolute value of the timing advance, the eNB may use the maximum propagation delay of the cell to schedule the UE or use the maximum differential delay to schedule the UE.

The eNB may receive Msg3 and obtain the timing advance of the UE according to the Msg3. At this point, both UE and eNB aware the UE-specific timing advance.

For UE with location information, another option is that UE only compensates UE specific TA when sending msgl, wherein the UE specific TA is determined based on the distance between a reference point and the UE. eNB compensates the common TA, wherein the common TA is determined based on the distance between a reference point and the eNB. However, it is still unclear how NW receives the UE specific TA.

The UE specific TA may be carried via Msg3 or Msg5 (i.e., the first UL transmission after Msg4) or NPUSCH.

Msg3 transmitted on UL-SCH may include a C-RNTI MAC CE, a common control channel (CCCH) SDU, a buffer status report (BSR), or a data volume and power headroom reporting (DPR) based on the logical channel prioritization (LCP) procedure.

For NB-IoT UEs, the LCP procedure may consider the following relative priority in decreasing order: MAC control element for C-RNTI or data from UL-CCCH; MAC control element for DPR; MAC control element for SPS confirmation; MAC control element for AUL confirmation; MAC control element for buffer status report (BSR), with exception of BSR included for padding; MAC control element for power headroom report (PHR), extended PHR, or dual connectivity PHR; MAC control element for Sidelink BSR, with exception of Sidelink BSR included for padding; MAC control element for downlink channel quality report (DCQR) and access stratum release assistance indication (AS RAI), with exception of when DCQR is to be included in Msg3; and data from any logical channel, except data from UL-CCCH.

Note that the priority for data from any other logical channel except UL-CCCH is low. Therefore, due to the sparse space of Msg3, to make sure NW would always receive the UE specific TA via Msg3, a new MAC CE for the UE specific TA may be needed.

For NTN Nb-IoT UEs, the UE specific TA (UTA) reporting may be used to provide the serving eNB with information about the amount of timing advance used for the NPRACH or UL transmission for the Serving Cell or about the amount of TA calculated by UE based on UE's GNSS location and satellite ephemeris. The reporting is done using the UTA MAC control element, wherein the UTA MAC control element may be carried by Msg3 together with a CCCH SDU or C-RNTI MAC CE.

Figure 35:
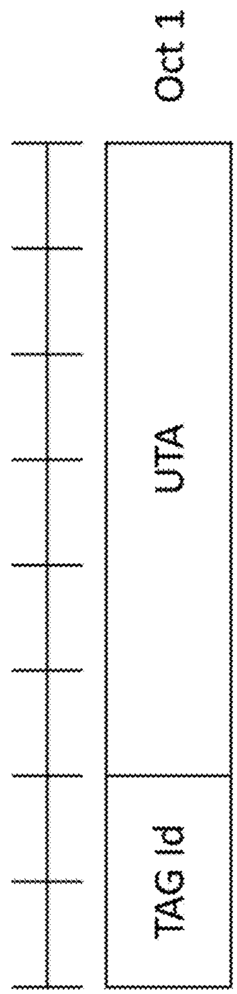
FIG. 35 illustrates a schematic diagram of UE timing advance report MAC control element for UE specific TA reporting according to one embodiment of the present disclosure.

The UTA MAC control element is identified by the MAC PDU sub-header used for the CCCH MAC SDU. The UTA MAC control element may have a fixed size and may include one or more octets as shown in FIG. 35. The UTA field identifies the total amount of UE timing advance used for the latest PRACH transmission or the latest UL transmission that MAC entity has applied, wherein the length of the UTA field is 6 bits. The indicated index $T_{A,UE}=\{0, 1, \ldots, 63\}$ is used to report a TA value in milliseconds. The TAG Identity (TAG Id) field indicates the TAG identity of the addressed TAG.

Note that the granularity of 1 millisecond is larger than the granularity used in TA command MAC CE. This is because the UTA reporting is used for UL grant scheduling rather than preventing UL interference from UEs.

For NTN NB-IoT UEs, the LCP procedure may add the UTA MAC CE with the following relative priority in decreasing order: MAC control element for C-RNTI or data from UL-CCCH; MAC control element for UTA; MAC control element for DPR; MAC control element for SPS confirmation; MAC control element for AUL confirmation; MAC control element for BSR, with exception of BSR included for padding; MAC control element for PHR, extended PHR, or dual connectivity PHR; MAC control element for sidelink BSR, with exception of sidelink BSR included for padding; MAC control element for DCQR and AS RAI, with exception of when DCQR is to be included in Msg3; and data from any logical channel except data from UL-CCCH.

In one embodiment, $T_{A,UE}$ set to "63" indicates the reported value beyond the max value given in the UTA field. Meanwhile, $T_{A,UE}$ set to "0" indicates the reported value below the min value given in the UTA field.

In one embodiment, the time unit used by $T_{A,UE}$ may include hyper system frame, radio frame, sub-frame, slot, NPDCCH period, or NPDCCH sub-frame.

In one embodiment, $T_{A,UE}$ may present the scheduling headroom, e.g., how much time/radio frame/subframe/slot of the scheduling offset used for Msg3 can be further reduced. For example, if the scheduling offset used for Msg3 is provided as $K_{Msg3}$ milliseconds after Msg2 reception, the UE may report the scheduling headroom by $K_{Msg3}-T_{UE}$ milliseconds, wherein $T_{UE}$ denotes the required timing advance value applied by the MAC in milliseconds.

In one embodiment, $T_{A,UE}$ may present an index of multiple scheduling offset values in a list provided by NW, e.g., UE may be provided a list of $K_{offset}$ values used for UL transmission and UE may select one that is greater or larger than the current required timing advance value.

The selected index as $T_{A,UE}$ is reported via the UTA MAC CE.

2.1.2 Discontinuous Reception (DRX)

2.1.2.1 HARQ RTT Timers

The discontinuous reception (DRX) supports UE battery saving by reducing the PDCCH monitoring time. Several RRC configurable parameters given by the IE MAC-Main-Config-NB are used to configure DRX, such as onDuration- Timer, drx-InactivityTimer, drx-RetransmissionTimer, drx-Cycle, drx-StartOffset, or drx-ULRetransmissionTimer.

Assuming that a DRX timer is set to a value of X and n denotes the subframe in which the related event is triggered, the intended behaviors of each DRX timer are presented as shown in Table 10.

TABLE 10

| DRX Timers | Intended UE behavior | Value range |
|---|---|---|
| drx-Inactivity Timer | The MAC entity monitors PDCCH in PDCCH-subframes during the subframes [n + 1, n + X]. The MAC entity starts or restarts drxShortCycleTimer and uses Short DRX Cycle in the subframe n + X + 1, if configured. | pp0-pp32 |
| drx-RetransmissionTimer | The MAC entity monitors PDCCH in PDCCH-subframes during the subframes [n, n + X − 1]. | pp0-pp33 |
| onDurationTimer | The MAC entity monitors PDCCH in PDCCH-subframes during the subframes [n, n + X − 1]. | pp1-pp32 |
| HARQ RTT Timer | The MAC entity starts drx-RetransmissionTimer in the subframe n + X, if needed. | |
| mac-ContentionResolutionTimer (Note 6) | The MAC entity monitors PDCCH in PDCCH-subframes during the subframes [n + 1, n + X]. | |

NOTE 1:
[x, y] means including subframe x and y.
NOTE 2:
For drx-InactivityTimer, drx-RetransmissionTimer and drx-ULRetransmissionTimer, if X = 0, the timer does not make the MAC entity to monitor the PDCCH.
NOTE 3:
When NB-IoT UE receives PDCCH, the UE executes the corresponding action in the subframe following the subframe containing the last repetition of the PDCCH reception where such subframe is determined by the starting subframe and the DCI subframe repetition number field in the PDCCH.
NOTE 4:
For NB-IoT, onDurationTimer may start within a PDCCH period and end within a PDCCH period. The UE shall monitor NPDCCH during these partial PDCCH periods while onDurationTimer is running.
NOTE 5:
pp1 corresponds to 1 NPDCCH period, pp2 corresponds to 2 NPDCCH periods and so on.
(Note 6):
this timer is not a DRX timer A modification of drx-StartOffset, drx-Cycle, onDurationTimer, and drx-InactivityTimer is not needed to support NTN because the timer values were inspected to accommodate the RTD of the NTN system.

Also, drx-RetransmissionTimer presents the maximum time until a retransmission is received. During this timer runs, the UE monitors the PDCCH. A modification of drx-RetransmissionTimer is not needed to support NTN.

However, HARQ RTT Timer is the minimum duration before a downlink assignment for HARQ retransmission is expected by the MAC entity. In NB-IoT, the HARQ RTT Timer is set to few milliseconds which is too small for a communication-link with a satellite. If HARQ is supported by NTN, the handling of HARQ RTT Timer (e.g., HARQ RTT timer and/or UL HARQ RTT timer) should be modified to support NTN.

Note that in LTE, there are two RTT timers for DL and UL respectively. HARQ RTT Timer is a parameter specifies the minimum amount of subframe(s) before a DL assignment for HARQ retransmission is expected by the MAC entity. UL HARQ RTT Timer is a parameter specifies the minimum amount of subframe(s) before a UL HARQ retransmission grant is expected by the MAC entity.

In one embodiment, the HARQ RTT Timers may be extended by adding a configurable parameter for different NTN scenarios.

Figure 36:
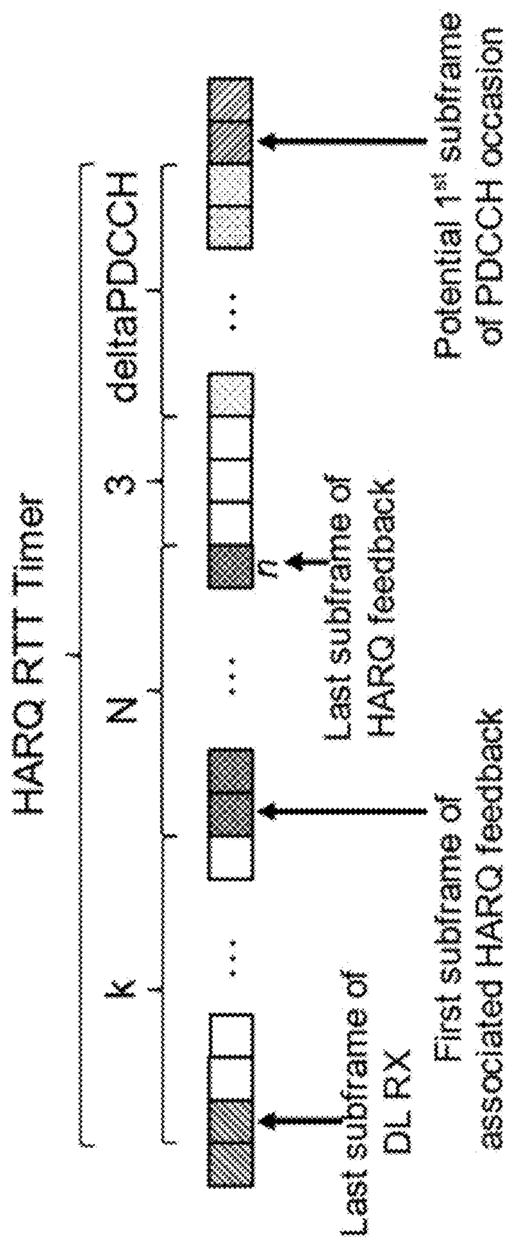
FIG. 36 illustrates a schematic diagram of setting the HARQ RTT Timer for NB-IoT according to one embodiment of the present disclosure.

For NB-IoT, the intended UE behavior regarding setting the HARQ RTT Timer is shown in FIG. 36. For NTN NB-IoT, when a single TB is scheduled by PDCCH or when multiple TBs are scheduled for the interleaved case, if the HARQ-ACK bundling is configured, the HARQ RTT Timer is set to k+3+N+deltaPDCCH+$K_{RTT}$ subframes, wherein "k" is the interval between the last subframe of the downlink transmission and the first subframe of the associated HARQ feedback transmission, "N" is the transmission duration in subframes of the associated HARQ feedback, and "deltaPDCCH" is the interval starting from the subframe following the last subframe of the associated HARQ feedback transmission plus 3 subframes to the first subframe of the next PDCCH occasion.

For NTN NB-IoT, when multiple TBs are scheduled by PDCCH for the non-interleaved case or the interleaved case when HARQ-ACK bundling is not configured, the HARQ RTT Timer is set to k+2*N+1+deltaPDCCH+$K_{RTT}$ subframes, wherein "k" is the interval between the last subframe of the downlink transmission and the first subframe of the first HARQ feedback transmission, "N" is the transmission duration in subframes of the associated HARQ feedback, and "deltaPDCCH" is the interval starting from the subframe following the last subframe of the last HARQ feedback transmission plus 1 subframe to the first subframe of the next PDCCH occasion.

$K_{RTT}$ may be in a unit of subframe/slot/ms, configured by eNB via an RRC message or system information, wherein the value of $K_{RTT}$ may be determined different based on subcarrier spacing, TDD/FDD operation, or GEO/non-GEO payload used.

In one embodiment, the eNB may provide multiple values of $K_{RTT}$ based on the minimum RTTs for different NTN scenarios (e.g., 477.48 ms for GEO transparent payload or 8 ms for LEO transparent payload). The UE may select a value once the NTN scenario has been identified (e.g., based on PLMN ID, a new MIB sequence, or NTN SIBs).

Figure 37:
FIG. 37 illustrates a schematic diagram of setting the UL HARQ RTT Timer for NB-IoT according to one embodiment of the present disclosure.

For NB-IoT, the intended UE behavior regarding setting the UL HARQ RTT Timer is shown in FIG. 37.

For NTN NB-IoT, when a single TB is scheduled by PDCCH, the UL HARQ RTT timer length is set to 4+deltaPDCCH+$K'_{RTT}$ subframes, wherein "deltaPDCCH" is the interval starting from the subframe following the last subframe of the PUSCH transmission plus 3 subframes to the first subframe of the next PDCCH occasion.

For NTN NB-IoT, when multiple TBs are scheduled by PDCCH, the UL HARQ RTT timer length is set to 1+deltaPDCCH+$K'_{RTT}$ subframes, wherein "deltaPDCCH" is the interval starting from the subframe following the last subframe of the PUSCH transmission plus 1 subframe to the first subframe of the next PDCCH occasion.

$K'_{RTT}$ may be in a unit of subframe/slot/ms, configured by eNB via an RRC message or system information, wherein the value of $K'_{RTT}$ may be determined based on subcarrier spacing, TDD/FDD operation, or GEO/non-GEO payload used.

In one embodiment, the eNB may provide multiple values of $K'_{RTT}$ based on the minimum RTTs for different NTN scenarios (e.g., 477.48 ms for GEO transparent payload or 8 ms for LEO transparent payload). The UE may select a value once the NTN scenario has been identified (e.g., based on PLMN ID, a new MIB sequence, or NTN SIBs).

2.1.2.2 Active Time for Sending SR

When DRX is configured, the UE is either in Active time and continuously monitor the PDCCH, or in non-Active time and allowed to save energy by not monitoring the PDCCH. The Active time occasions are mainly controlled by network configurations but on some occasions, the UE enters Active time without the control of the network. For example, after sending a scheduling request (SR), the UE would have to monitor the PDCCH for at least one RTT before any type of response is possible to be received.

On DRX after SR, as an example, the UE may starts offset to trigger the start of DRX active time after sending SR request on PUCCH, thus UE would not be required to monitor SR response (i.e., PDCCH) while offset is running. The UE may have an RTT-variable configured.

2.1.2.3 Cube Satellite Scenarios

Cube satellite scenarios is a special case of NTN IoT, wherein cube satellite has the size and power limitations typically associated with microsatellites and low-density constellations. The limitation may include a restricted link budget consistent with extreme coverage assumption due to relatively much smaller maximum transmission power, smaller antenna gains, and a number of beams. The limitation may include a discontinuous service link coverage due to very sparse satellite constellation where UE devices can remain long periods without being able to detect a satellite cell.

In RRC_IDLE, an NTN NB-IoT UE may change UE's paging occasion or a configured DRX cycle based on UE's GNSS and satellite ephemeris. If there is no satellite candidate for a while, the UE may stop monitoring paging occasions for receiving possible paging messages from NW for power-saving purpose.

Note that the paging occasion should be aligned between UE and NW such that NW can page UE on the right occasion. To do so, when UE changes UE's paging occasions or UE's configured DRX cycle, the goal is to accommodate the RTT between NW and UE to further enhance UE's power-saving efficiency, meanwhile, the alignment on the paging occasion or the DRX configuration between UE and NW shall be kept.

2.1.3 Scheduling Request

The scheduling request (SR) is used for requesting UL-SCH resources for a new transmission. A UE can use an SR to request UL-SCH resources from the eNB for a new transmission. PUCCH resources used by an SR transmission may be configured by an RRC message. During the prohibit timer (sr-ProhibitTimer) is active, no further SR is initiated. Some related parameters defined in the current specifications are given below.

SchedulingRequestConfig-NB: sr-ProhibitTimer-r15 INTEGER (0.7) OPTIONAL.

NPRACH-ConfigSIB-NB: nprach-Periodicity-r15 ENUMERATED {m580, ms160, ms320, ms640, ms1280, ms2560, ms5120, m510240}.

sr-ProhibitTimer: timer for SR transmission on the NPRACH resource for SR. Value in a number of SR period, wherein the SR period is equal to the field nprach-Periodicity of the NPRACH resource. The sr-ProhibitTimer will at latest expire after 71 s and then initiate an SR, which is sufficient even for GEO systems.

Note that NW could indicate sr-WithHARQ-ACK-Config-r15 as "TRUE" to activate physical layer SR with HARQ ACK. In this case, UE could signal the SR together with an acknowledgment of the data to eNB. However, this parameter (i.e., sr-WithHARQ-ACK-Config-r15) is missing in the current specifications. For example, in 3GPP TS 36.321 V16.2.0, sr-WithHARQ-ACK-Config-r15 is missing, as shown in Table 11.

TABLE 11

| |
|---|
| 3GPP TS 36.321 V16.2.0 |
| As long as one SR is pending, the MAC entity shall for each TTI: |
| 1>if no UL-SCH resources are available for a transmission in this TTI: |
| 2>For NB-IoT: |
| 3>if the MAC entity has no valid resource for SR together with acknowledgement of the data in this TTI and no valid PRACH resource for SR configured in any TTI: |
| 4>initiate a Random-Access Procedure (see clause 5.1) and cancel all pending SRs in the first subframe containing PRACH for preamble transmission. |
| 3>else: |
| 4>if the MAC entity has valid resource for SR together with acknowledgement of the data in this TTI: |
| 5>instruct the physical layer to signal the SR together with acknowledgement of the data. |
| 5>cancel, if any, initiated Random Access Procedure for SR. |
| 4>else: |
| 5>if the MAC entity has valid PRACH resource for SR configured in this TTI and sr-ProhibitTimer is not running |
| 6>instruct the physical layer to signal the SR on one valid PRACH resource for SR |
| 6>start the sr-ProhibitTimer in the subframe containing the last repetition of the corresponding SR transmission |

Note that sr-WithHARQ-ACK-Config-r15 is optional and is provided by NW, which implies NW could disable this feature by not providing this IE (i.e., WithHARQ-ACK-Config-r15). Also, UE may not support this feature. However, the above description does not reflect the current specs.

In one embodiment, a condition can be added to the SR when SR is signaled together with an acknowledgement of the data, as shown in Table 12.

TABLE 12

```
[omit unchanged]
  4>if the MAC entity has a valid resource for SR together with an acknowledgment of the
  data in this TTI; and
  4>if sr-WithHARQ-ACK-Config-r15 is set to TRUE if configured:
    5>instruct the physical layer to signal the SR together with an acknowledgment of the
    data.
    5>cancel, if any, initiated Random Access Procedure for SR.
[omit unchanged]
```

2.1.4 HARQ

The MAC sublayer supports error correction and/or repetition through HARQ. For NTN, the NW could disable UL HARQ feedback for downlink transmission to prevent HARQ stalling, however, NB-IoT has no such latency need.

3 Control Plane Aspects

Satellite beams or satellites are not considered to be visible from the UE perspective in NTN. However, differentiating, at the PLMN level, the type of network (e.g., NTN vs. terrestrial) may be used from a UE perspective.

For tracking area, the current tracking area management, fixed tracking area on the ground, is assumed as a baseline for GEO and LEO based NW.

NTN NR supports both options (1) same physical cell identity (PCI) for several satellite beams and (2) one PCI per satellite beam. However, it is unclear how to support multiple satellite beams in a cell for NB-IoT.

Figure 38:
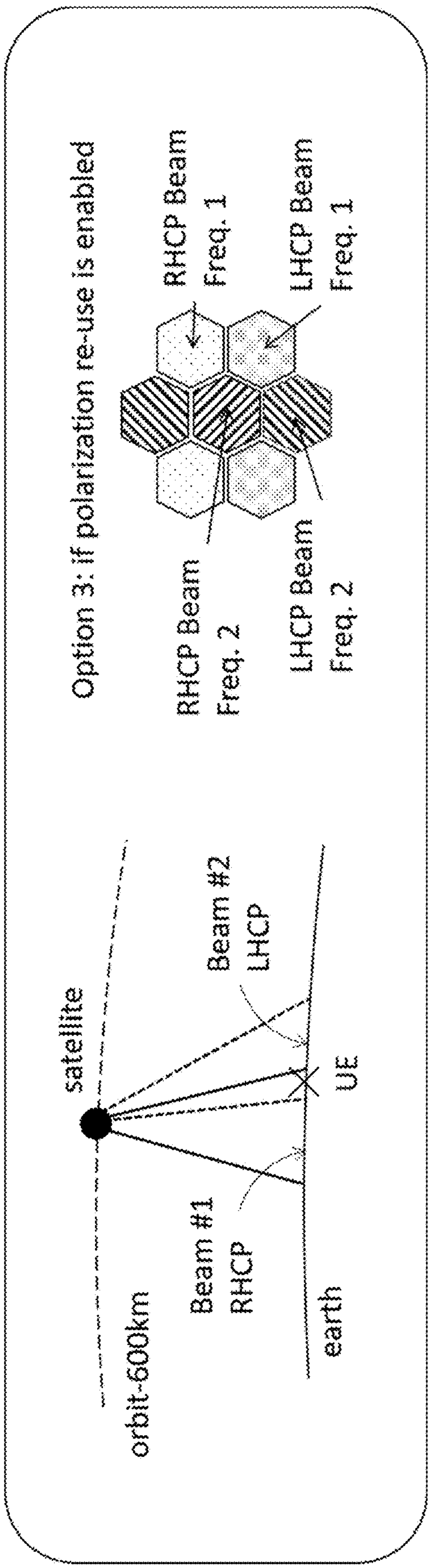
FIG. 38 illustrates a schematic diagram of polarization re-use in enabled for antenna beam layout according to one embodiment of the present disclosure.

NTN NR may further support option (3) If LHCP and RHCP are enabled to increase spectrum efficiency, for example, to increase frequency reuse factor as shown in FIG. 38, an NTN cell may provide two satellite beams differentiated by LHCP and RHCP used.

A UE may be configured to use circular polarization (CP) operation in LHCP or RHCP in a serving cell by receiving RRC messages. The UE may be provided an initial CP operation in LHCP or RHCP, however, if the UE is not provided the initial CP operation, the RHCP may be assumed as the initial CP operation as the default circular polarization.

In one embodiment, NW may indicate whether circular polarization is enabled via system information, (e.g., SIB1) or cell-specific RRC parameters. NW may provide a circular polarization switch indication for UE to change circular polarization from LHCP to RHCP or another around via MAC CE, DCI, or RRC message. In one embodiment, the circular polarization switch may be triggered in response to a timer expiring.

3.1 Idle Mobility

Satellites may provide very large cells, covering hundreds of kilometers, and consequently would lead to large tracking areas. In this scenario, the tracking area updates (TAUs) are minimal, however, the paging load could be high because the paging load is associated with the number of devices in the tracking area.

3.1.1 Tracking Area Update

In order not to have TAU performed frequently by the UE triggered by the satellite motion, the tracking area may be designed to be fixed on the ground. For NTN LEO, this implies that while the cells sweep on the ground, the tracking area code (i.e., TAC) broadcasted is changed when the cell arrives at the area of the next planned earth fixed tracking area.

The TAC (or a list of TACs) broadcasted by the eNB needs to be updated as the eNB enters the area of next planned tracking area. When the UE detects entering a tracking area which is not in the list of tracking areas that the UE previously registered in the network, a mobility registration update procedure will be triggered.

Two possible options should be studied to update the broadcast TAC: "hard switch" option: one cell broadcast only one TAC per PLMN; or "soft switch" option: one cell can broadcast more than one TACs per PLMN.

3.1.2 System Information

Ephemeris information (e.g., orbit parameters) and cell location information (e.g., a cell center, cell size, etc.) can be used to help UEs perform the measurement and cell selection/reselection, in addition to PCI and frequency information included in the broadcast system information.

As LEO satellites are moving in a predictable path, the neighbor cell list of the LEO satellites is also predictable. The neighbor cell list can be provided via broadcast system information.

NTN NB-IoT may be provided by a new NTN SIB(s) including ephemeris information for a target cell and neighbor cell. If the NTN SIBs are provided in a serving cell, the UE may determine the serving cell as an NTN cell.

3.2 Radio Link Failure

Figure 39:
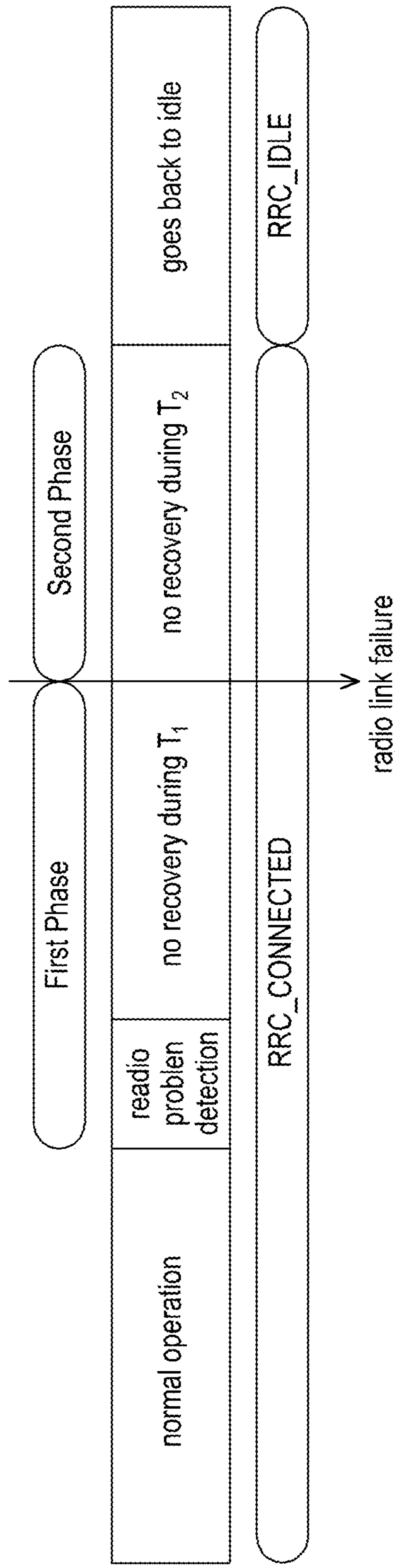
FIG. 39 illustrates a schematic diagram of two phases govern the behavior associated with radio link failure according to one embodiment of the present disclosure.

FIG. 39 illustrates a schematic diagram of two phases govern the behavior associated with radio link failure according to one embodiment of the present disclosure, wherein $T_1$ and $T_2$ are time periods.

If RRC Connection re-establishment is not supported, the UE may enter RRC IDLE (i.e., there is no second phase). However, if RRC Connection re-establishment is supported, the UE may access a cell through the random-access procedure (i.e., the second phase is supported). Table 13 shows that how mobility is handled for radio link failure.

TABLE 13

| cases | First Phase | Second Phase | T2 expired |
|---|---|---|---|
| UE returns to the same cell | Continue as if no radio problems occurred | Activity is resumed using explicit signaling | Activity is resumed using explicit signaling |
| UE selects a different cell from the same eNB | N/A | Activity is resumed using explicit signaling | Go via RRC_IDLE |

For NTN, when a satellite switch occurs, there is a need for UE to switch to a different cell from the same eNB with different service and feeder links due to a satellite change.

Since the link switch is predictable according to satellite movement and satellite constellation deployment, certain enhancements shall be considered.]

For NB-IoT UE not supporting RRC Connection re-establishment (supporting First Phase only), when a link switch happens, the UE may have no choice but enter RRC IDLE. In this case, the UE may store link failure information in the VarRLF-Report-NB as assistant information that can be requested by an eNB, wherein the link failure information may include: an indication of a feeder link or a service link switch received from an eNB if provided; the serving satellite ID or the serving satellite ephemeris; or the UE geographic location.

For NB-IoT UE supporting RRC Connection re-establishment (supporting Second Phase), the UE may select a different cell from the same eNB, wherein the activity is resumed using explicit signaling to accommodate a link switch. In this case, the of explicating signaling may include: an indication of a link switch; the target satellite ID or the target satellite ephemeris; the common TA for an RTT between the eNB to a reference point for the target satellite; or the common DL or UL Doppler compensation for the target satellite.

Figure 40:
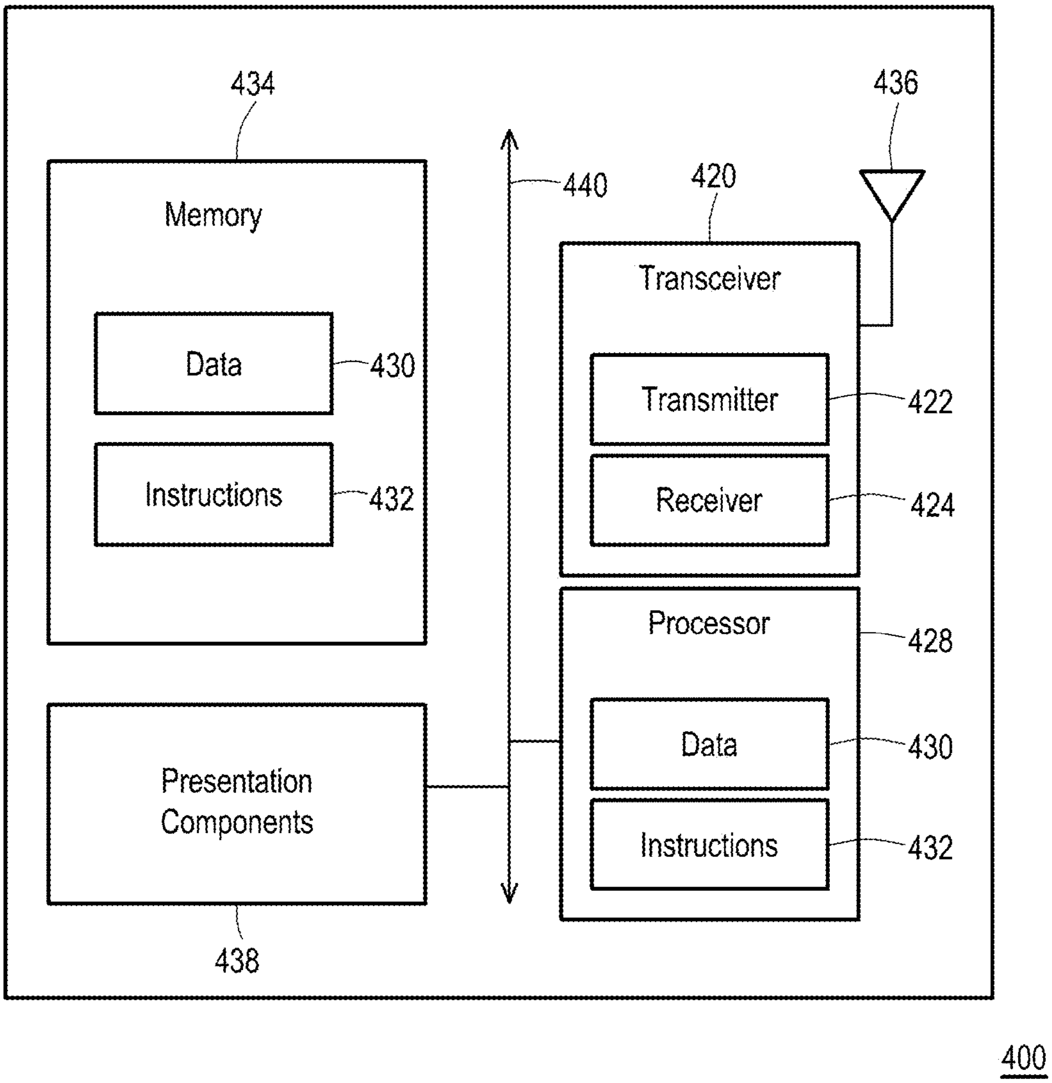
FIG. 40 illustrates a block diagram of a node for wireless communication according to one embodiment of the present disclosure.

FIG. 40 illustrates a block diagram of a node for wireless communication according to one embodiment of the present disclosure. As shown in FIG. 40, a node 400 may include a transceiver 420, a processor 428, a memory 434, one or more presentation components 438, and at least one antenna 436. The node 400 may also include an RF spectrum band module, a base station communications module, a network communications module, and a system communications management module, Input/Output (I/O) ports, I/O components, or power supply (not explicitly shown in FIG. 40). Each of these components may be in communication with each other, directly or indirectly, over one or more buses 440. In one implementation, the node 400 may be a UE or a base station that performs various functions described herein, for example, with reference to FIG. 1 through FIG. 39.

The transceiver 420 having a transmitter 422 (e.g., transmitting/transmission circuitry) and a receiver 424 (e.g., receiving/reception circuitry) may be configured to transmit and/or receive time and/or frequency resource partitioning information. In some implementations, the transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media can be any available media that can be accessed by the node 400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage, or other magnetic storage devices. Computer storage media does not comprise a propagated data signal. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 434 may include computer-storage media in the form of volatile and/or non-volatile memory. The memory 434 may be removable, non-removable, or a combination thereof. Exemplary memory includes solid-state memory, hard drives, optical-disc drives, and etc. As illustrated in FIG. 40, the memory 434 may store computer-readable, computer-executable instructions 432 (e.g., software codes) that are configured to, when executed, cause the processor 428 to perform various functions described herein, for example, with reference to FIG. 1 through FIG. 39. Alternatively, the instructions 432 may not be directly executable by the processor 428 but be configured to cause the node 400 (e.g., when compiled and executed) to perform various functions described herein.

The processor 428 (e.g., having processing circuitry) may include an intelligent hardware device, e.g., a Central Processing Unit (CPU), a microcontroller, an ASIC, and etc. The processor 428 may include memory. The processor 428 may process the data 430 and the instructions 432 received from the memory 434, and information through the transceiver 420, the base band communications module, and/or the network communications module. The processor 428 may also process information to be sent to the transceiver 420 for transmission through the antenna 436, to the network communications module for transmission to a core network.

One or more presentation components 438 presents data indications to a person or other device. Exemplary presentation components 438 include a display device, speaker, printing component, vibrating component, and etc.

Figure 41:
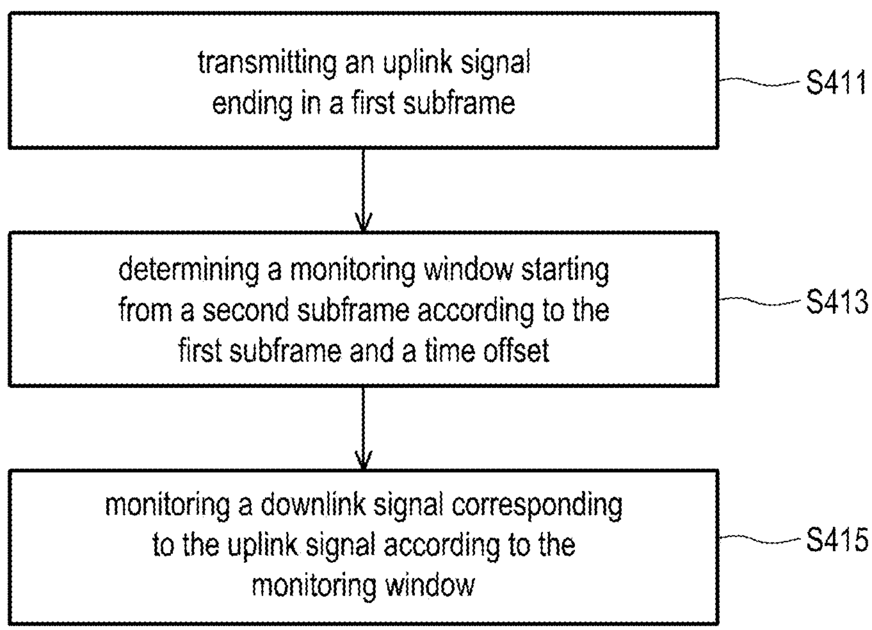
FIG. 41 illustrates a flowchart of a method of channel scheduling for NB-IoT in NTN according to one embodiment of the present disclosure.

FIG. 41 illustrates a flowchart of a method of channel scheduling for NB-IoT in NTN according to one embodiment of the present disclosure, wherein the method can be implemented by the node 400 as shown in FIG. 40. In step S411, transmitting an uplink signal ending in a first subframe. In step S413, determining a monitoring window starting from a second subframe according to the first subframe and a time offset. In step S415, monitoring a downlink signal corresponding to the uplink signal according to the monitoring window.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of channel scheduling for narrowband Internet of Things (NB-IoT) in a non-terrestrial network (NTN), adapted to a user equipment (UE), wherein the method comprising:

transmitting an uplink signal ending in a first subframe;

determining a monitoring window starting from a second subframe according to the first subframe and a time offset;

monitoring a downlink signal corresponding to the uplink signal according to the monitoring window;

receiving a second downlink signal ending in a third subframe;

determining a fourth subframe according to the third subframe and a second time offset; and transmitting a second uplink signal corresponding to the second downlink signal at the fourth subframe.

2. The method of claim 1, wherein a difference between the first subframe and the second subframe is greater than or equal to the time offset.

3. The method of claim 2, wherein the difference is equal to the time offset plus a default offset.

4. The method of claim 1, wherein the uplink signal is a narrowband physical uplink shared channel (NPUSCH) and the downlink signal is a narrowband physical downlink control channel (NPDCCH).

5. The method of claim 1, wherein the uplink signal is a random access (RA) preamble and the downlink signal is a random access response (RAR).

6. The method of claim 1, wherein a step of transmitting the uplink signal ending in the first subframe comprising:

transmitting the uplink signal via a pre-configured uplink resource.

7. The method of claim 1, further comprising:

determining the time offset according to a round trip time (RTT) between the UE and a serving base station.

8. The method of claim 1, further comprising:

determining the time offset according to a round trip time (RTT) between a serving base station and a reference point in a coverage of the serving base station, wherein the reference point comprises one of a serving satellite in a space and a cell center on a ground.

9. The method of claim 1, further comprising:

receiving a signal, wherein the signal comprises at least one of system information and a radio resource control (RRC) message; and obtaining the time offset from the signal.

10. The method of claim 1, wherein a difference between the third subframe and the fourth subframe is greater than or equal to the second time offset.

11. The method of claim 10, wherein the difference is equal to the second time offset plus a default offset.

12. The method of claim 1, wherein the second downlink signal is a narrowband physical downlink shared channel (NPDSCH) and the second uplink signal is a narrowband physical uplink shared channel (NPUSCH) carrying an acknowledgment (ACK) response or a negative-acknowledgment (NACK) response.

13. The method of claim 1, wherein the second downlink signal is a narrowband physical downlink control channel (NPDCCH) order and the second uplink signal is a random access (RA) preamble.

14. The method of claim 1, wherein the second downlink signal is a system information block (SIB) and the second uplink signal is a narrowband physical random access channel (NPRACH).

15. The method of claim 1, further comprising:

receiving a second signal, wherein the second signal comprises at least one of a system information block (SIB), a radio resource control (RRC) message, and a medium access control (MAC) control element (CE) command; and obtaining the second time offset from the second signal.

16. The method of claim 1, further comprising:

determining the second time offset according to a round trip time (RTT) between the UE and a communication device, wherein the communication device comprises one of a serving base station and a serving satellite.

17. The method of claim 1, further comprising:

determining an uplink transmission timing according to the second time offset and a timing advance (TA) value.

18. A user equipment (UE) comprising:

one or more non-transitory computer-readable media having computer-executable instructions embodied thereon; and at least one processor coupled to the one or more non-transitory computer-readable media, and configured to execute the computer-executable instructions to:

transmit an uplink signal ending in a first subframe;

determine a monitoring window starting from a second subframe according to the first subframe and a time offset;

monitor a downlink signal corresponding to the uplink signal according to the monitoring window;

receive a second downlink signal ending in a third subframe;

determine a fourth subframe according to the third subframe and a second time offset; and transmit a second uplink signal corresponding to the second downlink signal at the fourth subframe.

* * * * *